United States Patent
Nanri et al.

(10) Patent No.: US 9,275,463 B2
(45) Date of Patent: Mar. 1, 2016

(54) STEREO IMAGE PROCESSING DEVICE AND STEREO IMAGE PROCESSING METHOD

(75) Inventors: Takuya Nanri, Kanagawa (JP); Hirofumi Nishimura, Kanagawa (JP); Junko Ueda, Kanagawa (JP); Koji Arata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 14/126,176

(22) PCT Filed: Jun. 8, 2012

(86) PCT No.: PCT/JP2012/003746
§ 371 (c)(1),
(2), (4) Date: Dec. 13, 2013

(87) PCT Pub. No.: WO2012/172761
PCT Pub. Date: Dec. 20, 2012

(65) Prior Publication Data
US 2015/0036917 A1 Feb. 5, 2015

(30) Foreign Application Priority Data
Jun. 17, 2011 (JP) .................................. 2011-135191

(51) Int. Cl.
*G06K 9/00* (2006.01)
*G06T 7/00* (2006.01)
(Continued)

(52) U.S. Cl.
CPC .............. *G06T 7/0075* (2013.01); *G01C 3/085* (2013.01); *G06T 5/002* (2013.01); *G06T 5/006* (2013.01);
(Continued)

(58) Field of Classification Search
USPC ................. 382/154, 171, 209, 278, 282, 286; 345/419, 653, 664
See application file for complete search history.

(56) References Cited

U.S. PATENT DOCUMENTS 6,381,360 B1 * 4/2002 Sogawa ........................ 382/154
7,317,819 B2 * 1/2008 Janes ........................... 382/128
(Continued)

FOREIGN PATENT DOCUMENTS

EP 2252070 A2 11/2010
JP 2000-200351 A 7/2000
(Continued)

OTHER PUBLICATIONS

International Search Report for Application No. PCT/JP2012/003746 Jul. 3, 2012.
(Continued)

*Primary Examiner* — Yosef Kassa
(74) *Attorney, Agent, or Firm* — Pearne & Gordon LLP

(57) ABSTRACT

Provided is a stereo image processing device, with which it is possible to compute disparity with high precision even for an object of a small image region size in a baseline length direction. With this device, an image matching unit (102) acquires a correspondence point of a reference image for a target point of a target image. An image cropping unit (201) extracts first two-dimensional pixel data including the target point from the target image, and extracts second two-dimensional pixel data including the correspondence point from the reference image. An image reconfiguration unit (202) reconfigures the respective first two-dimensional pixel data and second two-dimensional pixel data into first one-dimensional pixel data and second one-dimensional pixel data. A peak position detection unit (104) computes disparity based on the correlation between the first one-dimensional pixel data and the second one-dimensional pixel data.

11 Claims, 35 Drawing Sheets

(51) Int. Cl.
*G01C 3/08* (2006.01)
*G06T 5/00* (2006.01)
*G06T 5/20* (2006.01)

(52) U.S. Cl.
CPC ......... G06T 5/20 (2013.01); *G06T 2207/10012* (2013.01); *G06T 2207/20024* (2013.01); *G06T 2207/20182* (2013.01); *G06T 2207/20228* (2013.01); *G06T 2207/30261* (2013.01)

(56) References Cited

U.S. PATENT DOCUMENTS

| | | | | |
|---|---|---|---|---|
| 7,576,332 | B2* | 8/2009 | Britten | 250/393 |
| 7,697,749 | B2* | 4/2010 | Ogawa | G06K 9/32 250/208.1 |
| 7,835,785 | B2* | 11/2010 | Scully | A61B 5/06 600/424 |
| 8,090,195 | B2* | 1/2012 | Oyama | 382/154 |
| 8,160,301 | B2* | 4/2012 | Morimitsu | 382/106 |
| 8,540,845 | B2* | 9/2013 | Ding | G01N 21/3554 162/262 |
| 8,582,087 | B2* | 11/2013 | Kaufman | G01B 11/2518 356/3.01 |
| 2002/0024516 | A1 | 2/2002 | Chen et al. | |
| 2009/0010530 | A1 | 1/2009 | Sumitomo | |
| 2009/0304266 | A1 | 12/2009 | Aoki et al. | |
| 2010/0289882 | A1 | 11/2010 | Ohta | |
| 2012/0026295 | A1 | 2/2012 | Nishimura et al. | |

FOREIGN PATENT DOCUMENTS

| | | |
|---|---|---|
| JP | 2008-123141 A | 5/2008 |
| WO | 2010/113389 A1 | 10/2010 |

OTHER PUBLICATIONS

Extended European Search Report for Application No. 128012119.9 dated Oct. 24, 2014.

Takuma Shibahara, et al. A Sub-Pixel Stereo Correspondence Technique Based on 1D Phase-Only Correlation IEEE, Image Processing, Sep. 1, 2007. pp. v-221, XP031158525.

* cited by examiner

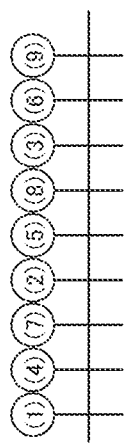
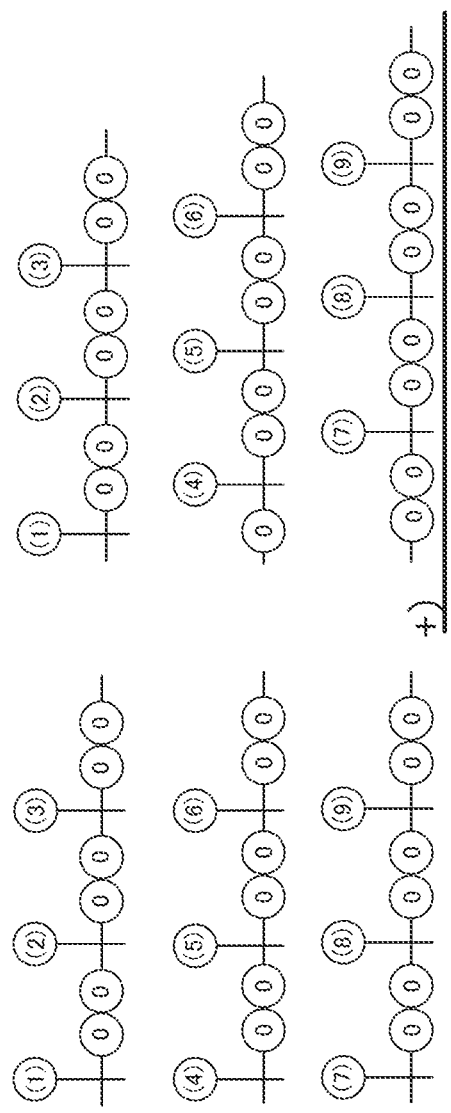
FIG. 4A
FIG. 4B
FIG. 4C
FIG. 4D $$SAD(n) = \sum_{j=ya-wv/2}^{ya+wv/2} \sum_{i=xa-wh/2}^{xa+wh/2} |f(x+i, y+j) - g(x+i+n, y+j)|$$

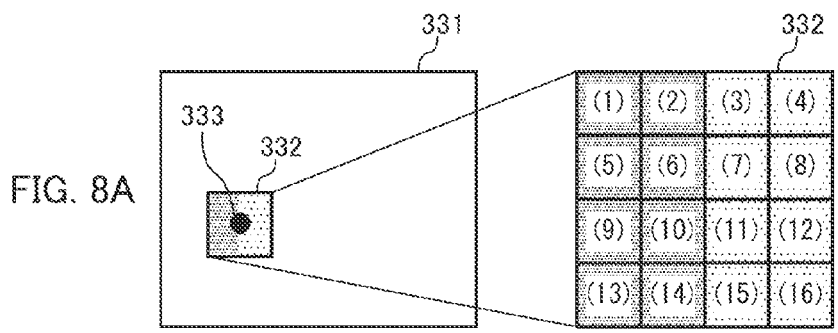
FIG. 8A
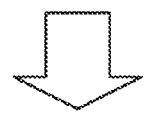
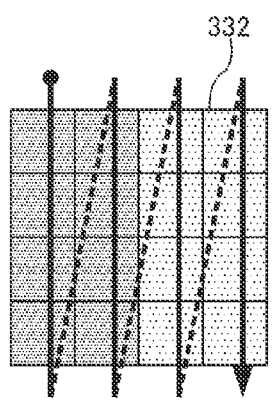
FIG. 8B
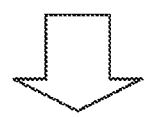
FIG. 8C
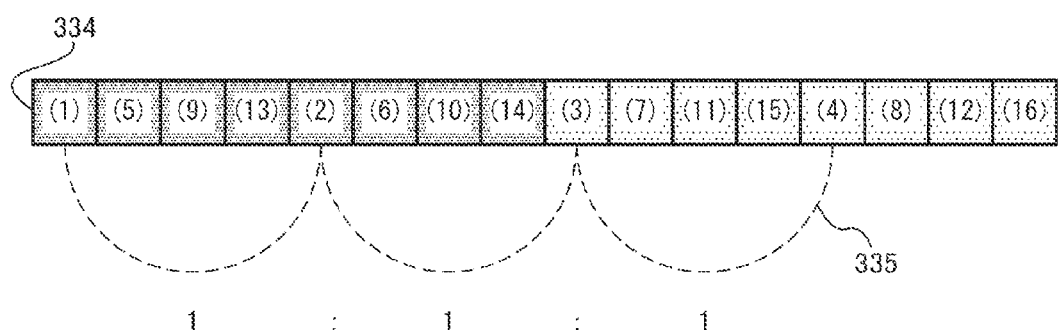

$$f(t) = \sum_{n=-\infty}^{\infty} f(nT) \frac{\sin\left(\pi\left(\frac{m}{T} - n\right)\right)}{\pi\left(\frac{m}{T} - n\right)}$$

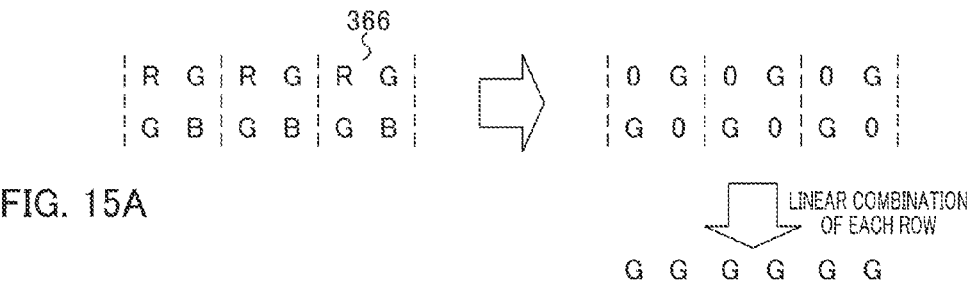
FIG. 15A
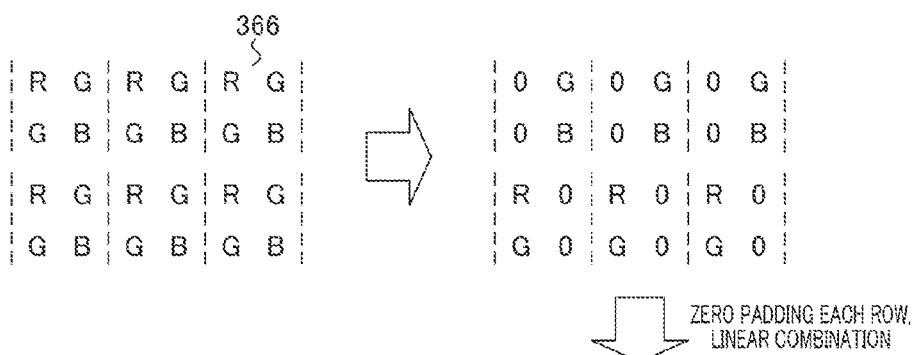
FIG. 15B
FIG. 15C

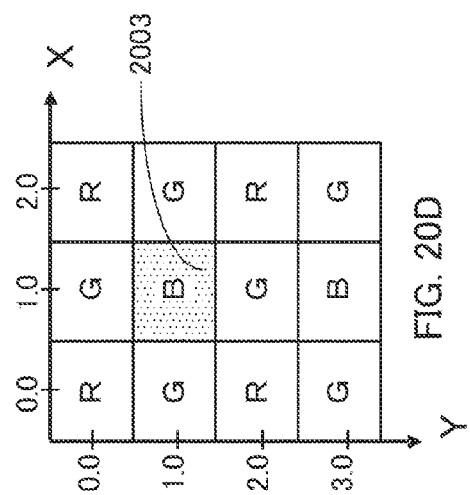
FIG. 20B
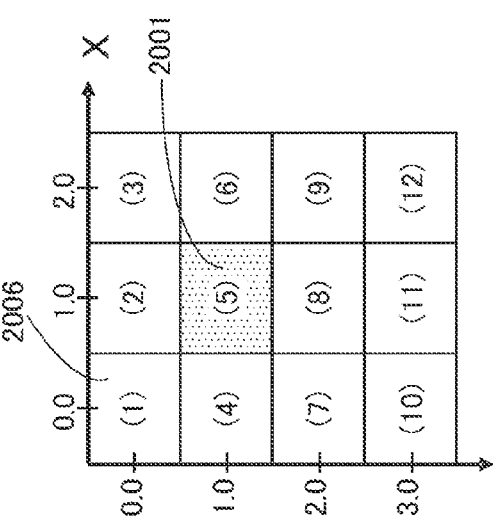
FIG. 20A
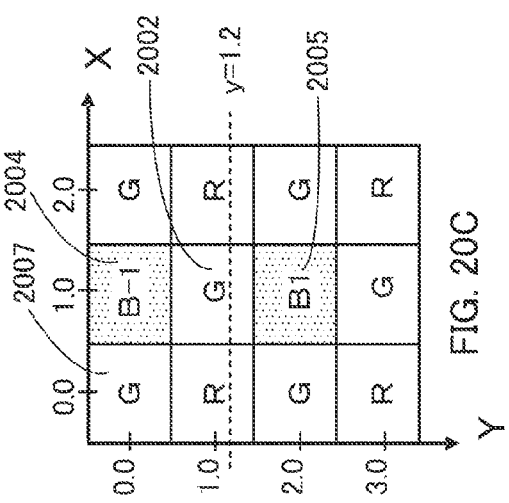
FIG. 20C
FIG. 20D

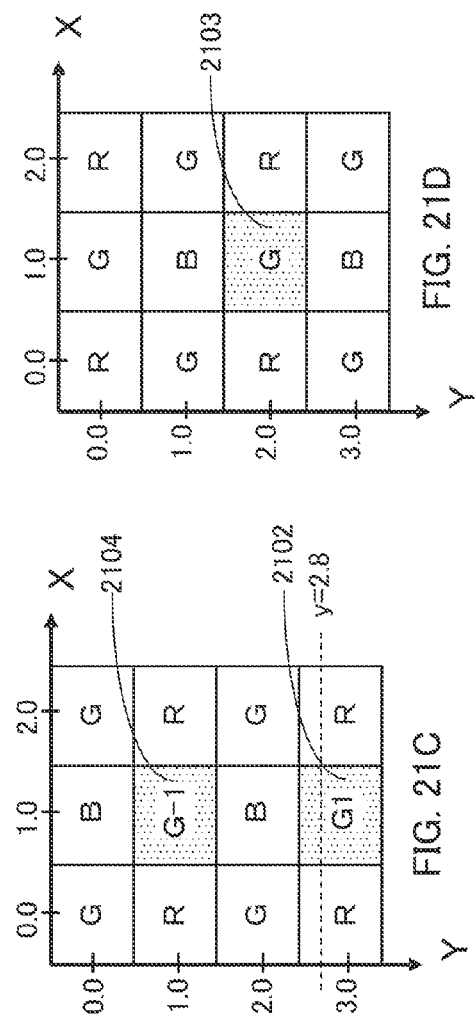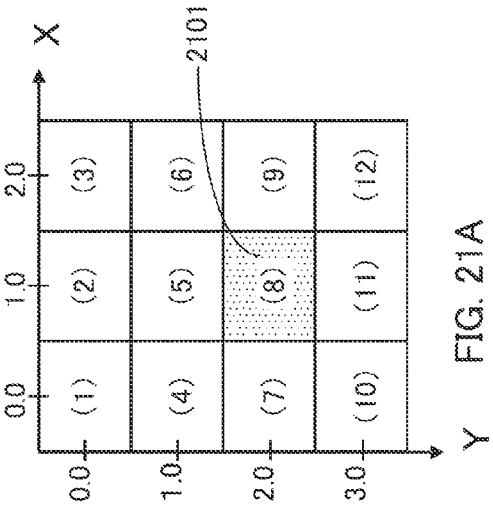

STEREO IMAGE PROCESSING DEVICE AND STEREO IMAGE PROCESSING METHOD

TECHNICAL FIELD

The present invention relates to a stereo image processing apparatus that calculates a disparity from a corresponding point in a reference image of a stereo image to a target point in a target image of the stereo image.

BACKGROUND ART

Stereo image processing apparatuses which measure a distance to a target (hereafter simply referred to as "stereo image processing apparatus") are known as conventional technologies. A stereo image processing apparatus extracts, from a reference image, a point at which an object identical to an object captured at a target point in a target image (hereafter referred to as "corresponding point", and calculates a distance to an object based on a camera parameter and a disparity which represents a shift amount of a corresponding point relative to the target point.

Applications of stereo image processing apparatuses in consideration include a safety apparatus that measures a distance to a forward vehicle or a pedestrian captured by a vehicle-mounted camera. Since the safety apparatuses are incorporated into small-sized cars in recent years, miniaturization of stereo cameras has been required. As the size of stereo camera is reduced, the distance between a camera that captures a target image and a camera that captures a reference image is reduced. The reduction in the distance results in a reduced disparity, which requires a highly precise disparity calculation.

The conventional technique disclosed in PTL 1 is a technology for highly precise disparity calculation. According to the conventional technique, a disparity is calculated using one-dimensional POC (Phase Only Correlation). More specifically, a one-dimensional pixel data sequence is clipped using a Hanning window from each of the target image and the reference image, and is synthesized after performing one-dimensional Fourier transform. The amplitude component of the synthesized data sequence is normalized, and a phase-only correlation coefficient is calculated by one-dimensional inverse Fourier transform. Subsequently, a disparity is calculated based on the peak of correlation of phase-only correlation coefficient.

CITATION LIST

Patent Literature

PTL 1
Japanese Patent Application Laid-Open No. 2008-123141

SUMMARY OF INVENTION

Technical Problem

However, with the conventional technique, it is difficult to calculate a disparity highly precisely for an object having an image region small in size in the baseline direction on a stereo image (hereafter referred to as "size of image region in baseline length direction") such as a pedestrian far away from the camera.

It is an object of the present invention to provide a stereo image processing apparatus and a stereo image processing method capable of calculating disparity highly precisely even for an object having a small size in the image region in the baseline length direction.

Solution to Problem

The stereo image processing apparatus according to the present invention includes: an image matching section that performs image matching on a target image and a reference image so as to obtain a corresponding point in the reference image corresponding to a target point in the target image; an image clipping section that extracts, from the target image, first two-dimensional pixel data having a plurality of pixel rows and a plurality of pixel columns and including the target point, and extracts, from the reference image, second two-dimensional pixel data having a plurality of pixel rows and a plurality of pixel columns and including the corresponding point; an image reconstructing section that reconstructs, based on a predetermined reconstruction rule, the first two-dimensional pixel data and the second two-dimensional pixel data to first one-dimensional pixel data and second one-dimensional pixel data, respectively; and a peak position detecting section that calculates a disparity based on a correlation between the first one-dimensional pixel data and the second one-dimensional pixel data.

The stereo image processing method according to the present invention includes: performing image matching on a target image and a reference image so as to obtain a corresponding point in the reference image corresponding to a target point in the target image; extracting, from the target image, first two-dimensional pixel data having a plurality of pixel rows and a plurality of pixel columns and including the target point, and extracting, from the reference image, second two-dimensional pixel data having a plurality of pixel rows and a plurality of pixel columns and including the corresponding point; reconstructing, based on a predetermined reconstruction rule, the first two-dimensional pixel data and the second two-dimensional pixel data to first one-dimensional pixel data and second one-dimensional pixel data, respectively; and calculating a disparity based on a correlation between the first one-dimensional pixel data and the second one-dimensional pixel data.

Advantageous Effects of Invention

According to the present invention, a highly precise disparity can be calculated for an object having a small image region size in the baseline length direction.

BRIEF DESCRIPTION OF DRAWINGS

FIGS. 4A to 4D are schematic diagrams illustrating a concept of a reconstruction rule according to Embodiment 2 of the present invention;

FIGS. 8A to 8C are schematic diagrams illustrating an overview of a reconstruction rule according to Embodiment 2 of the present invention;

FIGS. 15A to 15C are schematic diagrams illustrating an example of upsampling on an image in the Bayer pattern according to Embodiment 2 of the present invention;

FIGS. 20A to 20D are schematic diagrams illustrating an example of an overview of vertical pixel correction process according to Embodiment 3 of the present invention;

FIGS. 21A to 21D are schematic diagrams illustrating an example of an overview of vertical pixel correction process according to Embodiment 3 of the present invention;

DESCRIPTION OF EMBODIMENTS

Embodiments of the present invention shall be described in detail as follows with reference to the drawings. Note that, according to the conventional technology, when an image region size is small, it is necessary to reduce a one-dimensional pixel data sequence for reducing the influence of an image around the image region such as the background. The smaller the one-dimensional pixel data sequence, the lower the accuracy of a correlation peak. The present invention has been conceived in view of the problem.

(Embodiment 1)

Embodiment 1 of the present invention is an example of a basic aspect of the present invention.

Figure 1:
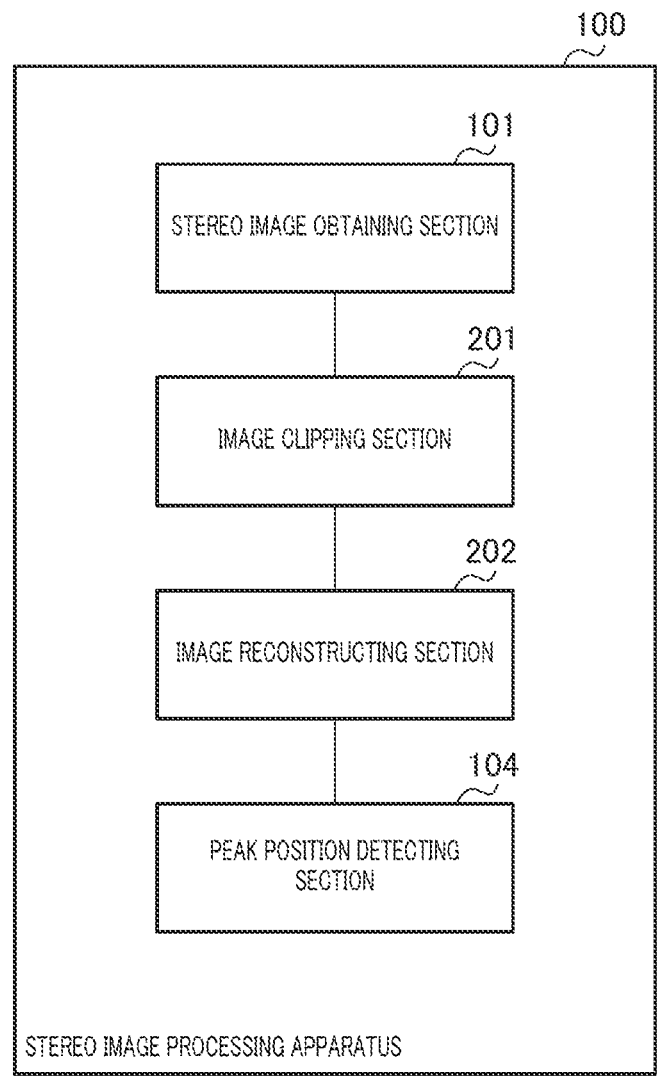
FIG. 1 is a block diagram illustrating an example of a configuration of a stereo image processing apparatus according to Embodiment 1 of the present invention.

FIG. 1 is a block diagram illustrating an example of a configuration of a stereo image processing apparatus according to Embodiment 1.

As illustrated in FIG. 1, stereo image processing apparatus 100 includes stereo image obtaining section 101, image clipping section 201, image reconstructing section 202, and peak position detecting section 104.

Stereo image obtaining section 101 obtains a stereo image including a target image and a reference image for a stereo image.

Image clipping section 201 clips image ranges including a plurality of pixel rows parallel to a baseline-length direction of the stereo image and a plurality of pixel columns from the target image and the reference image.

Image reconstructing section 202 reconstructs a pixel value in each pixel in the clipped image range to one dimension according to the predetermined reconstruction rule (hereafter simply referred to as "reconstruction rule") so as to generate one-dimensional pixel data. The one-dimensional pixel data is generated for each of the target image and the reference image. The reconstruction rule is for setting a ratio of distances between given pixels included in the same pixel row in the image range before reconstruction and a ratio of the distances after reconstruction is identical to the pixels included in the image range.

Peak position detecting section 104 calculates a disparity from the target point in the target image to the corresponding point in the reference image based on a correlation between target pixel data which is one-dimensional pixel data generated from the target image and reference pixel data which is one-dimensional pixel data generated from the reference image.

Stereo image processing apparatus 100 includes a storage medium such as CPU (central processing unit) and RAM (random access memory), for example. In this case, each of the functional parts described above is implemented by a CPU executing a control program.

Stereo image processing apparatus 100 can reconstruct a pixel value of each pixel in an image range including a plurality of rows and a plurality of columns to one-dimensional pixel data by up-sampling components of rows. Subsequently, stereo image processing apparatus 100 can calculate a disparity from the target point in the target image to a corresponding point in the reference image based on a correlation between the target pixel data obtained from the target image and the reference pixel data obtained from the reference image. Furthermore, the direction of the pixel rows may be set to coincide the direction of the baseline-length. With this, stereo image processing apparatus 100 can calculate a disparity highly accurately for an object having a small image region size in the baseline-length direction, since a longer pixel data column is secured than in the conventional technology.

Note that, although not illustrated, stereo image processing apparatus 100 may include image matching section 102, image clipping section 201, image reconstructing section 202, and peak position detecting section 104. Stated differently, a stereo image is obtained from an external apparatus, and image matching section 102 performs image matching process based on a stereo image. More specifically, image matching section 102 obtains a corresponding point in the reference image with regard to the target point in the target image by performing image matching on the target image and the reference image.

(Embodiment 2)

Embodiment 2 according to the present invention is an example in which the present invention is applied to an apparatus for processing a stereo image having a baseline-length direction approximately matching the horizontal direction.

First, the configuration of stereo image processing apparatus 100 shall be described.

Figure 2:
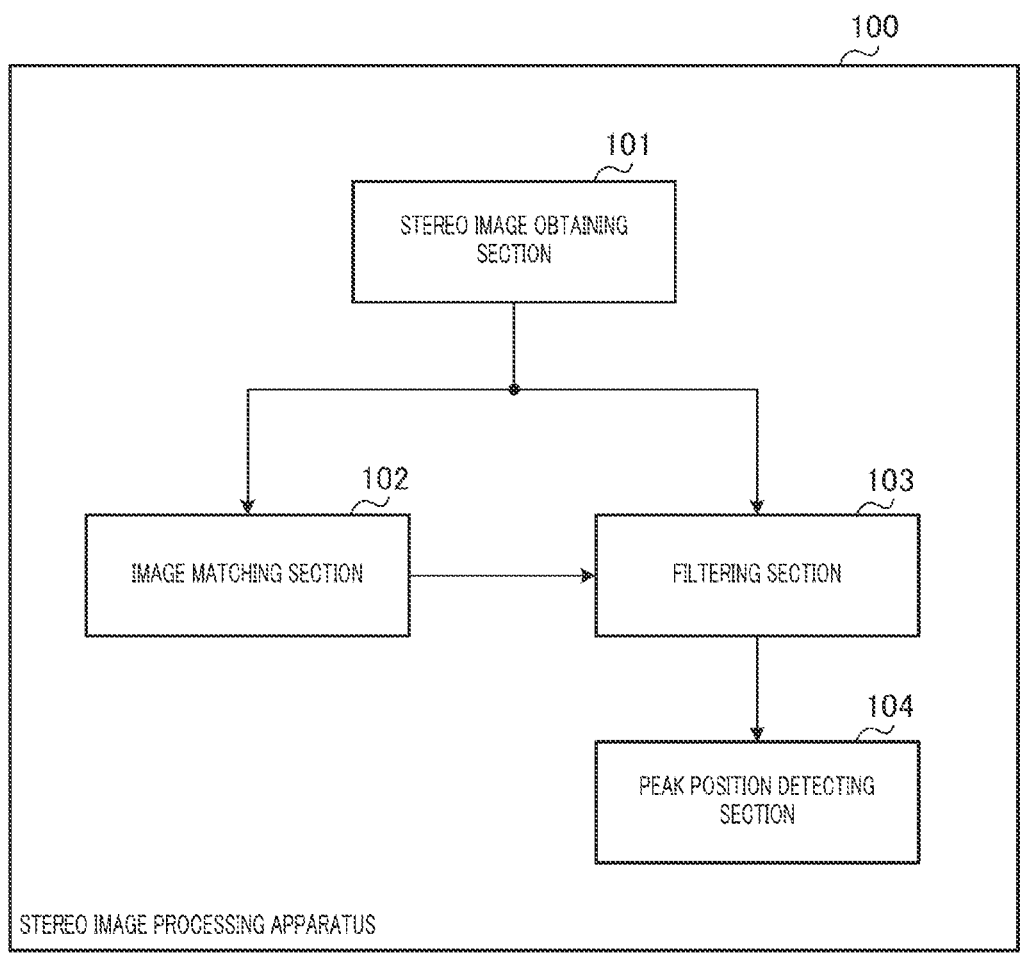
FIG. 2 is a block diagram illustrating an example of a configuration of a stereo image processing apparatus according to Embodiment 2 of the present invention.

FIG. 2 is a block diagram illustrating an example of a configuration of a stereo image processing apparatus according to Embodiment 2.

As illustrated in FIG. 2, stereo image processing apparatus 100 includes stereo image obtaining section 101, image matching section 102, filtering section 103, and peak position detecting section 104.

<Stereo Image obtaining Section 101>

Stereo image obtaining section 101 obtains a target image and a reference image for a stereo image.

More specifically, stereo image obtaining section 101 obtains a stereo image captured by two or more imaging systems (that is, cameras). A stereo image includes a target image and a reference image capturing the same object by two different cameras. Stereo image obtaining section 101 outputs the stereo image obtained to image matching section 102 and filtering section 103. Note that, in the embodiment, stereo image obtaining section 101 inputs a stereo image captured by two cameras having baseline-length directions substantially matching the horizontal direction.

<Image Matching Section 102>

Image matching section 102 obtains a corresponding point in the reference image with respect to the target point in the target image. More specifically, image matching section 102 obtains a corresponding point in the reference image for the target point in the target image by performing image matching on the target image and the reference image.

More specifically, image matching section 102 obtains the corresponding point in the reference image with respect to the target point in the target image by performing image matching on the target image and the reference image obtained by stereo image obtaining section 101. Image matching section 102 calculates "shift amount n in pixel level" on a position of the corresponding point in the reference image with respect to the position of the target point on an image. Image matching section 102 outputs a position of the target point and the position of the corresponding point in the reference image to filtering section 103 by outputting a position of the target point, shift amount n in the pixel level, and information representing the direction of the shift.

For example, image matching section 102 determines a predetermined one pixel included in the target image as a "target point", and clips, from the target image, a partial image around a "target point" as the center (hereafter referred to as "unit target image"). Furthermore, image matching section 102 clips a plurality of partial images from the reference image. Each of the partial images is included in the reference image and has the same size as the unit target image (and hereafter referred to as "unit reference image"). A plurality of unit reference images are clipped from different positions in the reference image.

In the case of a stereo image, the disparity between the target image and the reference image only appears in the baseline-length direction of the camera. Accordingly, image matching section 102 may change the clipping position in the baseline-length direction, and clips a plurality of the unit reference images. Subsequently, the shift amount between the position of the target point in the target image and the corresponding point in the reference image is calculated as shift amount n described above.

Subsequently, image matching section 102 determines a unit reference image having a largest matching degree with the unit target image from among the plurality of clipped unit reference images. In the specified unit reference image, one pixel corresponding to the target point is the corresponding point on the reference image. As an index representing a matching degree, an SAD (Sum of Absolute Differences) representing dissimilarity in intensity is used.

<Filtering Section 103>

Filtering section 103 filters the reference image based on the target image. More specifically, filtering section 103 calculates a filtering coefficient based on the position of the target image and the target point, and filters the partial image of the reference image around the corresponding point using the calculated filtering coefficient.

<Configuration of Filtering Section 103>

Figure 3:
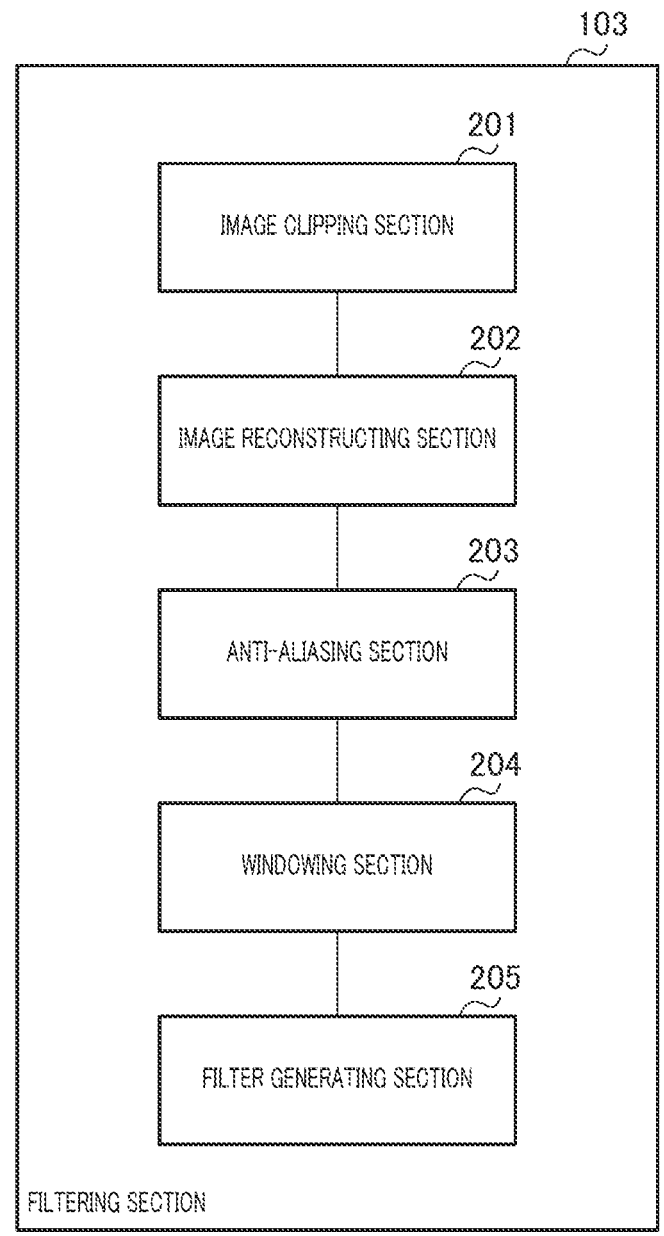
FIG. 3 is a block diagram illustrating an example of a configuration of a filtering section according to Embodiment 2 of the present invention.

FIG. 3 is a block diagram illustrating an example of the configuration of filtering section 103.

As illustrated in FIG. 3, filtering section 103 includes image clipping section 201, image reconstructing section 202, anti-aliasing section 203, windowing section 204, and filter generating section 205.

<Image Clipping Section 201>

Image clipping section 201 clips a partial image (two-dimensional pixel data) composed of a plurality of pixel rows parallel to the baseline-length direction of the stereo image and a plurality of pixel columns as a unit target image for sub-pixel estimation (extracting step). Furthermore, image clipping section 201 clips a partial image (two-dimensional pixel data) composed of the same number of pixel rows and the same number of pixel columns (in the same size) as the unit target image for sub-pixel estimation as a unit reference image for sub-pixel estimation (extracting step). More specifically, image clipping section 201 extracts, from the target image, first two-dimensional data including a plurality of pixel rows and a plurality of pixel columns and including the target point, and extracts, from the reference image, second two-dimensional pixel data including a plurality of pixel rows and a plurality of pixel columns and including the corresponding point.

Image clipping section 201 subsequently outputs the unit target image for sub-pixel estimation and the unit reference image for sub-pixel estimation to image reconstructing section 202.

Note that, in the embodiment, image clipping section 201 determines the clipping position of the image in the reference image such that unit target image for sub-pixel estimation includes the target point. In addition, image clipping section 201 determines the clipping position of the image such that the unit reference image for sub-pixel estimation includes a corresponding point.

Note that, image clipping section 201 may determine the unit target image for sub-pixel estimation to be in size different from the unit target image described above. Furthermore, image clipping section 201 specifies "image ranges" for the unit target image for sub-pixel estimation and the unit reference image for sub-pixel estimation, and outputs the specified image ranges to image reconstructing section 202. The "image range" can be represented by barycentric coordinates, width, and height. However, the representation is not limited to this example.

<Image Reconstructing Section 202>

Image reconstructing section 202 generates one-dimensional pixel data by reconstructing a pixel value in each pixel of the unit target image for sub-pixel estimation and the unit reference image for sub-pixel estimation obtained from image clipping section 201 into one dimension according to the reconstruction rule. Note that, the image range refers to a generic concept of the unit target image for sub-pixel estimation and the unit reference image for sub-pixel estimation.

The reconstruction rule is for reconstructing pixel values one-dimensionally for setting a ratio of distances between given pixels included in the same pixel row in the image range before reconstruction and a ratio of the distances after reconstruction are identical to the pixels included in the image range. Stated differently, image reconstructing section 202 spaces apart equally-spaced pixels for a predetermined distance in each pixel row included in the image range, and linearly combines each pixel such that pixels included in the other pixel rows are provided between the pixels spaced apart. The reconstruction rule is for reconstructing the one-dimensional pixel data such that the distance between the pixels after the reconstruction included in the same pixel row in the image range becomes greater than the distance before the reconstruction.

The predetermined distance is, in principle, a number smaller than the number of pixel rows in the image range by one. More specifically, a case in which the image is a black-and-white image, and the number of pixel rows in the image range is 3, and the number of pixel columns is 3 will be described. Image reconstructing section 202 spaces three pixels adjacent before the reconstruction apart by two pixels in a given pixel row included in the image range. Image reconstructing section 202 linearly combines three pixel rows by arranging pixels in the other pixel rows between the pixels spaced apart. An example of specific method for linear combination will be described later.

Here, the concept of the reconstruction rule will be described with reference to the drawings.

FIGS. 4A to 4D are schematic diagrams illustrating a concept of the reconstruction rule.

According to the reconstruction rule, the data in each pixel row of the image range is treated as independent data items. Image reconstructing section 202 can increase the sampling frequency by spacing pixels in the data in each pixel row apart, and interpolating the space between the pixels with zero (this is generally referred to as "upsampling"). However, the data obtained by upsampling picks up folding noise without any process. Accordingly, it is necessary for anti-aliasing section 203 to perform anti-aliasing on the data obtained by upsampling by filtering the data on a low-pass filter.

Here, since the data on each pixel row is independent, image reconstructing section 202 is capable of combining each pixel row after upsampling each pixel row and anti-aliasing the upsampled pixel rows. Here, if the object in the image is an object elongated in the vertical direction (for example, a pedestrian), the shift amount between the target image and the reference image is identical to any pixel row in the image range. Accordingly, even if the same offset value is added to the position of pixels in the target image and the reference image, the shift amount does not change. Stated differently, even if the positions of the pixels in the target image and the reference image are shifted for the same amount, in the same direction of the baseline-length direction, that does not affect the calculation on the shift amount between the target image and the reference image. Accordingly, the shift amount from the target image to the reference image can be calculated using data combined after adding certain offset to a position of the pixel for each pixel row.

In addition, since the anti-aliasing filter is a linear filter, linearity is satisfied with regard to conversion from the data in each row to anti-aliased data. Accordingly, stereo image processing apparatus 100 can calculate the shift amount from the data obtained by upsampling each pixel row, linearly combing the pixel rows, and anti-aliasing through the low-pass filter.

An example of a specific method for linearly combining a plurality of pixel rows will be described. As illustrated in FIG. 4A, it is assumed that the unit target image for sub-pixel estimation input to the image reconstructing section has a size of pixel count 9=three pixel rows×three pixel columns. Here, for simplifying description, the order (1) to (9) of pixels used for scanning pixels from upper left to right while moving through the rows downward is used as the numbers representing the pixels.

First, image reconstructing section 202 decomposes an image in each pixel row. Next, as illustrated in FIG. 4B, image reconstructing section 202 upsamples each pixel row as many as the number of pixel columns. In this case, first pixel row 401 which is the first pixel row is "(1) (0) (0) (2) (0) (0) (3) (0) (0)" from left to right. Second pixel row 402 which is the pixel row in row 2 is "(4) (0) (0) (5) (0) (0) (6) (0) (0)" from left to right. Third pixel row 403 which is the pixel row in row 3 is "(7) (0) (0) (8) (0) (0) (9) (0) (0)" from left to right. Note that, (0) represents a pixel where zero is interpolated.

Subsequently, as illustrated in FIG. 4C, with regard to three up-sampled rows, image reconstructing section 202 combines the three pixel rows by not adding offset values to the positions of pixels in the pixel row 401 which is the pixel row in row 1 (stated differently, an offset value of 0 is added), adding an offset value of 1 to the positions of the pixels in second pixel row 402, and adding an offset value of 2 to the positions of the pixels in third pixel row 403.

As a result, as illustrated in FIG. 4D, data having a configuration "(1) (4) (7) (2) (5) (8) (3) (6) (9)" is obtained. Image reconstructing section 202 performs the similar process on the unit reference image for sub-pixel estimation so as to obtain the one-dimensional pixel data.

Note that, the offset added to the positions of the pixels in each pixel row upon performing linear combination of each pixel row is not limited to the example described above. The offset values may be at least zero and an integer smaller than or equal to the number of the pixel rows by one, and are different from each other so as to prevent overlap in the position of the pixels before reconstruction. For example, image reconstructing section 202 may obtain one-dimensional pixel data such as "(1) (7) (4) (2) (8) (5) (3) (9) (6)", by adding another offset to the positions of the pixels in each pixel row.

The concept of the reconstruction rule is as described above.

Subsequently, image reconstructing section 202 outputs one-dimensional pixel data generated from the unit target image for sub-pixel estimation (hereafter referred to as "target pixel data") and one-dimensional pixel data generated from the unit reference image for sub-pixel estimation (hereafter referred to as "reference pixel data") to anti-aliasing section 203.

Note that, in the embodiment, the pixel row described above is parallel to the baseline-length direction of the stereo image (the direction of the epipolar line). The reconstruction rule is for generating the one-dimensional pixel data such that the distance between a given pixel in the image range and a pixel adjacent to the pixel in the pixel row direction becomes wider than the distance before the reconstruction. In addition, the reconstruction rule is for generating the one-dimensional pixel data such that a distance between a given pixel in the image range and a pixel adjacent to the given pixel in the baseline-length direction (horizontal direction) (that is, in the same pixel row) is wider than the distance with any of the other pixels provided in the direction orthogonal to the baseline-length direction (vertical direction) (that is, in the same pixel column). The pixel value refers to a intensity value for each pixel, for example.

<Anti-Aliasing Section 203>

Anti-aliasing section 203 removes folding noise (aliasing) generated by the reconstruction from one-dimensional pixel data (the target pixel data and the reference pixel data). The process is usually referred to as "anti-aliasing". More specifically, anti-aliasing section 203 removes a folding noise from the one-dimensional pixel data using the low-pass filter, for example. Subsequently, anti-aliasing section 203 outputs the one-dimensional pixel data on which the folding noise is removed (the target pixel data and the reference pixel data) to windowing section 204.

<Windowing Section 204>

Windowing section 204 windows the one-dimensional pixel data. Subsequently, windowing section 204 outputs one-dimensional pixel data windowed to filter generating section 205.

<Filter Generating Section 205>

Filter generating section 205 calculates an inverted phase filtering coefficient obtained by inverting the positions of the pixels in the target pixel data in the arrangement direction. Subsequently, filter generating section 205 filters the reference pixel data, using the inverted phase filtering coefficient.

The filtering will be described in detail later. Filter generating section 205 outputs the result of filtering (hereafter referred to as "filtering result") to peak position detecting section 104 in FIG. 2.

<Peak Position Detecting Section 104>

Peak position detecting section 104 obtains a relative positional relationship having the highest correlation between the target pixel data and the reference pixel data in the filtering result. Subsequently, peak position detecting section 104 calculates a shift amount of the corresponding point in the unit reference image for sub-pixel estimation from the target point in the unit target image for sub-pixel estimation, based on the relative positional relationship obtained.

More specifically, peak position detecting section 104 calculates the shift amount by detecting the peak position in the filtering result. The peak in the filtering result is a point where the filtering result is the maximum value. By adding the shift in the sub-pixel level and the pixel level calculated in image matching section 102 (shift amount n described above), a precise shift amount between the target image and the reference image can be calculated.

Stereo image processing apparatus 100 includes a storage medium such as CPU or RAM, for example. In this case, each of the functional parts described above is implemented by a CPU executing a control program.

Stereo image processing apparatus 100 described above may be reconstructed to one-dimensional pixel data (target pixel data and reference pixel data) by upsampling component in the baseline-length direction of pixel values of each pixel in the image range composed of a plurality of pixel rows×a plurality of pixel columns. Stereo image processing apparatus 100 calculates a disparity on the sub-pixel level between the corresponding point in the reference image relative to the target point in the target image, based on the correlation between the target pixel data which is one-dimensional pixel data obtained from the target image and reference pixel data which is one-dimensional pixel data obtained from the reference image. With this, stereo image processing apparatus 100 can use the one-dimensional pixel data column longer than the conventional technology for calculating the disparity. Accordingly, a disparity for an object having a small sized image region in the baseline-length direction can be calculated highly precisely.

The description of the configuration of stereo image processing apparatus 100 is as described above.

The operations of stereo image processing apparatus 100 having the configuration described above will be described next.

Note that, in the following description, X-axis represents the horizontal direction of the image, Y-axis represents the vertical direction of the image, and one point in coordinates represents one pixel. For the simplicity of explanation, the direction of the epipolar line (baseline-length direction) is parallel to the X-axis in the entire image.

Figure 5:
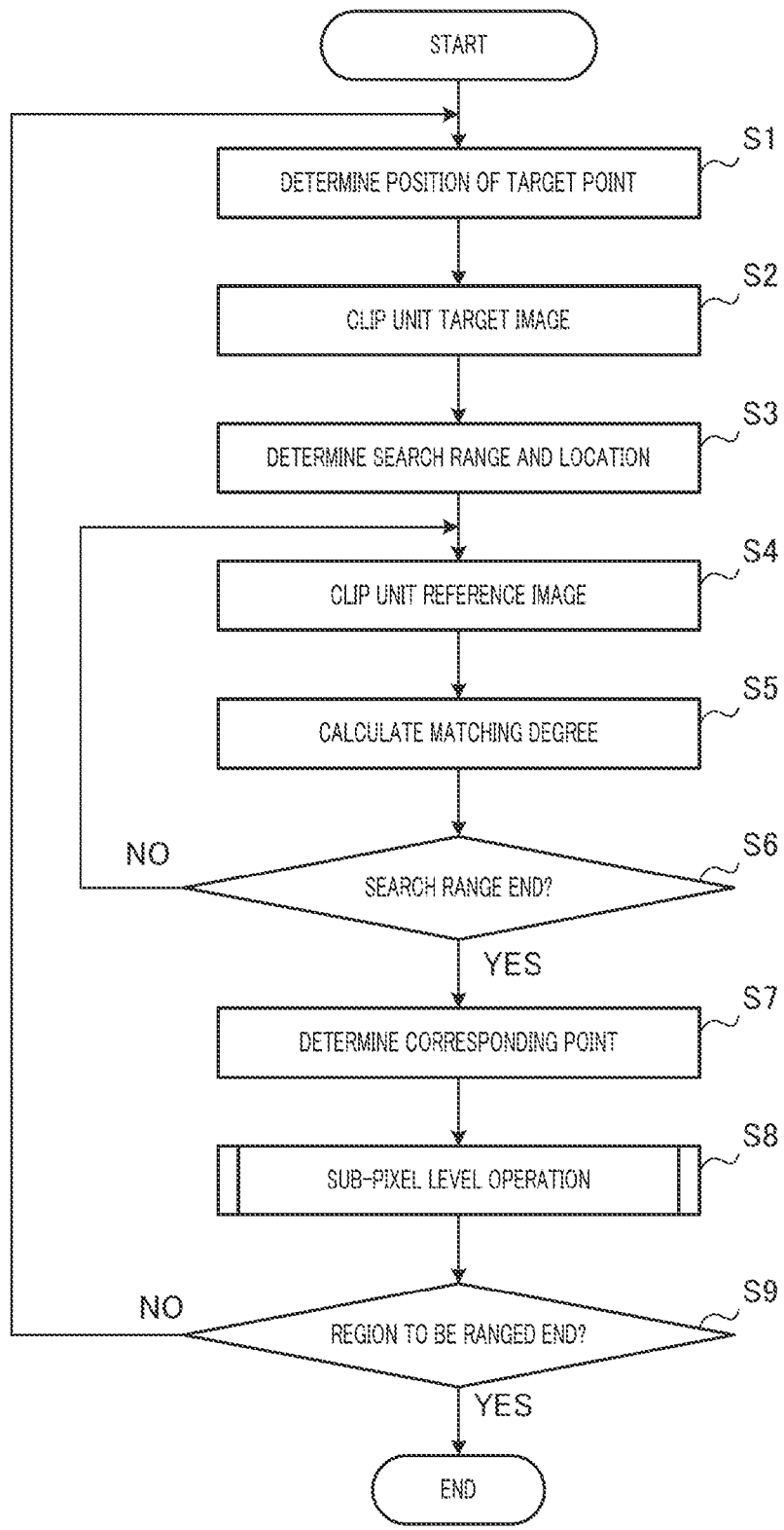
FIG. 5 is a flowchart illustrating an example of an operation of a stereo image processing apparatus according to Embodiment 2 of the present invention.

FIG. 5 is a flowchart illustrating an example of the operation by stereo image processing apparatus 100.

Image matching section 102 performs image matching on the target image and the reference image while moving the target point in the entire target image each time a stereo image is input from stereo image obtaining section 101. Stereo image processing apparatus 100 performs the operation in the following steps S1 to S8 for all of the target points.

<Determining Positions of Target Point>

In step S1, image matching section 102 determines a position of the target point used for calculating disparity.

<Clipping Unit Target Image>

In step S2, image matching section 102 clips a unit target image from the target image. The unit target image is an image in the partial region including a target point determined in step S1. The unit of the size of the unit target image is in pixels, as described above. Stated differently, the unit target image is an image composed of a plurality of pixel rows and a plurality of pixel columns.

<Determining Search Range and Search Starting Position>

In step S3, image matching section 102 determines a search range and a search starting position in the reference image, based on a position of the target point determined in step S2. A disparity in a stereo image is determined based on the principle of triangulation, using a baseline length which is a distance between cameras, a focal length of the lens, and a distance from a stereo camera to an object to be ranged. Stated differently, the disparity is proportional to the baseline length and the focal length, and inversely proportional to the distance to the object. Since the baseline length and the focal distance are fixed by camera parameters, the search range may be determined based on the distance from the stereo camera to the object to be ranged. Since the object at infinity from the stereo camera is captured at the same position in the target image and the reference image, the search starting position in the reference image may be the same coordinates as a target point in the target image.

<Clipping Unit Reference Image>

In step S4, image matching section 102 determines a clipping position in the reference image, and clips a unit reference image having the same number of pixel rows and pixel columns as the unit target image. Image matching section 102 determines the search starting position determined in step S3 as the first clipping position, and subsequently shifts the clipping position.

<Calculating Matching Degree>

In step S5, image matching section 102 calculates the matching degree between the unit target image and the unit reference image. An SAD value representing difference in intensity and similarity in intensity are used for the matching degree, for example.

<Determining End of Search Range>

In step S6, image matching section 102 determines the end of the process on the search range. More specifically, image matching section 102 determines whether or not the entire search range is covered by moving the clipping position. When the process on search range is not complete yet (S6: No), the process by image matching section 102 returns to step S4. As a result, image matching section 102 moves the clipping position in the search range such that a clipping region for the unit reference image shifts in step S4. The process is performed as described above, and the process from step S4 to S6 is repeated until the process on the search range ends (S6: Yes).

<Determining Corresponding Point>

In step S7, image matching section 102 determines a clipping position for a unit reference image having the maximum matching degree, based on matching degrees obtained by the process in steps S4 to S6. When the difference in intensity is used as the matching degree, image matching section 102 determines the clipping position for the unit reference image having the local minimum or minimum difference in intensity. Image matching section 102 subsequently determines a clipping position having the maximum matching degree as the corresponding point in the reference image for the target point.

The process from step S2 to S7 will be described in detail.

Figures 6A, 6B, 6C:
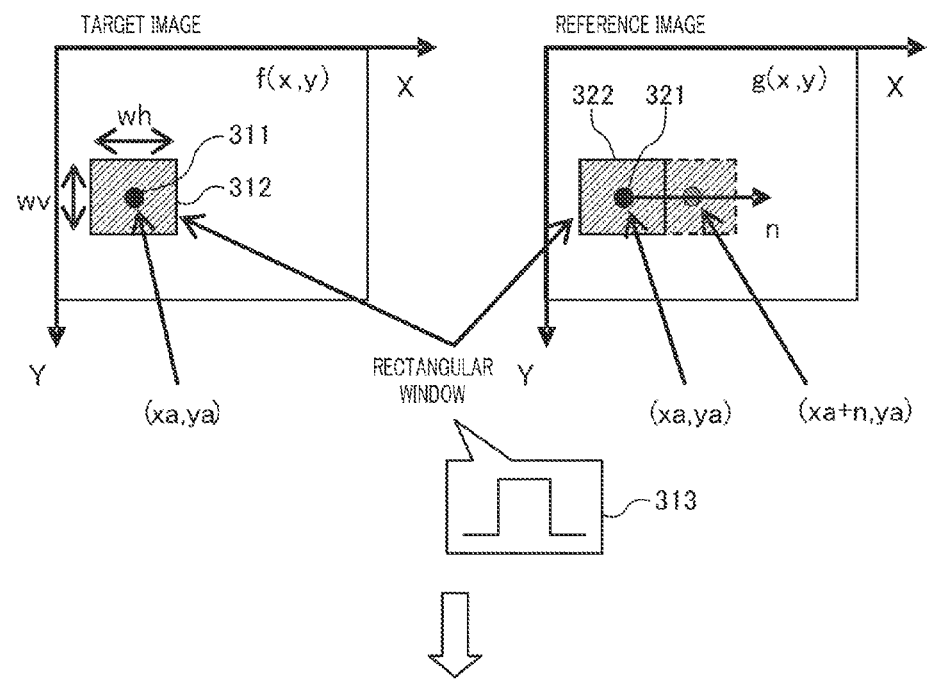
FIGS. 6A to 6C are schematic diagrams illustrating an overview of a process from clipping an image range to determining corresponding points in Embodiment 2 of the present invention.

FIGS. 6A to 6C are schematic diagrams illustrating an overview of the process from clipping the image range to determining the corresponding point.

As illustrated in FIG. 6A, image matching section 102 clips a partial image having the reference point (xa, ya) 311 and including the region around the center as unit target image 312 in step S2. Rectangular window 313 in a predetermined size (length: wv pixels, width: wh pixels) is used for clipping unit target image 312. Note that, the description is made so as to match the center of rectangular window 313 and the position of target point 311. However, the center does not necessarily have to be precise, and target point 311 may be present around the center of rectangular window 313.

Subsequently, in step S3 described above, image matching section 102 determines the search range and the search starting position in the reference image, based on the position of the target point determined in step S1. For example, the coordinates identical to the target point in the target image (xa, ya) are used for the search starting position (the initial coordinate for clipping unit reference image in the reference image). Image matching section 102 subsequently clips, from clipping position 321, an image having the search starting position as the center and including the region around the center from the reference image as unit reference image 322 in step S4, as illustrated in FIG. 6B. A rectangular window identical to rectangular window 313 used for clipping the unit target image is used for clipping unit reference image 322.

Subsequently, image matching section 102 calculates a matching degree between unit target image 312 and each unit reference image 322 in step S5 described above. An SAD value representing difference in intensity is used for the matching degree, for example. The SAD value is calculated by the following (Equation 1).

[1]

$$SAD(n) = \sum_{j=ya-wv/2}^{ya+wv/2} \sum_{i=xa-wh/2}^{xa+wh/2} |f(x+i, y+h) - g(x+i+n, y+j)| \quad \text{(Equation 1)}$$

When it is determined that the search range has not ended yet in step S6 described above, image matching section 102 clips a new unit reference image 323 from the reference image, after shifting the clipping position as illustrated in FIG. 6B. The clipping position is shifted by one pixel here. The direction of the shift is in the direction of the rightward arrow extending from the coordinates (xa, ya) of the reference image in FIG. 6B.

With the process described above, image matching section 102 calculates a matching degree of a plurality of unit reference images for one unit target image 312. Subsequently, image matching section 102 determines a unit reference image having the maximum matching degree in step S7, based on matching degrees obtained by the process in steps S4 to S6. More specifically, image matching section 102 determines unit reference image 323 having the maximum matching degree (for example, having the minimum SAD value) among the plurality of matching degrees. When the coordinates of clipping position 323 for the specified unit reference image are (xa+n, ya), n is equal to the shift amount in the pixel level. Image matching section 102 subsequently determines clipping position 323 having the maximum matching degree as the corresponding point in the reference image for target point 321.

Note that, the index of the matching degree is not limited to the SAD value, and any index that can be used as the index of matching degree may be used. For example, image matching section 102 may use SSD (Sum of Squared Differences) as an index of matching degree.

Specific description on the process from step S2 to S7 is as described above.

<Sub-pixel Level Operation>

In step S8 in FIG. 5, filtering section 103 and peak position detecting section 104 perform sub-pixel level operation based on the corresponding point in the reference image obtained in step S7 and the target image and the reference image received from stereo image obtaining section 101.

Figure 7:
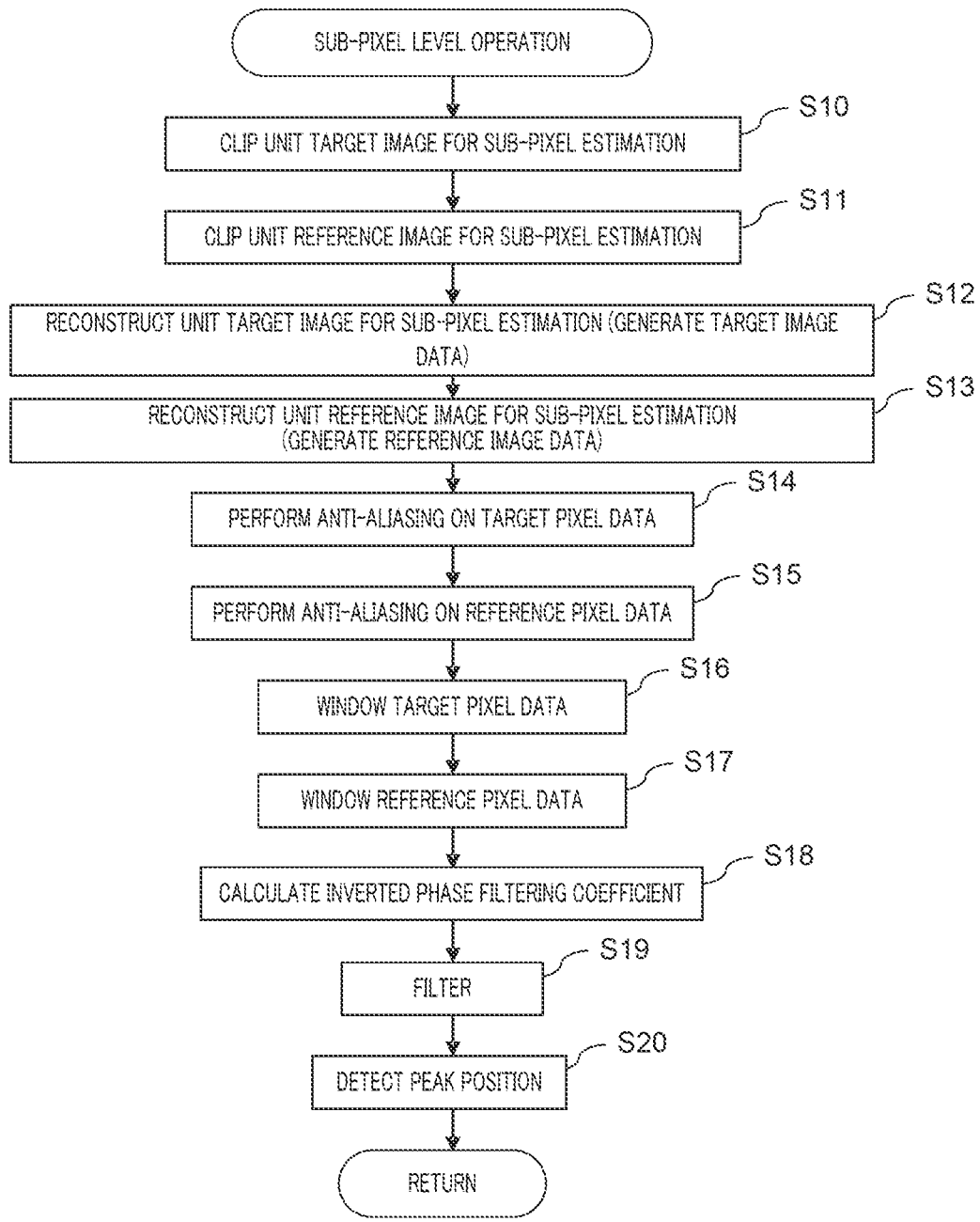
FIG. 7 is a flowchart illustrating an example of sub-pixel level operation according to Embodiment 2 of the present invention.

FIG. 7 is a flowchart illustrating the details of the sub-pixel level operation.

<Clipping Unit Target Image for Sub-pixel Estimation>

In step S10, filtering section 103 clips a partial image having the target point as the center and including the region around the center as the unit target image for sub-pixel estimation. Rectangular window 313 similar to the window used for clipping the unit target image described above is used for clipping the unit target image for sub-pixel estimation.

<Clipping Unit Reference Image for Sub-pixel Estimation>

In step S11, filtering section 103 clips, from the reference image, a partial image having the corresponding point detected in step S7 as the center as the unit reference image for sub-pixel estimation. The rectangular window used for the unit target image for sub-pixel estimation is also used for clipping the unit reference image for sub-pixel estimation. Note that, the rectangular window is set to have the corresponding point (xa+n, ya) as the center.

Note that, the size of the rectangular window may be different from the size of the rectangular window used for clipping the unit target image. In the embodiment, the unit target image for sub-pixel estimation is described as being newly clipped from the target image. However, the unit target image used by image matching section 102 may be used as a unit target image for sub-pixel estimation without any change.

<Reconstructing Unit Target Image for Sub-pixel Estimation>

In step S12, image reconstructing section 202 reconstructs the unit target image for sub-pixel estimation to one-dimensional image data. More specifically, image reconstructing section 202 generates "target pixel data" by reconstructing a pixel value in each pixel in the unit target image for sub-pixel estimation to one-dimensional image data according to the reconstruction rule.

<Reconstructing Unit Reference Image for Sub-pixel Estimation>

In step S13, image reconstructing section 202 reconstructs a unit reference image for sub-pixel estimation to one-dimensional image data. More specifically, image reconstructing section 202 generates "reference pixel data" by reconstructing a pixel value in each pixel in the unit reference image for sub-pixel estimation to one-dimensional image data according to a reconstruction rule.

FIGS. 8A to 8C are schematic diagrams illustrating a concept of an example of the reconstruction rule.

As illustrated in FIG. 8A, unit target image for sub-pixel estimation (unit reference image for sub-pixel estimation) 332 in target image (reference image) 331 has a size of 4 pixel rows×4 pixel columns=pixel count 16 including target point (corresponding point) 333. Note that, the unit target image for sub-pixel estimation (unit reference image for sub-pixel estimation) 332 is in this size because the size of the image region is small and the amount of information in the baseline-length direction is assumed to be small, such as a pedestrian far away from the stereo camera. However, it is not limited to this example.

For simplicity of explanation, the numbers (1) to (16) representing the order of scanning unit target image for sub-pixel estimation (unit reference image for sub-pixel estimation) 332 are used as numbers representing the pixels.

More specifically, the first pixel row includes "(1) (2) (3) (4)" from left to right, and the second pixel row includes "(5) (6) (7) (8)" from left to right. Similarly, the third pixel row includes "(9) (10) (11) (12)" from left to right, and the fourth pixel row includes "(13) (14) (15) (16)" from left to right.

The first pixel column includes "(1) (5) (9) (13)" from top to bottom, and the second pixel column includes "(2) (6) (10) (14)" from top to bottom. The third pixel column includes "(3) (7) (11) (15)" from top to bottom, and the fourth pixel column includes "(4) (8) (12) (16)" from top to bottom.

Image reconstructing section 202 reconstructs the arrangement of pixel values in the pixels as illustrated in FIG. 8C, in an order of scanning the pixels downward from upper left while shifting columns toward the right, as illustrated in FIG. 8B. More specifically, image reconstructing section 202 arranges pixel values of the pixels one-dimensionally in the pixel order "(1) (5) (9) (13) (2) (6) (10) (14) (3) (7) (11) (15) (4) (8) (12) (16)". Image reconstructing section 202 determines the data obtained by arranging into one dimension as target pixel data (reference pixel data) 334.

In target pixel data (reference pixel data) 334 reconstructed as described above, the ratio of distances 335 between adjacent pixels in the first pixel row "(1) (2) (3) (4)" remains as "1:1:1", for example.

In all of the pixel rows including the first pixel row "(1) (2) (3) (4)", the distance between adjacent pixels is expanded to three pixels. Accordingly, target pixel data (reference pixel data) 334 has horizontal (pixel row direction) component upsampled.

Note that, in the example described above, the arrangement of pixels after the reconstruction is "(1) (5) (9) (13) (2) (6) (10) (14) (3) (7) (11) (15) (4) (8) (12) (16)". However, it is not limited to this example. The distance between adjacent pixels in each pixel row before the reconstruction may be identical in the pixel array after the reconstruction. More specifically, the arrangement of pixels after the reconstruction may be "(1) (9) (5) (13) (2) (10) (6) (14) (3) (11) (7) (15) (4) (12) (8) (16)", "(5) (1) (9) (13) (6) (2) (10) (14) (7) (3) (11) (15) (8) (4) (12) (16)", for example.

With the upsampling described above, it is possible to use information in the region above and below the target point and the corresponding point, and to increase the number of pixel data items used for calculating disparity. In addition, by increasing the number of pixel data items used for calculating the disparity, it is possible to reduce influence on calculation of disparity using the second window function to be applied in the later stage. Stated differently, stereo image processing apparatus 100 is capable of calculating a disparity robust to noise.

However, by the upsampling, the component in the vertical direction (pixel column direction) is evenly spaced. At the same time, signals having high-frequency component that is not supposed to be present on an image (aliasing) occurs at the same time. Accordingly, stereo image processing apparatus 100 performs anti-aliasing to be described as follows.

<Anti-aliasing on Target Pixel Data>

In step S14 in FIG. 7, anti-aliasing section 203 performs anti-aliasing on the target pixel data. The anti-aliasing is a process for removing the aliasing that appears due to upsampling.

\<Anti-aliasing on Reference Pixel Data\>

In step S15, anti-aliasing section 203 performs anti-aliasing on the reference pixel data.

Figure 9A:
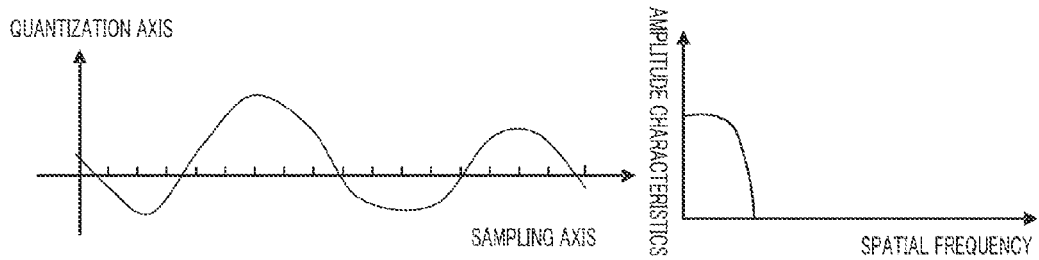
FIGS. 9A to 9C are schematic diagrams for illustrating anti-aliasing according to Embodiment 2 of the present invention.
Figure 9B:
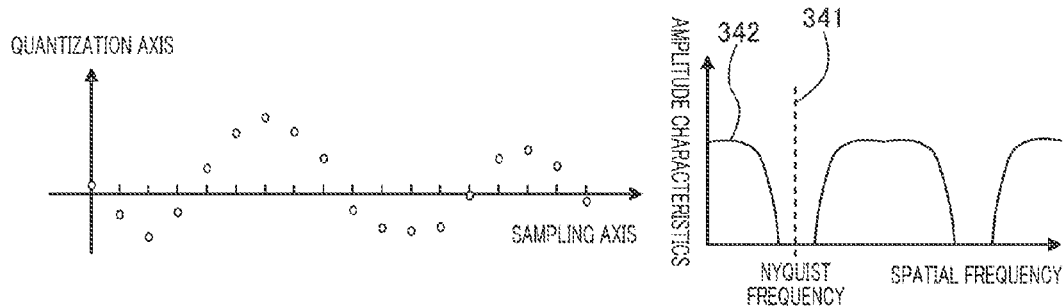
Figure 9C:
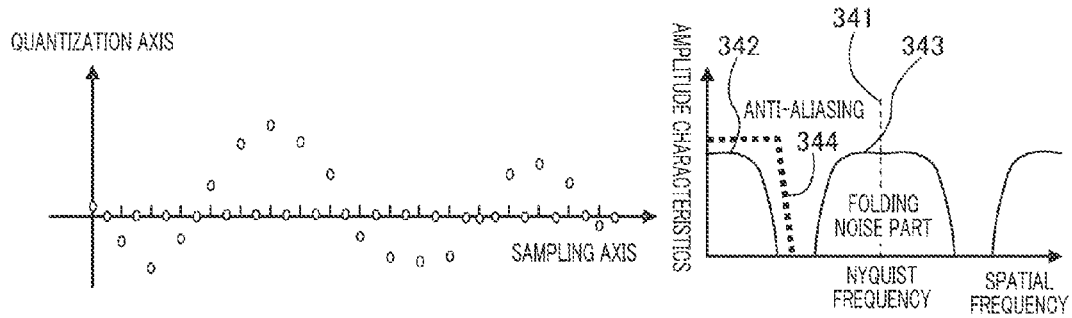

FIGS. 9A to 9C are schematic diagrams for describing anti-aliasing.

Here, it is assumed that a signal waveform and amplitude characteristics of the target pixel data and the reference pixel data before the conversion into image signals are as illustrated in FIG. 9A. By sampling the signal waveform, the signal is discretized as illustrated in FIG. 9B, and amplitude characteristics 342 which is the same as the original signal appears in a frequency lower than the Nyquist frequency 341 which is half of the sampling frequency. Accordingly, if the sampled signal is upsampled twice, the Nyquist frequency is doubled, and folding noise (aliasing) 343 due to sampling appears, as illustrated in FIG. 9C.

Peak position detecting section 104 in the later stage calculates a disparity based on a correlation between the target pixel data and the reference pixel data. Accordingly, the disparity cannot be calculated highly precisely unless the folding noise is removed.

In view of the problem, anti-aliasing section 203 applies low-pass filter 344 having a frequency half of the Nyquist frequency as a cutoff frequency to the target pixel data and the reference pixel data. With this, anti-aliasing section 203 can obtain upsampled signals having the same amplitude characteristics 342 as the original signal.

Note that, the cutoff frequency of the low-pass filter is dependent on the number of pixel rows (height) of the unit target image for sub-pixel estimation and the unit reference image for sub-pixel estimation. For example, anti-aliasing section 203 sets the cutoff frequency of the low-pass filter at ½ of the Nyquist frequency when the number of pixels rows is two, and sets the cutoff frequency of the low-pass filter at ⅓ of the Nyquist frequency when the number of the pixel rows is three. Accordingly, anti-aliasing section 203 may actively change the cutoff frequency of the low-pass filter according to the sampling frequency for the upsampling in image reconstructing section 202.

\<Windowing Target Pixel Data\>

In step S16 in FIG. 7, windowing section 204 windows the target pixel data on which anti-aliasing is performed, using the second window function. The second window function is, for example, window function w (m) of Hanning window represented by Equation 2. N denotes the number of taps (the number of pixels in the target pixel data). m denotes a position in the Hanning window.

[2]
$$w(m) = \frac{1}{2}\left\{\cos\left(\pi\frac{m}{N}\right) + 1\right\}$$ (Equation 2)

\<Windowing Reference Pixel Data\>

In step S17, windowing section 204 windows the reference pixel data on which anti-aliasing is performed, using the window function similar to the window function used for the target pixel data on which anti-aliasing is performed.

Note that, here, a window function of the Hanning window is used for description. However, the present invention is not limited to this example, and the Hamming window, the Blackman window, the Kaiser window and others may be used as the window function. The window function is selected according to characteristics to be focused on, among characteristics of the unit target image for sub-pixel estimation (for example, frequency power characteristics, phase characteristics, and cutting edge continuity). For example, the Kaiser window is suitable for focusing on the phase characteristics. However, the Kaiser window would make the operation very complicated. In contrast, the Hanning window is suitable for reducing the computational complexity.

Here, it is important for the operation in the sub-pixel level not to include noise in the clipped image, because it is important to calculate the shift amount in the sub-pixel level highly accurately. In contrast, image clipping by image matching section 102 is performed on the pixel bases, for example. For this reason, reduction in the number of operations is more important than the accuracy of image clipping.

Accordingly, the window function merely clipping the image data is used as the first window function used in image matching section 102. In contrast, it is important for the second window function used for operation in sub-pixel level to have small amount of noise. Accordingly, it is preferable for the second window function to be a function having a continuous change at the ends of the window (function having zero as values at the ends of the window).

By using the second window function, continuity in the target pixel data and the reference pixel data is maintained, and the noise component due to clipping, included in the characteristics of the inverted phase filter to be described is reduced. Note that, comparison of frequency characteristics between the first window function and the second window function shows that the first window function has a narrower main-lobe and a wider side-lobe than the second window function.

\<Calculating Inverted Phase Filtering Coefficient\>

In step S18, filtering section 103 calculates the inverted phase filtering coefficient from the target pixel data on which the folding noise is removed and the windowing is performed. More specifically, filtering section 103 sorts the signal column in a reverse order by inverting the position of the pixel values in the target pixel data on which the folding noise is reduced and windowing is performed in the arrangement direction.

\<Filtering\>

In step S19, filtering section 103 filters, using the inverted phase filtering coefficient calculated in step S16, the reference pixel data on which the folding noise is removed and windowing is performed.

\<Detecting Peak Position\>

In step S20, peak position detecting section 104 can calculate the shift in sub-pixel level between the target image and the reference image (disparity) based on the peak position detected by the filtering result. Subsequently, stereo image processing apparatus 100 returns to the process in FIG. 5.

Here, the process from step S10 to S20 will be described.

First, the overview of the process from reconstructing the image range to filtering will be described.

Figures 10A, 10B, 10C:
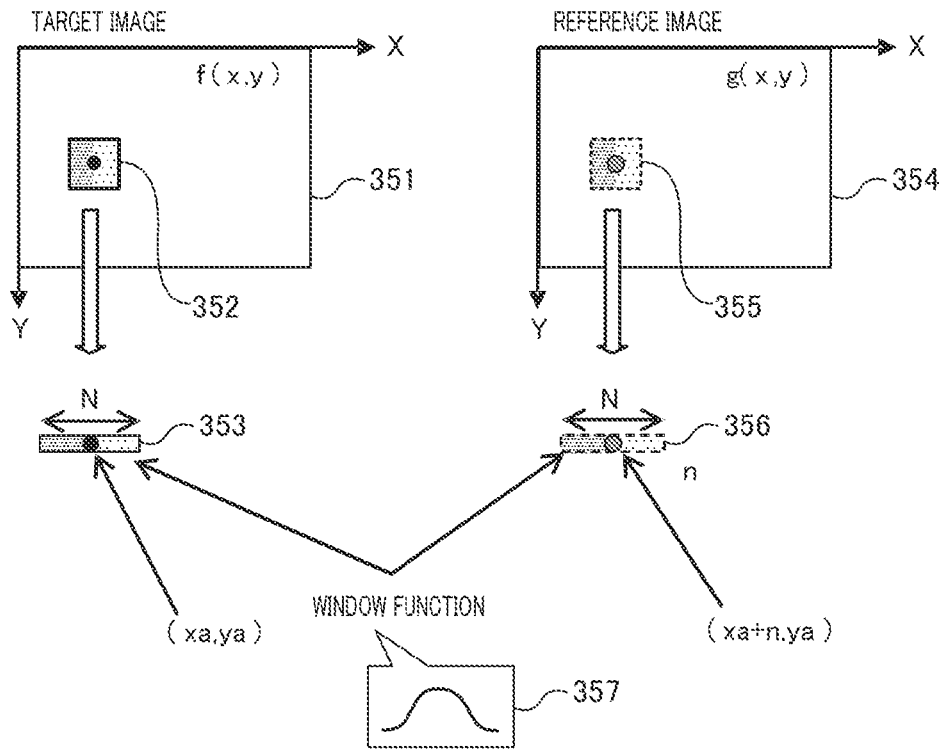
FIGS. 10A to 10C are schematic diagrams illustrating an overview of a process from reconstructing an image range to filtering according to Embodiment 2 of the present invention.

FIGS. 10A to 10C are schematic diagrams illustrating the overview of the process from reconstructing the image range to filtering.

As illustrated in FIG. 10A, image reconstructing section 202 reconstructs unit target image for sub-pixel estimation 352 clipped from target image 351 to target pixel data 353 composed of N pixel values. As illustrated in FIG. 10B, image reconstructing section 202 reconstructs unit reference image 355 for sub-pixel estimation clipped from reference image 354 to reference pixel data 356 composed of N pixel values. Anti-aliasing section 203 performs anti-aliasing on target pixel data 353 and reference pixel data 356 separately.

Subsequently, windowing section 204 uses the Hanning window having the size of N pixels with the target point (xa, ya) and the corresponding point (xa+n, ya) as second window function w (m) 357. Note that, the size of second window function w (m) is not limited to N.

It is not necessary for filter generating section 205 to calculate an inverted phase filtering coefficient separately, and calculation for obtaining the filtering result when the inverted phase filtering coefficient is applied may be performed. More specifically, filter generating section 205 performs filtering using the following Equation (3), for example. Here, f" (m) represents a pixel value of the target image, and g" (m) represents a pixel value of the reference image.

[3]
$$z(m) = \sum_{k=J}^{K} f'(-k) \times g'(m-k) \quad \text{(Equation 3)}$$

The overview of the process from reconstructing the image range to filtering is as described above.

Next, the concept of filtering will be described.

Figure 11A:
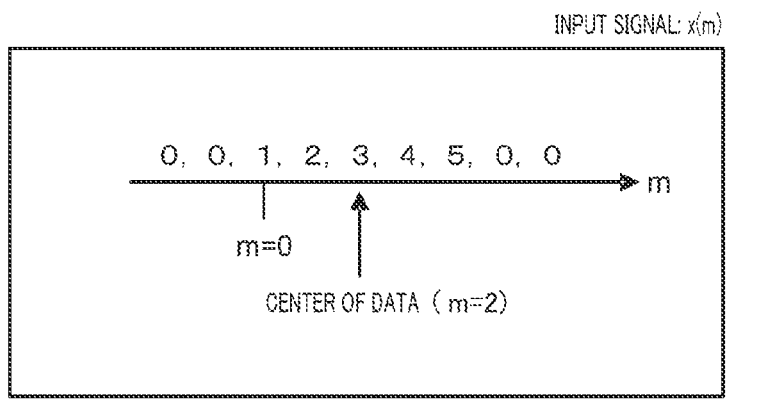
FIGS. 11A to 11C are schematic diagrams for illustrating filtering using an inverted phase filtering coefficient according to Embodiment 2 of the present invention.
Figure 11B:
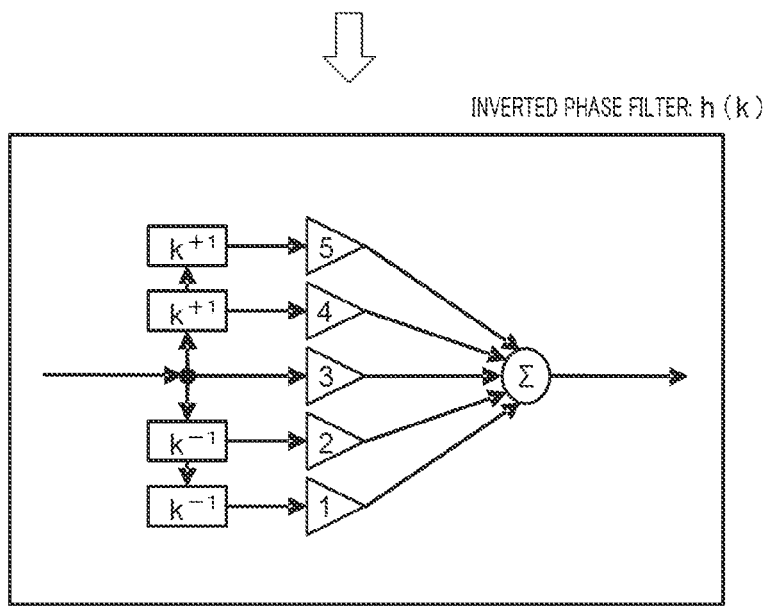
Figure 11C:
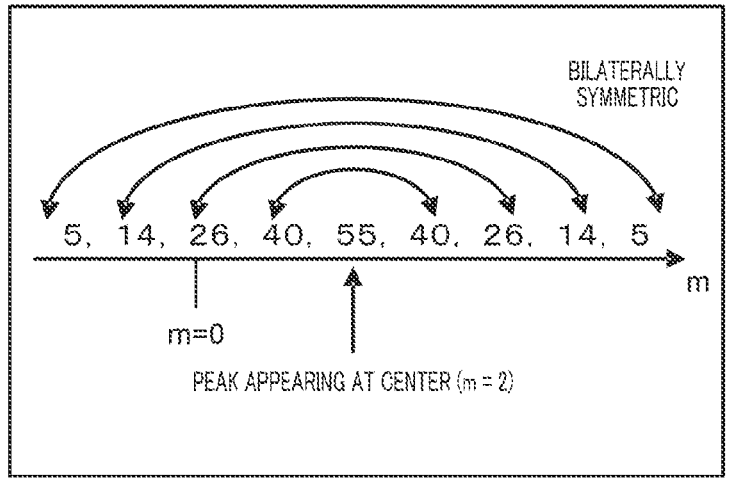

FIGS. 11A to 11C are schematic diagrams for describing the concept of filtering using the inverted phase filtering coefficient.

In the embodiment, the length (N) of the window function w (m) is 5 pixels. Subsequently, target pixel data on which the folding noise is removed and windowing is performed is "1, 2, 3, 4, 5", as illustrated in FIG. 11A. In addition, the reference pixel data x (m) on which the folding noise is removed and windowing is performed is "1, 2, 3, 4, 5". The pixel value used for filtering is a intensity value.

When the target pixel data is "1, 2, 3, 4, 5", filtering section 103 calculates "5, 4, 3, 2, 1", using the inverted phase filtering coefficient h (k).

Subsequently, filtering section 103 filters the reference pixel data using inverted phase filtering coefficient h (k), as illustrated in FIG. 11B.

More specifically, the filtering process is performed as follows. When a coordinate of given composition signals in the reference pixel data is k, filtering section 103 filters a signal sequence having a coordinate "k−2, k−1, k, k+1, k+2", and calculates a total sum of the multiplication as filtering result z (m). Here, m is an integer from 0 to 4.

Here, in consideration of a virtual coordinate point having a pixel value of 0, present outside of the sides of the reference pixel data, reference pixel data x (m) is "0, 0, 1, 2, 3, 4, 5, 0, 0", as illustrated in FIG. 11A. When m (m: 0 to 4) in FIG. 11A is considered as a coordinate point in the reference pixel data, the filtering is performed as follows.

When m=0, filtering section 103 filters a pixel value signal column "0, 0, 1, 2, 3" having m=0 as the center by the inverted phase filter "5, 4, 3, 2, 1". As a result, z (0) is 26 (=0×1+0×2+1×3+2×4+3×5).

When m=1, filtering section 103 also filters a pixel value signal column "0, 1, 2, 3" having m=1 as the center by the inverted phase filter "5, 4, 3, 2, 1". As a result, z (1) is 40 (=0×1+1×2+2×3+3×4+4×5).

As a result of the calculation in the same manner, z (2) is 55, z (3) is 40, and z (4) is 26.

Accordingly, filtering section 103 obtains "26, 40, 55, 40, 26" as the result of filtering z (m).

The filtering is represented by Equation 3 described above. In Equation 3, f' (−k) with the target pixel data inverted is used as filtering coefficient h (k) of the inverted phase filter. g' (m) denotes a pixel value of the reference pixel data.

Filtering result z (m) by filtering using the inverted phase filter has a feature that the filtering result z (m) is symmetric (in FIG. 11C, horizontally symmetric having m=2 as the center), and the peak exist near the center as illustrated in FIG. 11C.

The inverted phase filter corresponds to a type of FIR filter, and characterized in that the inverted phase filter is the linear shift invariant system. Here, the linear shift invariant system refers to a system with which the output signal has a shift of the same amount as the shift in the input signal.

In the specific example described above, an example in which there is no shift between the target pixel data and the reference pixel data. However, when the shift smaller than the sampling distance is present in the reference pixel data with respect to the target pixel data, the same shift is present in z (m) which denotes the filtering result.

Note that, when calculating the disparity of an object of the same size in the real space, the disparity is reduced in the case where the object is far from the stereo camera than in the case where the object is close to the stereo camera, and the shift amount n in the pixel level is reduced as well. At the same time, the size of image region of the object on the stereo image in the baseline-length direction is reduced as well.

Accordingly, it is preferable for stereo image processing apparatus 100 to set the number of taps in the inverted phase filter according to the size of shift amount n in the pixel level detected by image matching section 102.

For example, when the shift amount n in the pixel level is small, the tap length of the inverted phase filter is set to be short accordingly. Stated differently, when calculating the disparity of the image in the same size in the real space, the disparity is smaller and the shift amount n in the pixel level is smaller in the case where the object is far from the stereo camera than in the case where the object is close to the stereo camera. At the same time, the size of the image region captured in the stereo image is small. Accordingly, the tap length of the inverted phase filter may be adaptively changed by changing the size of the unit target image for sub-pixel estimation and the unit reference image for sub-pixel estimation according to the amount of shift n. With this, a disparity adjusted to the size of the object to be ranged can be calculated.

The filtering result is the output of the linear shift invariant system. Accordingly, the filtering result theoretically represents the true shift amount except for the error in correcting distortion of a lens, an error including gain noise caused by an image sensor such as CCD, and an error in the operation accuracy when clipping an image by windowing. Therefore, a true peak position on the sub-pixel level can be calculated from output of the inverted phase filter discretized per pixel, by interpolating numbers between pixels according to a sampling theorem The description on the concept of filtering is as described above.

The concept of peak position detection in the filtering result will be described next.

Figure 12:
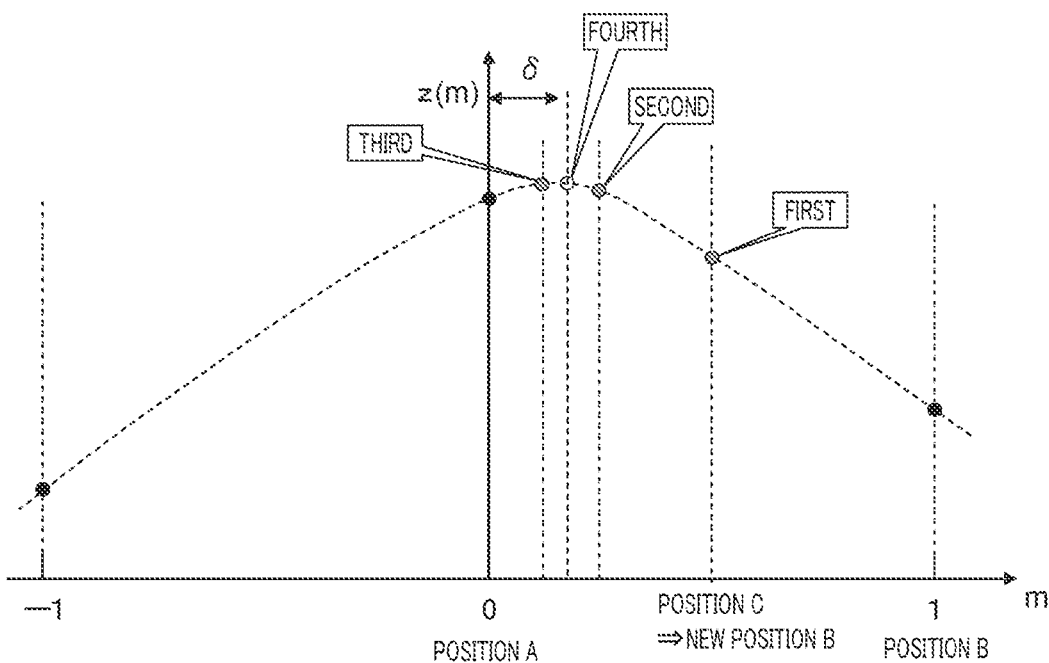
FIG. 12 is a schematic diagram illustrating an overview of an example of the process using sinc function according to Embodiment 2 of the present invention.

FIG. 12 is a schematic diagram illustrating an overview of an example of a process for detecting the position of a peak, using a sinc function.

Sinc function is a function defined by sin (πx)/πx, and is a function used for returning discrete sampling data into original contiguous data. The sampling theorem proves that the original contiguous data can be fully recovered by performing convolution operation of sampled discrete data and sinc function.

Accordingly, peak position detecting section 104 performs convolution operation using sinc function on discrete filtering results. With this, peak position detecting section 104 can interpolate signal data of a distance per pixel, and derives a true peak position of the filtering result z (m) with signal data interpolated theoretically on the sub-pixel level.

As illustrated in FIG. 12, peak position detecting section 104 detects a peak position of the filtering result by a binary search, for example.

For example, peak position detecting section 104 uses a position m=0 (position A) where the filtering result z (m) is the maximum as a target point for the binary search. Peak position detecting section 104 compares z (+1) and z (−1) which are filtering results of the position shifted by one pixel to the left and right from the target point for the binary search (position A). Peak position detecting section 104 determines a position with a larger filtering result (here, position B where m=1) as a point used for the binary search.

Peak position detecting section 104 calculates a value of position C which is a midpoint between the binary search target point (position A) and the point used for the binary search (position B) using Equation 4, based on the sampling theorem. Note that, T is a sampling distance (pixel pitch).

[4]
$$f(m) = \sum_{n=-\infty}^{\infty} f(nT) \frac{\sin\left(\pi\left(\frac{m}{T} - n\right)\right)}{\pi\left(\frac{m}{T} - n\right)} \quad \text{(Equation 4)}$$

Peak position detecting section 104 repeats the process as described above using position C as a new target point for the binary search.

The number of repeat of this process may be a number according to a necessary accuracy. More specifically, peak position detecting section 104 may perform the process described above once, if the necessary sub-pixel accuracy is ½ pixel. Peak position detecting section 104 may determine the number of repeat according to the necessary sub-pixel accuracy, for example, twice if the necessary sub-pixel accuracy is ¼ pixel, and three times if the necessary sub-pixel accuracy is ⅛ pixel.

Peak position detecting section 104 uses the midpoint obtained at the end as the detected peak position δ.

Note that, in the description above, the peak position was detected using the sinc function and the binary search. However, the present invention is not limited to this example, and peak position detecting section 104 may search a peak position based on a combination of the sinc function and the gradient method. More specifically, peak position detecting section 104 can use various maximum value detecting methods after performing, using the sinc function, convolution operation on the discrete filtering result so as to interpolate the signal data in the distance between pixel units.

Alternatively, peak position detecting section 104 may detect a peak position of the filtering result using approximation on the quadratic curve. With this, peak position detecting section 104 can reduce the complexity for calculating the peak position. In this case, peak position detecting section 104 fits the discrete filtering result into the quadratic curve, and detects a position of the local maximum value of the quadric curve as the peak position. With this, peak position detecting section 104 can calculate the peak position of the filtering result at accuracy smaller than or equal to the distance for the discretization.

Figure 13:
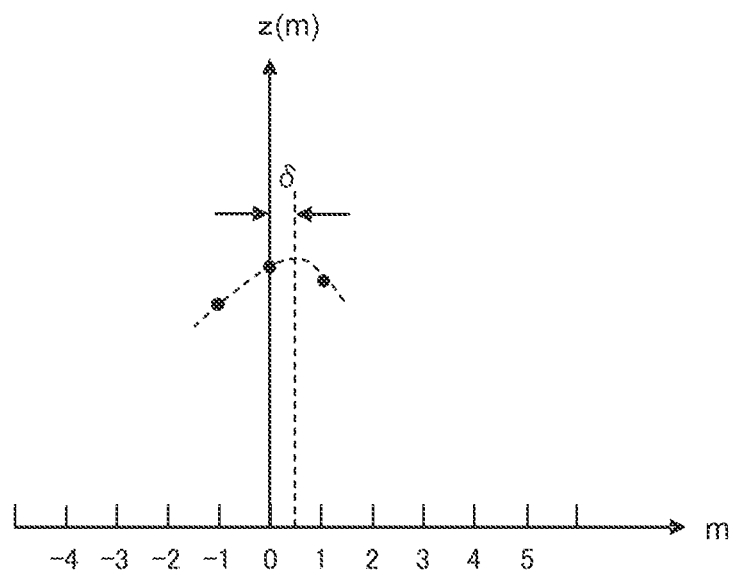
FIG. 13 is a schematic diagram illustrating an overview of an example of process for detecting a peak position using a quadratic curve approximation according to Embodiment 2 of the present invention.

FIG. 13 is a schematic diagram illustrating an overview of an example of process for detecting the peak position in the filtering result using the approximation on the quadratic curve.

As illustrated in FIG. 13, peak position detecting section 104 first calculates value z (0) at position m=0, which makes the filtering result z (m) in units of pixels. Peak position detecting section 104 also obtains z (+1), z (−1), which are filtering results of the positions m=+1, −1, shifted by one pixel from the maximum position m=0 to the left and right, respectively. Subsequently, peak position detecting section 104 calculates a quadratic curve passing through the three points, and detects a position where the quadratic curve is at its local maximum value as peak position δ of the filtering result. The peak position δ can be calculated using the following Equation 5.

[5]
$$\delta = \frac{z(-1) - z(+1)}{2 \times \{z(-1) + z(+1) - 2 \times z(0)\}} \quad \text{(Equation 5)}$$

Note that, in the target pixel data and the reference pixel data, pixel values in the pixel row direction are upsampled as much as the number of pixel rows used for reconstructing the image. Accordingly, peak position δ in the calculated filtering result is calculated by multiplying as many times as the number of pixel rows used for image reconstruction. Stated differently, shift amount δ in the sub-pixel level is calculated by dividing peak position δ of the filtering result by the number of pixel rows used for reconstructing image.

The disparity from the target point in the target image is calculated by adding shift amount n on the pixel level and the shift amount δ' on the sub-pixel level.

The overview of the process for detecting the peak position in the filtering result is as described above. Specific description on the process from step S10 to S20 is as described above.

Note that, the order in the process from step S10 to S17 is not limited to the order illustrated in the flowchart in FIGS. 7. S10, S12, S14, and S16 which are processes regarding the target image and S11, S13, S15, and S17 which are processes regarding the reference image are executed in order, respectively, and the process from S10 to S17 is complete before S18.

<Determining End of Region to be Ranged>

In step S9, image matching section 102 determines the end of a region to be ranged. Stated differently, image matching section 102 determines whether or not an unprocessed region where the process from step S1 to step S8 has not been performed is present in the entire target image. When the unprocessed region is present (S9: no), image matching section 102 returns to step S1, and performs the process from step S1 to step S8, shifting the position of the target point. Image matching section 102 ends the series of operation when an unprocessed region does not exist (S9: yes).

With the operation described above, stereo image processing apparatus 100 can reconstruct the image range including a plurality of pixel rows×a plurality of pixel column in the target image and the reference image into one-dimensional target pixel data and reference pixel data by upsampling the component in the baseline-length direction. Stereo image processing apparatus 100 can calculate a peak position in the reference pixel data having the highest correlation with the target point in the target pixel data highly precisely by performing anti-aliasing and applying a window function. With this process, stereo image processing apparatus 100 can calculate a disparity highly precisely.

The description of the operation of stereo image processing apparatus 100 is as described above.

As described above, stereo image processing apparatus 100 according to Embodiment 2 can reconstruct an image range composed of a plurality of rows×a plurality of columns to one-dimensional pixel data by upsampling components in at least one of the pixel row direction and the pixel column direction. Subsequently, stereo image processing apparatus 100 can calculate a disparity based on a correlation between the target pixel data obtained from the target image and the reference pixel data obtained from the reference image. With this, stereo image processing apparatus 100 can calculate a disparity highly accurately for an object having a small image region size in the baseline-length direction, since a longer pixel data column used for calculating the disparity is secured, compared to the conventional technology.

Stereo image processing apparatus 100 also generates the target pixel data and the reference pixel data by at least upsampling the component parallel to the baseline-length direction (horizontal direction) of the stereo image. With this, stereo image processing apparatus 100 can calculate the disparity highly accurately for an object having a shape elongated in the vertical direction or an object having a small image region size in the baseline length direction such as a pedestrian on the street.

In addition, stereo image processing apparatus 100 obtains a corresponding point in the reference image to the target point in the target image by the image matching, and determines a partial region around the corresponding point as a target for generating the one-dimensional pixel data. Accordingly, stereo image processing apparatus 100 can calculate the disparity effectively and with higher accuracy.

Furthermore, stereo image processing apparatus 100 performs filtering by the inverted phase filtering coefficient, and calculates a position where the filtering result is at its peak as the shift amount from the target pixel data and the reference pixel data (disparity between the target point and the corresponding point). With this process, stereo image processing apparatus 100 can calculate a disparity highly precisely.

Furthermore, stereo image processing apparatus 100 calculates a correlation between the target pixel data and the reference pixel data after performing anti-aliasing and windowing. With this, stereo image processing apparatus 100 can increase the amount of information without changing the frequency characteristics of the input stereo image, which allows further improvement on the accuracy for calculating the disparity. Stated differently, stereo image processing apparatus 100 can reduce the influence of the second window function on information held by one-dimensional pixel data column, since it is possible to secure, using information in the vertical direction in the image, a long pixel data column used for calculating disparity. Subsequently, stereo image processing apparatus 100 removes the folding noise by anti-aliasing, as described above. Accordingly, stereo image processing apparatus 100 can combine pixel data in a plurality of pixel rows while maintaining frequency characteristics (amplitude characteristics and phase characteristics) of each pixel row.

Note that, the reconstruction rule is not limited to the example described in FIGS. 8A to 8C. For example, the reconstruction rule is applicable to a case when the stereo image is a color image and the image data is in the Bayer pattern. The reconstruction rule to be applied on the image data in the Bayer pattern can be configured to generate one-dimensional pixel data by extracting at least one of an R-pixel value (a pixel value in red), a G-pixel value (a pixel value in green), and a B-pixel value (a pixel value in blue) from an image range. In the image in the Bayer pattern, the R-pixel value, the G-pixel value and the B-pixel value are arranged in equal intervals, and the upsampling can be simplified by the arrangement.

Figure 14:
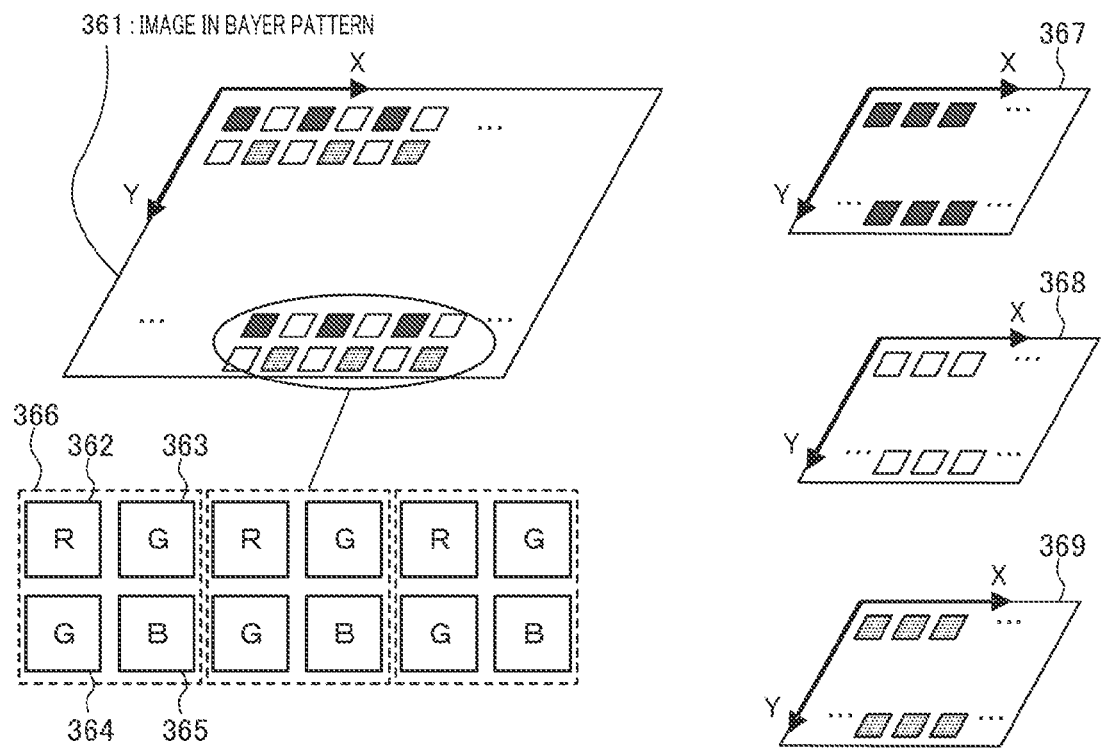
FIG. 14 is a schematic diagram illustrating a configuration of an image in the Bayer pattern according to Embodiment 2 of the present invention.

FIG. 14 is a schematic view illustrating the configuration of the image in the Bayer pattern.

As illustrated in FIG. 14, Bayer-pattern image 361 is composed of composition units 366 each include R-pixel 362, G-pixel 363, G-pixel 364, and B-pixel 365 as one composition unit (hereafter referred to as "color pixel unit"). Bayer-pattern image 361 includes R-data 367, G-data 368, and B-data 369. R-data 367 is image data including only the pixel value of R-pixel 362. G-data 368 is image data including only the pixel value of G-pixel 363 or 364. B-data 369 is image data including only the pixel value of B-pixel 365.

For example, R-pixel 362 is arranged every other pixel in the pixel row direction. The same arrangement applies to other G-pixels 363 and 364, and B-pixel 365.

In response, for each of the target image and the reference image, image reconstructing section 202 clips an image range from G-data 368, and generates the target pixel data and the reference pixel data described above.

FIGS. 15A to 15C are schematic diagrams illustrating an example of upsampling on Bayer-pattern image 361.

As illustrated in FIG. 15A, suppose there is a case in which color pixel unit 366 in one unit row is an image range for generating the one-dimensional pixel data. In this case, image reconstructing section 202 upsamples G-pixel values by extracting a G-pixel value for each pixel row and by performing linear combination on a plurality of G-pixel values extracted.

As illustrated in FIG. 15B, suppose there is a case in which color pixel unit 366 in one unit row is an image range for generating the one-dimensional pixel data. In this case, image reconstructing section 202 upsamples G-pixel values by extracting a G-pixel value for each pixel row and by performing linear combination on a plurality of G-pixel values extracted after interpolating zeros.

In this example, image reconstructing section 202 interpolates two zeros immediately before each boundary of color pixel units 366 for the G-pixel values in the first pixel row and the fourth pixel row, and interpolates two zeros immediately after each boundary of color pixel units 366 for G-pixel values in the second pixel row and the third pixel row.

Note that, as illustrated in FIG. 15C, image reconstructing section 202 extracts a pixel value in a certain color for each pixel row. Subsequently, image reconstructing section 202 can upsample pixel values in all colors by linearly combining extracted G-pixel values, B-pixel values, and R-pixel values after interpolating zeros. Different one-dimensional pixel data is obtained depending on the positions of zero interpolation, as illustrated in FIG. 15C.

As described above, stereo image processing apparatus 100 can perform upsampling easily by using characteristics of the image in the Bayer pattern.

In particular, G-pixels 363 and 364 largely affect the entire intensity since G-pixels composes 2 pixels out of 4 pixels included in color pixel unit 366. Accordingly, stereo image processing apparatus 100 can calculate disparity more highly precisely by using G-data 368, compared to a case where R-data 367 and B-data 369 are used.

In addition, in the Bayer pattern described above, when a pixel value in one pixel is estimated from a plurality of pixel values, an effective image resolution is degraded. However, stereo image processing apparatus 100 can calculate a disparity highly precisely in this case as well.

In general, pixel locking occurs when R-data 367, G-data 368, and B-data 369 having different wavelengths without any change, the data cannot be used as raw data. However, stereo image processing apparatus 100 can use R-data 367, G-data 368, and B-data 369 without any change.

(Embodiment 3)

An image obtained by a general stereo camera is affected by, for example, distortion in lens in a camera. The distortion in each part of the image increases as the part moves away from the center of the image. In addition, since the setting environment (angles, brightness, and so on) is different for the lenses on the left and right, a disparity cannot be calculated precisely if the captured image is used without any change. Accordingly, it is necessary to perform preprocess on the captured image so as to remove the influence of distortion of lens and others from the image.

Embodiment 3 of the present invention is an example in which rectification is performed on the image before an input to image matching section so as to calculate the shift amount on the image after the rectification highly precisely and at high speed.

Figure 16:
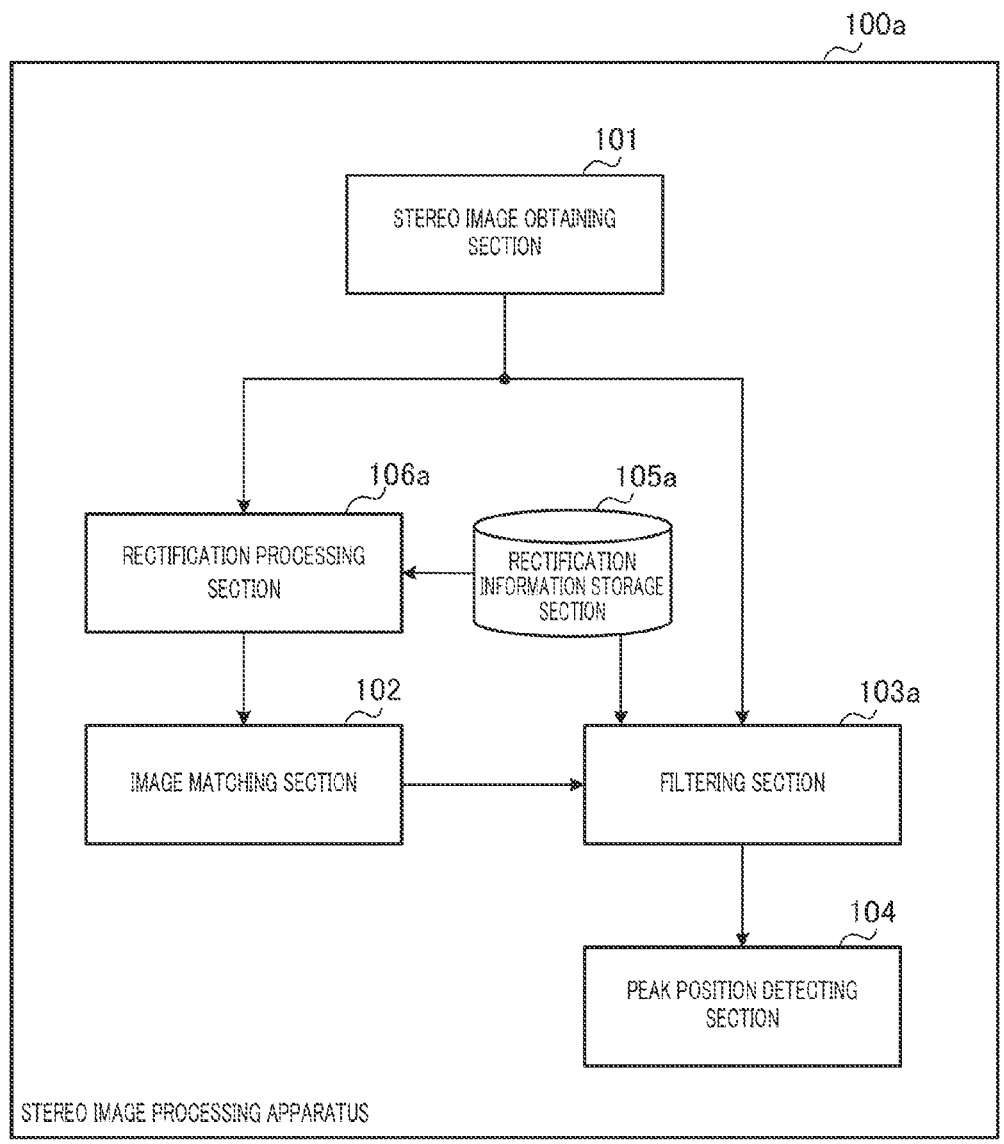
FIG. 16 is a block diagram illustrating an example of a configuration of a stereo image processing apparatus according to Embodiment 3 of the present invention.

FIG. 16 is a block diagram illustrating an example of a configuration of a stereo image processing apparatus according to Embodiment 3, and corresponds to FIG. 2 in Embodiment 2. The same reference numerals are assigned to the part identical to FIG. 2, and the description for these components is omitted.

In FIG. 16, stereo image processing apparatus 100*a* includes rectification processing section 106*a* and rectification information storage section 105*a*, in addition to the configuration illustrated in FIG. 2.

<Rectification Information Storage Section 105*a*>

Rectification information storage section 105*a* stores rectification information in advance. The rectification information is a conversion rule for performing distortion correction process and rectification process on the target image and the reference image obtained by stereo image obtaining section 101. The conversion rule for the target image is referred to as "rectification information for target image", and a conversion rule for the reference image is referred to as "rectification information for reference image."

Here, the distortion correction is a process for reducing influence on the distortion of the lens used for image capturing, and for correcting an image such that an object with a straight line in the real space is captured as having a straight line in the image as well. The rectification is a process for adjusting optical axes to be parallel in the target image and the reference image, and includes coordinate conversion and image shift process. The coordinate conversion is a process for converting coordinates such that captured images has the same image region size at any position in the image as long as a given object is at a position having the same distance from the cameras in the optical axis directions of the cameras. The image shift process is a process for setting the optical axes of the cameras pseudo-parallel to each other, such that an object at a point at infinity is captured at the same position in the target image and the reference image. Note that, the distortion correction and the rectification are collectively referred to as "distortion rectification", and the distortion correction process and the rectification process are collectively referred to as "distortion rectification process".

More specifically, the rectification information represents a position in a stereo image before rectification referred to by (corresponding to) each pixel in the rectification image at a stereo image before the rectification in a real value. The rectification image is an image obtained by the distortion rectification process.

<Rectification Processing Section 106*a*>

Rectification processing section 106*a* performs distortion rectification on the stereo image (target image and reference image) based on rectification information stored in rectification information storage section 105*a*. Subsequently, rectification processing section 106*a* generates a rectification image of the target image and a rectification image of the reference image.

Note that, rectification processing section 106*a* may perform distortion rectification by performing an image shift process after the coordinate conversion, and coordinate conversion after the image shift process. Stated differently, the method for distortion correction on a lens or correction of the positional relationship of two cameras is not limited as long as both of the corrections are performed.

Image matching section 102 handles rectification images of the target image and the reference image from rectification processing section 106*a* as the target image and the reference image, and obtains a corresponding point. The detailed method for obtaining the corresponding point is the same as in Embodiments described above. Image matching section 102 outputs a position of the target point and a position of the corresponding point to filtering section 103*a*.

Note that, when the target image and the reference image are color images, stereo image processing apparatus 100*a* may convert a color image into a gray-scale image as a preprocess for an input to image matching section 102, and determine the corresponding point in the reference image with respect to the target point in the target image using the gray-scale image.

As described above, stereo image processing apparatus 100*a* according to Embodiment 3 can obtain a corresponding point highly accurately, since image matching is performed after distortion rectification process on the target image and the reference image.

<Filtering Section 103*a*>

Filtering section 103*a* performs filtering in the same manner as Embodiment 2. Note that, the position of the target point and the position of the corresponding point obtained by image matching section 102 are positions on the rectification image; filtering section 103*a* calculates a disparity on the sub-pixel level on a stereo image obtained by stereo image obtaining section 101.

<Configuration of Filtering Section 103*a*>

Figure 17:
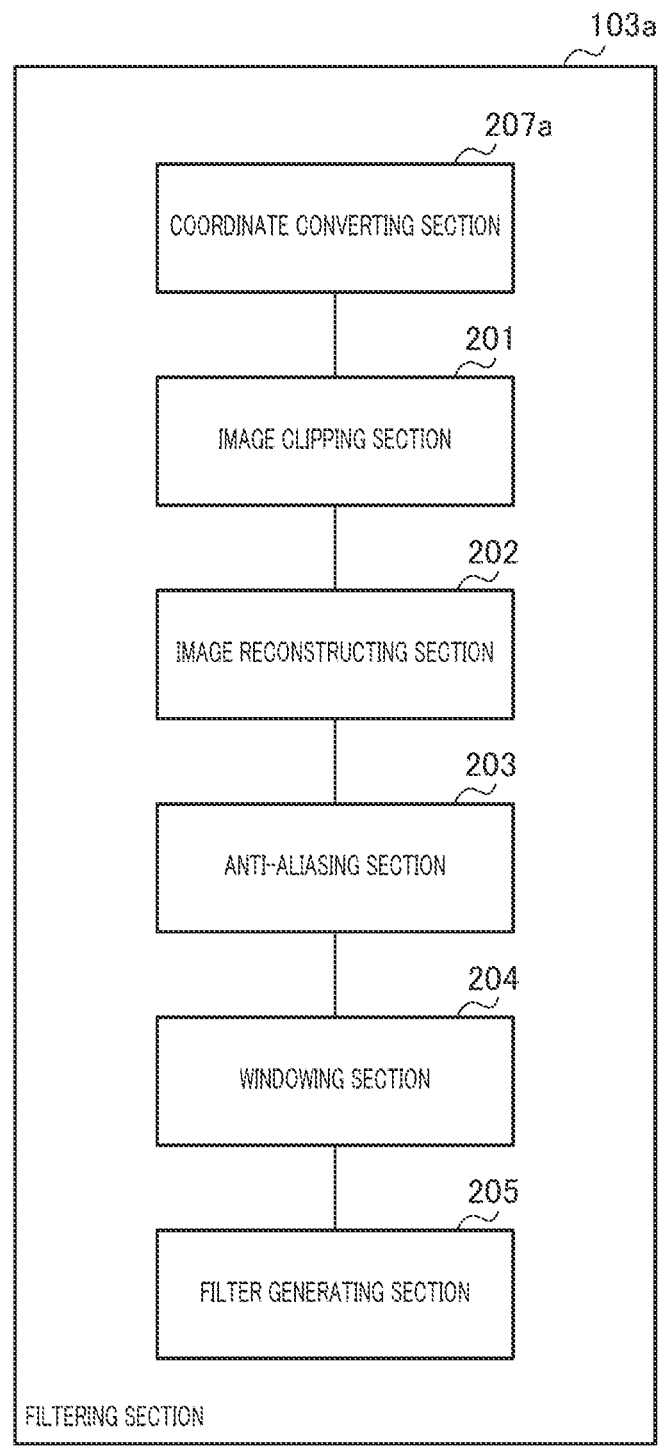
FIG. 17 is a block diagram illustrating an example of a configuration of a filtering section according to Embodiment 3 of the present invention.

FIG. 17 is a block diagram illustrating an example of the configuration of filtering section 103*a* when stereo image processing apparatus 100 further includes rectification processing section 106*a*, and corresponds to FIG. 3 in Embodiment 2. The same reference numerals are assigned to the part identical to FIG. 3, and the description for these components is omitted.

Filtering section 103*a* includes coordinate converting section 207*a*, in addition to the configuration illustrated in FIG. 3.

Coordinate converting section 207*a* converts a position of the target point obtained by image matching section 102 to a position on the target image obtained by stereo image obtaining section 101 (hereafter referred to as "original target image" in Embodiment 3) based on rectification information stored on rectification information storage section 105*a*.

Similarly, coordinate converting section 207*a* converts a position of the corresponding point obtained from image matching section 102 to a position on the reference image obtained by stereo image obtaining section 101 (hereafter referred to as "original reference image" in the embodiment 3) based on the rectification information from rectification information storage section 105*a*. Note that, the original target image and the original reference image are collectively referred to as "original image".

Subsequently, coordinate converting section 207a outputs the position of the target point on the original target image obtained and the position of the corresponding point on the original reference image to image clipping section 201.

More specifically, coordinate converting section 207a calculates positional coordinates of the target point on the original target image, based on the position of the target point on the rectification image and the rectification information. The positional coordinates of the target point on the rectification image are integer values, and the positional coordinates of the target point on the original target image are real values. Subsequently, coordinate converting section 207a converts the positional coordinates of the target point on the original target image by rounding the positional coordinates of the target point on the original target image to unit, for example.

Similarly, with reference to the corresponding point on the rectification image, coordinate converting section 207a calculates the positional coordinates of a corresponding point on the original reference image. The positional coordinates of the corresponding point on the rectification image are integer values, and the positional coordinates of the corresponding point on the original target image are real values. Subsequently, in the same manner as the process on the target point, coordinate converting section 207a converts positional coordinates of the corresponding point on the original reference image into integer values by rounding positional coordinates of the corresponding point on the original reference image to unit.

Coordinate converting section 207a calculates a difference from (a) a value rounded up or rounded off when positional coordinates of the target point are converted to an integer value to (b) a value rounded up or rounded off when positional coordinates of the corresponding point are converted to an integer value as shift amount Z. Note that, coordinate converting section 207a treats a value rounded off as positive, and a value rounded up as negative.

The following is the description using specific values. Suppose the positional coordinates of the target point on the original target image are (2.3, 1.5), and the positional coordinates of the corresponding point on the original reference image are (3.5, 1.5). In this case, the positional coordinates of the target point on the original target image are (2, 2), and the positional coordinates of the corresponding point on the original reference image are (4, 2), by the coordinate converting section 207a rounding positional coordinates to unit so as to obtain integer values.

Here, the positional coordinate of the target point is rounded off by 0.3 in the pixel row direction, and the positional coordinate of the corresponding point is rounded up by 0.5 in the pixel row direction. Accordingly, shift amount Z in this case is 0.3−(−0.5)=0.8. The shift amount Z is a value used for calculating the shift amount on the rectification image. Coordinate converting section 207a outputs positional coordinates of the target point converted into integer values, positional coordinates of the corresponding point converted into integer values, and the shift amount Z to peak position detecting section 104.

The process by filtering section 103 at or after image clipping section 201 is the same as Embodiments described above.

<Method for Calculating Shift Amount>

Peak position detecting section 104 calculates the shift amount on the rectification image using the rectification image. Peak position detecting section 104 first adds shift amount δ' in the sub-pixel level to shift amount n in the pixel level. The shift amount δ' is a value obtained by dividing the shift amount δ in the sub-pixel level calculated by the peak value calculation by the number of pixel rows in the unit target image used for reconstructing image.

Peak position detecting section 104 then adds shift amount Z generated when coordinate converting section 207a converts the positional coordinates in real values into positional coordinates in integer values to a value obtained by adding shift amount δ' on the sub-pixel level to the shift amount n in the pixel level. With this, peak position detecting section 104 is capable of calculating disparity highly accurately.

As described above, stereo image processing apparatus 100a according to Embodiment 3 determines the corresponding point by performing image matching using the rectification image, and calculates a disparity on the sub-pixel level using the original image. Accordingly, stereo image processing apparatus 100a can calculate the disparity effectively and with higher accuracy.

Note that, in the embodiment, the distortion rectification process is described as an example of preprocess for an input to image matching section 102. However, the present invention is not limited to this example, and an image reduction process may be performed. In this case, stereo image processing apparatus 100a can calculate shift amount n in the pixel level at high speed by using a reduced image for the process by image matching section 102. Stereo image processing apparatus 100a can calculate the shift amount δ' on the sub-pixel level by using an original image on filtering section 103a.

Stereo image processing apparatus 100a may perform the image reduction process after the distortion rectification process. In this case, stereo image processing apparatus 100a can calculate shift amount n in the pixel level at high speed by using a reduced rectification image for the process by image matching section 102. Stereo image processing apparatus 100a can calculate the shift amount δ' on the sub-pixel level by using an original target image and an original reference image for the process by filtering section 103a.

Note that, in the description above, it is assumed that coordinate converting section 207a in filtering section 103a converts the position of the target point and the position of the corresponding point on the rectification image to positions on the original target image or the original reference image. However, the present invention is not limited to this example, and the disparity on the sub-pixel level may be calculated using "vertical pixel corrected target image" obtained by correcting the original target image only in the vertical direction and "vertical pixel corrected reference image" obtained by correcting the original reference image only in the vertical direction. In this case, stereo image processing apparatus 100a can significantly reduce the complexity.

In the following description, "vertical pixel correction" refers to distortion rectification only in the vertical direction, and "vertical pixel correction value" is a pixel value calculated by the vertical pixel correction. The vertical pixel corrected target image and the vertical pixel corrected reference image are collectively referred to as "vertical pixel corrected image". More specifically, the pixel value of the vertical pixel corrected image is a vertical pixel correction value obtained by performing vertical pixel correction on an original image.

The specific method for calculating disparity on the sub-pixel level using the vertical pixel corrected image shall be described as follows.

Figure 18:
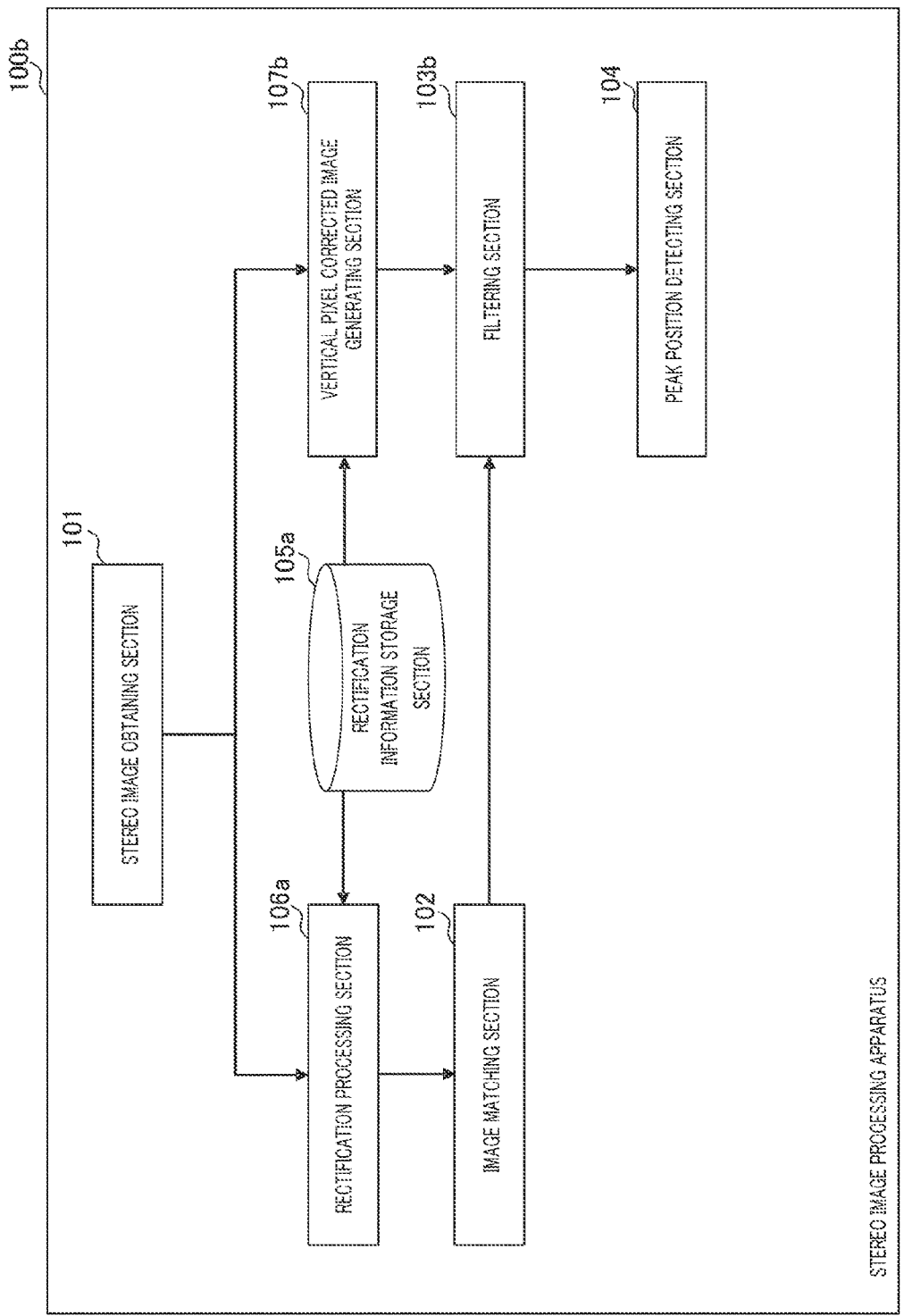
FIG. 18 is a block diagram illustrating an example of a configuration of a stereo image processing apparatus according to Embodiment 3 of the present invention.

FIG. 18 is a block diagram illustrating a configuration of stereo image processing apparatus that determines a corresponding point using a vertical pixel corrected image, and calculates a disparity in the sub-pixel level.

As illustrated in FIG. 18, stereo image processing apparatus 100b further includes vertical pixel corrected image generating section 107b, in addition to the components illustrated in FIG. 16. Note that, FIG. 18 corresponds to FIG. 16 in Embodiment 3, and the same reference numerals are assigned to the components identical to those in FIG. 16.

<Vertical Pixel Corrected Image Generating Section 107b>

Vertical pixel corrected image generating section 107b performs distortion rectification process only in the vertical direction on a stereo image, that is, an original image obtained by stereo image obtaining section 101, based on the rectification information stored in rectification information storage section 105a. Subsequently, vertical pixel corrected image generating section 107b generates the vertical pixel corrected image generated by performing vertical pixel correction on the original image.

<Configuration of Vertical Pixel Corrected Image Generating Section 107b>

Figure 19:
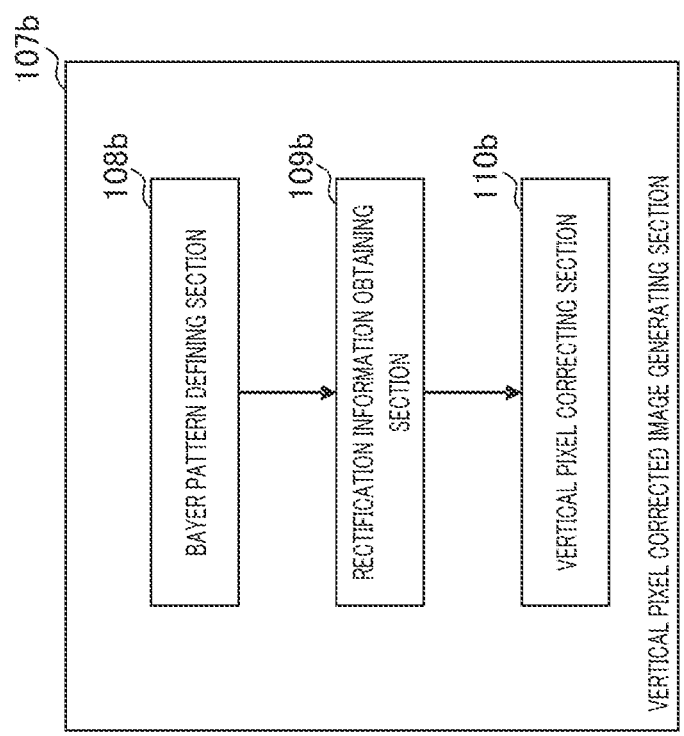
FIG. 19 is a block diagram illustrating an example of a configuration of a vertical pixel corrected image generating section according to Embodiment 3 of the present invention.

FIG. 19 is a block diagram illustrating an example of the configuration of vertical pixel corrected image generating section 107b.

In FIG. 19, vertical pixel corrected image generating section 107b includes Bayer pattern defining section 108b, rectification information obtaining section 109b, and vertical pixel correcting section 110b.

<Bayer Pattern Defining Section 108b>

Bayer pattern defining section 108b defines the arrangement of the Bayer pattern in a vertical pixel corrected image. More specifically, Bayer pattern defining section 108b defines a start of the image, for example, that the upper left of the image starts with R (red) or the upper left of the image starts with B (blue). The definition may be embedded to a program, or defined by using a setting file or others. Note that, the arrangement of the Bayer pattern in the vertical pixel corrected target image and the vertical pixel corrected reference image is identical.

<Rectification Information obtaining Section 109b>

Rectification information obtaining section 109b obtains rectification information stored in rectification information storage section 105a.

<Vertical Pixel Correcting Section 110b>

Vertical pixel correcting section 110b generates the vertical pixel corrected image by performing vertical pixel correction on an original image based on rectification information obtained by rectification information obtaining section 109b. The rectification information is essentially a conversion rule used for performing distortion rectification both vertically and horizontally. However, vertical pixel correcting section 110b performs distortion rectification only in the vertical direction (that is, vertical pixel correction) using the rectification information.

An example of a process for performing vertical pixel correction on an original target image, and generating a vertical pixel corrected target image will be described with reference to FIGS. 20A to 20D. Note that, in FIGS. 20A, C, and D, one section represents one pixel.

FIG. 20A illustrates a vertical pixel corrected target image generated by vertical pixel corrected image generating section 107b. The description is made using an example in which the vertical pixel corrected target image has the following size: 4 pixel rows×3 pixel columns=pixel count 12. Actually, in the case of VGA image, an image having an image count of 480×640 is generated, and in the case of 1.3 megapixel-images, an image having the pixel count of 960×1280 is generated. For simplicity of explanation, the numbers (1) to (12) representing the order of downward scanning toward right from upper left while moving through rows are used as numbers representing the pixels. In the following description a pixel specified by a pixel number is represented as "pixel ("pixel number")".

FIG. 20B represents an example of rectification information for a target image obtained by rectification information obtaining section 109b. Note that, the format illustrated in FIG. 20B is an example, and the present invention is not limited to this example. The rectification information for target image in FIG. 20B illustrates correspondence between positional coordinates on an image after distortion rectification both in vertical and horizontal directions and positional coordinates on the original target image.

For example, positional coordinates (1.6, 1.2) are used for calculating a pixel value (that is, a vertical pixel correction value) of pixel (5) having positional coordinates (1, 1) on the vertical pixel corrected image. In the following description, positional coordinates used for calculating a pixel value on the image after distortion rectification both in the vertical and the horizontal direction are referred to as "original coordinates".

FIG. 20C illustrates the arrangement in the Bayer pattern in the original target image, and FIG. 20D illustrates the arrangement in the Bayer pattern defined by Bayer pattern defining section 108b. FIG. 20C illustrates an arrangement in the Bayer pattern in which the pixels are arranged such that G (green), B (blue), and G (green) are lined in the first pixel row. Similarly, the Bayer pattern with R, G, and B are illustrated in the same manner from the second pixel row to the fourth pixel row as well. Similarly, FIG. 20D illustrates the Bayer pattern with R, G, and B in the same manner.

Furthermore, as illustrated in FIG. 20C, the original target image holds data of pixel values for each positional coordinate where both x-coordinate and y-coordinate are integer values. For example, pixel 2007 having the positional coordinates (0, 0) (0 is represented as 0.0 in FIG. 20C) holds a pixel value in G, pixel 2004 having the positional coordinates (1, 0) (0 is represented as 0.0 and 1 is presented as 1.0 in FIG. 20C) holds a pixel value in B. Stated differently, the positional coordinates of the pixel values held as the original target image are discrete.

However, original coordinates illustrated by the rectification information for target image are real values such as (1.5, 1.2). Accordingly, the pixel represented by the original coordinates is not present on the original target image. In the vertical pixel correction, a vertical pixel correction value is calculated by selecting a plurality of pixels on the original target pixel using values after the decimal point in the original coordinates, and a vertical pixel correction value is calculated using pixel values of the selected pixels.

Figure 33:
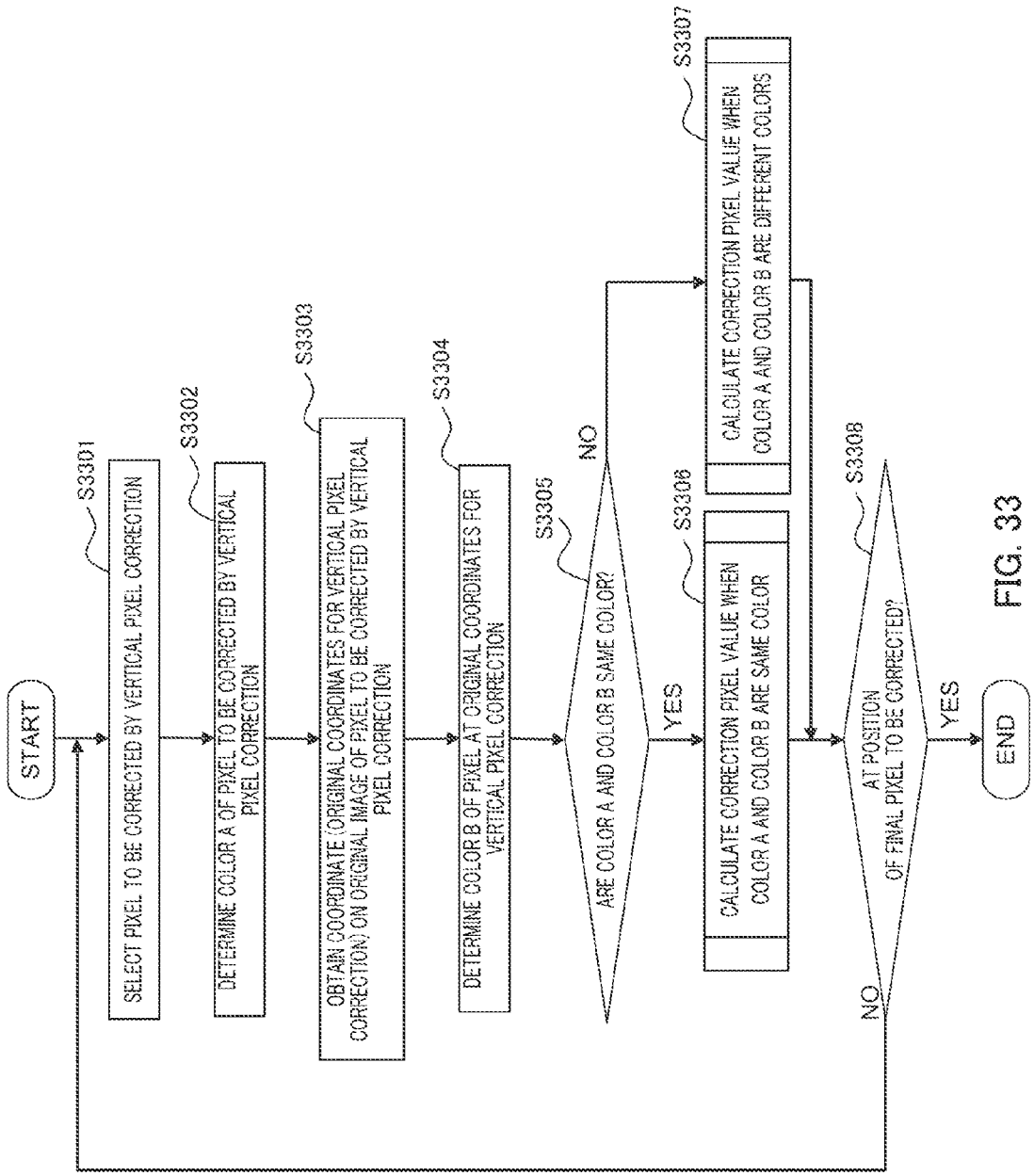
FIG. 33 is a flowchart illustrating an example of vertical pixel correcting process according to Embodiment 3 of the present invention.

FIG. 33 is a flowchart illustrating the flow of the vertical pixel correction. A method for generating a vertical pixel corrected target image illustrated in FIG. 20A through the vertical pixel correction process will be described with reference to FIG. 33.

Vertical pixel corrected image generating section 107b selects a pixel for calculating vertical pixel correction value in the vertical pixel corrected target image (hereafter referred to as "pixel for vertical pixel correction") (S3301). Vertical pixel corrected image generating section 107b selects pixel (1) 2006 in FIG. 20, as the first pixel for vertical pixel correction, for example. Subsequently, vertical pixel corrected image generating section 107b scans the vertical pixel corrected target image downward from upper left toward the right, and sequentially selects pixels (1) to (12) as the pixel for vertical pixel correction.

Vertical pixel corrected image generating section 107*b* refers to an arrangement of the Bayer pattern in the vertical pixel corrected target image (FIG. 20D), and determines the color of the pixel for vertical pixel correction (S3302). For example, in step S3301, when pixel (5) 2001 having positional coordinates (1, 1) is selected as a pixel for vertical pixel correction, vertical pixel corrected image generating section 107*b* refers to color 2003 at positional coordinates (1, 1) in the arrangement in the Bayer pattern of the vertical pixel corrected target image (FIG. 20D). In this example, vertical pixel corrected image generating section 107*b* determines the color of the pixel for vertical pixel correction (pixel (5)) as "B".

Next, vertical pixel corrected image generating section 107*b* obtains original coordinates of the pixel for vertical pixel correction with reference to the rectification information (S3303). For example, when pixel (5) 2001 is selected as the pixel for vertical pixel correction, vertical pixel corrected image generating section 107*b* obtains original coordinates (1.6, 1.2) with reference to the rectification information (FIG. 20B).

Subsequently, vertical pixel corrected image generating section 107*b* obtains positional coordinates of the pixels for the vertical pixel correction on the original target image (S3303). Vertical pixel correcting section 110*b* performs distortion rectification on the original target image only in the vertical direction; only Y-axis is used as a positional coordinate of the pixel for vertical pixel correction on the original target image. More specifically, vertical pixel corrected image generating section 107*b* determines, as positional coordinates of the pixel for vertical pixel correction on the original target image, (1, 1.2) obtained by replacing the x-coordinate of the original coordinates (1.6, 1.2) with x-axis of the pixel for vertical pixel correction.

In the following description, the positional coordinates of the pixel in the original target image to be referred to calculate the vertical pixel correction value are referred to as "original coordinates for vertical pixel correction". The original coordinates for vertical pixel correction are positional coordinates obtained by replacing x-coordinate of the original coordinate with the x-axis of the pixel for vertical pixel correction, and the original coordinates of pixel (5) 2001 for vertical pixel correction are (1, 1.2).

Vertical pixel corrected image generating section 107*b* determines a color of the pixel at the original coordinates for vertical pixel correction obtained in step S3303 with reference to the arrangement of the Bayer pattern in the original target image (FIG. 20C) (S3304). As illustrated in FIG. 20C, the color of pixel 2002 having the positional coordinates (1, 1.2) in the original target image is "G". In this example, vertical pixel corrected image generating section 107*b* determines the color of the pixel for vertical pixel correction (pixel (5)) as "G".

Next, vertical pixel corrected image generating section 107*b* determines whether or not the pixel for vertical pixel correction determined in S3302 and the pixel at the original coordinate for vertical correction of the pixel for vertical pixel correction determined in step S3304 are in the same color (S3305). When the pixel for vertical pixel correction is pixel (5), the color determined by vertical pixel corrected image generating section 107*b* in S3302 is "B", and the color determined in S3304 is "G".

Accordingly, in this case, vertical pixel corrected image generating section 107*b* determines that the pixels are not in the same color, proceeds to step S3307, and calculates a vertical pixel correction value when the pixels are not in the same color. The details of calculation on the vertical pixel correction when the pixels in step S3307 are in different colors will be described later.

The description described above is based on a case where pixel (5) is selected as the pixel for vertical pixel correction, and where vertical pixel corrected image generating section 107*b* determines that the pixels are not in the same color in step S3305. A process performed from step S3301 to S3305 when vertical pixel corrected image generating section 107*b* determines that the pixels are in the same color in step S3305 will be described with reference to FIG. 21.

In the same manner as FIGS. 20A to 20D, FIG. 21A illustrates a vertical pixel corrected target image, FIG. 21B illustrates rectification information for target image, FIG. 21C illustrates arrangement of the original target image in the Bayer pattern, and FIG. 21D illustrates an arrangement in the Bayer pattern of the vertical pixel corrected target image. Note that, in FIGS. 21A, C, and D, one section refers to one pixel, in the same manner as FIGS. 20A to 20D.

First, in step S3301, vertical pixel corrected image generating section 107*b* selects pixel (8) 2101 in FIGS. 21A to 21D as the pixel for vertical pixel correction, for example.

Vertical pixel corrected image generating section 107*b* refers to an arrangement of the Bayer pattern in the vertical pixel corrected target image (FIG. 21D), and determines the color of the pixel for vertical pixel correction. The determination is performed in the same manner as a case where pixel (5) 2001 is selected as the pixel for vertical pixel correction in step S3301. As a result, vertical pixel corrected image generating section 107*b* determines that the color of the pixel for vertical pixel correction (pixel (8) 2101) is "G".

In step S3303, vertical pixel corrected image generating section 107*b* refers to the rectification information, and obtains the original coordinates for vertical pixel correction of the pixel for vertical pixel correction. The coordinates are obtained in the same manner as a case where pixel (5) 2001 is selected as the pixel for vertical pixel correction in step S3301. As a result, vertical pixel corrected image generating section 107*b* obtains the original coordinates for vertical pixel correction (1.0, 2.8) of pixel (8) 2101 which is the pixel for vertical pixel correction.

Vertical pixel corrected image generating section 107*b* determines a color of the pixel at the original coordinates for vertical pixel correction in step S3304 with reference to the arrangement of the Bayer pattern in the original target image (FIG. 21C). The determination is performed in the same manner as a case where pixel (5) 2001 is selected as the pixel for vertical pixel correction in step S3301. As a result, vertical pixel corrected image generating section 107*b* determines that the color of the pixel at the original coordinates for vertical pixel correction for the pixel for vertical pixel correction (pixel (8) 2101) is "G".

Subsequently, in step S3305, vertical pixel corrected image generating section 107*b* determines whether or not the pixel for vertical pixel correction determined in S3302 and the pixel at the original coordinate for the vertical pixel correction of the pixel for vertical pixel correction determined in step S3304 are in the same color. If the pixel for vertical pixel correction is pixel (8) 2101, the color determined by vertical pixel corrected image generating section 107*b* in S3302 is "G", and the color determined in step S3304 is "G" as well.

Accordingly, in this case, vertical pixel corrected image generating section 107*b* determines that the pixels are in the same color, proceeds to step S3306, and calculates a vertical pixel correction value when the pixels are in the same color.

The details of calculation on the vertical pixel correction value when the pixels in step S3306 are in the same color will be described later.

After the process in step S3306 or step S3307 ends, vertical pixel corrected image generating section 107b determines whether the pixel is the last pixel for vertical pixel correction in step S3308. For example, when vertical pixel corrected image generating section 107b sequentially selects pixels (1) to (12) as the pixels for vertical pixel correction, the process in the flowchart in FIG. 33 ends if the calculation of vertical pixel correction values until pixel (12) ends (yes).

If the calculation on vertical pixel correction value up to pixel (12) has not ended (no), vertical pixel corrected image generating section 107b proceeds to step S3301, and selects the next pixel for vertical pixel correction.

The description of the flowchart in FIG. 33 is as described above.

Next, step S3307 in the flowchart in FIG. 33 (calculating vertical pixel correction values when pixels are in different colors) will be described.

When the pixel for vertical pixel correction and the pixel at the original coordinates of vertical pixel correction are in different colors, vertical pixel correcting section 110b calculates a vertical pixel correction value based on a pixel value of the pixel in the same color as the color of the pixel for vertical pixel correction, among pixels above and below the pixel at the original coordinates for vertical pixel correction in the original target image.

Figure 34:
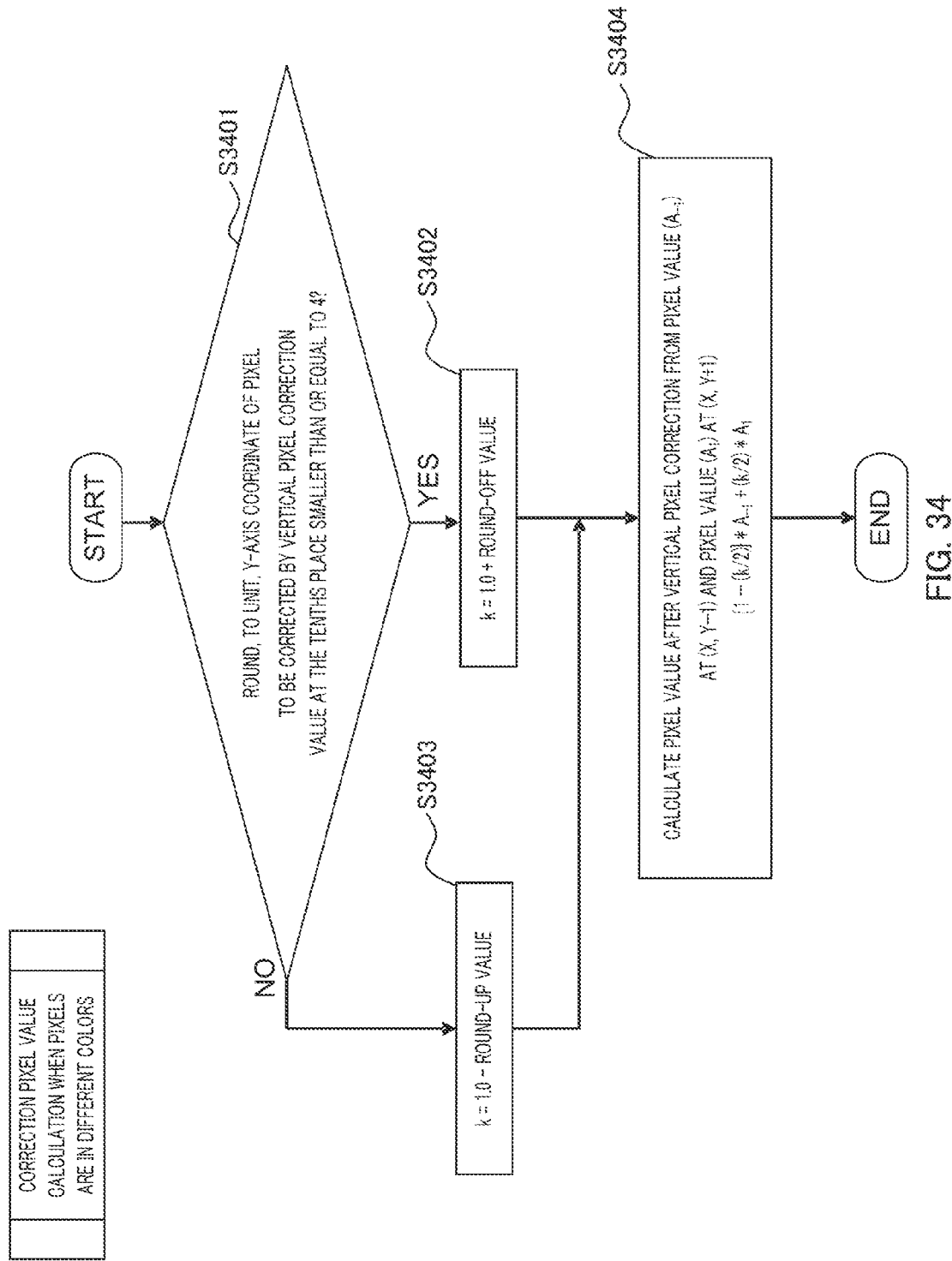
FIG. 34 is a flowchart illustrating an example of correction pixel value calculating process according to Embodiment 3 of the present invention when the pixels are in different colors.

FIG. 34 is a flowchart for calculating the vertical pixel correction value when the pixels are in different colors, which is step S3307 of the flowchart in FIG. 33.

Here, in step S3301 in the flowchart in FIG. 33, pixel (5) 2001 in FIG. 20A is selected as the pixel for vertical pixel correction, and in step S3305, it is determined that the pixels are not in the same color. Description will be made based on the example.

First, in step S3401, vertical pixel corrected image generating section 107b determines whether or not y-coordinate of the pixel for vertical pixel correction at the tenth place is 4 or smaller.

When a value at the tenth place of the y-coordinate of the pixel for vertical pixel correction is 4 or smaller (yes), vertical pixel corrected image generating section 107b proceeds to step S3402, and if the value at the tenth place is no smaller than 4 (no), vertical pixel corrected image generating section 107b proceeds to step S3403.

In step S3402, vertical pixel corrected image generating section 107b calculates weighting coefficient k by adding a value 1 and a value rounded off when the y-coordinate of the pixel for vertical pixel correction is rounded to the unit (hereafter referred to as "value rounded off"). Weighting coefficient k is a coefficient used for calculating a weight added to a pixel value when calculating weight to be added to the pixel value for calculating the vertical pixel correction to be described later.

Here, since pixel (5) 2001 is selected as the pixel for vertical pixel correction, y-coordinate in pixel 2002 at the original coordinate for vertical pixel correction is 1.2, and thus the value at the tenth place is 2. Accordingly, the value rounded off is 0.2, and thus weighting coefficient k is 1.2 (1.0+0.2). Subsequently, vertical pixel corrected image generating section 107b proceeds to step S3404.

In step S3403, vertical pixel corrected image generating section 107b calculates weighting coefficient k which is a value obtained by dividing 1 by a value rounded-up when a y-coordinate of the pixel for vertical pixel correction is rounded to unit (hereafter referred to as the "rounded-up value"), and proceeds to step S3404.

Next, in step S3404, vertical pixel corrected image generating section 107b calculates a vertical pixel correction value of the pixel for vertical pixel correction, using weighting coefficient k calculated in step S3402 or step S3403. An example of equation for a case when linear interpolation for calculating the vertical pixel correction value is used is shown as Equation 6.

[6]

$$\{1-(k/2)\} \times A_{-1} + (k/2) \times A_1 \quad \text{(Equation 6)}$$

Here, $A_{-1}$ is a pixel value of pixel 2004 immediately above original coordinates for vertical pixel correction 2002, and $A_1$ is a pixel value of pixel 2005 immediately below original coordinates for vertical pixel correction 2002. Accordingly, when pixel (5) 2001 is determined as the pixel for vertical pixel correction, k=1.2 is substituted for Equation (6), and the calculated vertical pixel correction value is $0.4 \times A_{-1} + 0.6 \times A_1$. Stated differently, the vertical pixel correction value is a value calculated based on pixel values of the pixels in the proximity of a pixel located at the original coordinates for vertical pixel correction. The weight added to pixel values of pixels in the proximity when calculating vertical pixel correction value depends on an amount and a direction of shift from the original coordinates among a plurality of the pixels with respect to the original coordinates for vertical pixel correction.

Vertical pixel corrected image generating section 107b ends the process in the flowchart in FIG. 34 (calculating a vertical pixel correction value when the colors are different) with the process described above.

Furthermore, step S3307 in the flowchart in FIG. 33 (calculating vertical pixel correction value when the pixels are in the same color) will be described.

When the pixel for vertical pixel correction and the pixel at the original coordinates for vertical pixel correction are in the same color, vertical pixel correcting section 110b calculates a vertical pixel correction value based on a pixel value of a pixel at the original coordinates for the vertical pixel correction and a pixel value of a pixel in the same color located two pixels above or two pixels below the pixel at the original coordinate for vertical pixel correction in the original target image.

Figure 35:
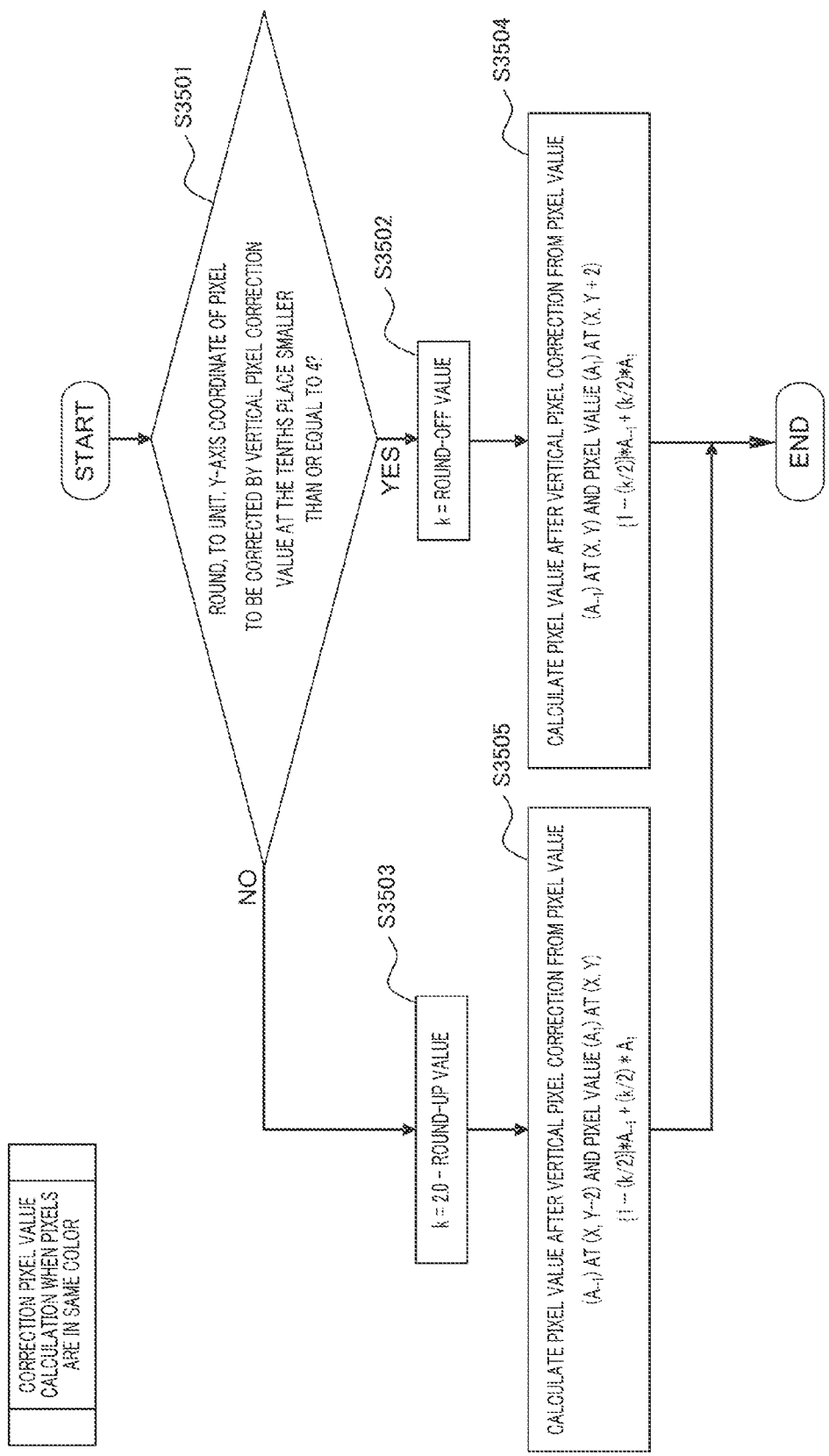
FIG. 35 is a flowchart illustrating an example of correction pixel value calculating process according to Embodiment 3 of the present invention when the pixels are in the same color.

FIG. 35 is a flowchart for calculating the vertical pixel correction value when the pixels are in the same color, which is step S3306 of the flowchart in FIG. 33.

Here, in step S3301 in the flowchart in FIG. 33, pixel (8) 2101 in FIG. 21A is selected as the pixel for vertical pixel correction, and in step S3305, it is determined that the pixels are in the same color.

First, in step S3501, vertical pixel corrected image generating section 107b determines whether or not a value of y-coordinate of the pixel for vertical pixel correction at the tenth place is 4 or smaller.

When a value at the tenth place of the y-coordinate of the pixel for vertical pixel correction is 4 or smaller (yes), vertical pixel corrected image generating section 107b proceeds to step S3502, and if the value is no smaller than 4 (no), vertical pixel corrected image generating section 107b proceeds to step S3503. Here, pixel (8) 2101 is selected as the pixel for vertical pixel correction, y-coordinate of pixel 2102 at the original coordinates for vertical pixel correction is 2.8, and thus the value at the tenth place is 8. Accordingly, vertical pixel corrected image generating section 107b proceeds to step S3503.

In step S3502, vertical pixel corrected image generating section 107b calculates weighting coefficient k using the round-off value. More specifically, weighting coefficient k is determined as the rounded-off value.

Next, in step S3504, vertical pixel corrected image generating section 107b calculates a vertical pixel correction value of the pixel for vertical pixel correction, using weighting coefficient k calculated in step S3502. The equation used for calculating vertical pixel correction value using linear interpolation is identical to Equation (6).

Note that $A_{-1}$ in Equation 6 denotes a pixel value for the pixel at the original coordinates for vertical pixel correction, and $A_1$ denotes a pixel value of a pixel located two pixels above the pixel in the original target image. For example, in the example in FIG. 21C, $A_{-1}$ is a pixel value of pixel for vertical pixel correction 2102, and $A_1$ is a pixel value of pixel 2104 located two pixels above the pixel for vertical pixel correction.

In step S3503, vertical pixel corrected image generating section 107b calculates weighting coefficient k as a value obtained by subtracting a value at the tenth place (hereafter referred to as a rounded-up value) from the number 2, and proceeds to step S3505.

The Y-coordinate in pixel 2102 at the original coordinate for vertical pixel correction in pixel (8) 2101 is 2.8, and the value at the tenth place is 8. Accordingly, 0.2 is the rounded-up value. Therefore, weighing coefficient k is 2.0−0.2=1.8.

In next step S3505, vertical pixel corrected image generating section 107b calculates a vertical pixel correction value of the pixel for vertical pixel correction, using weighting coefficient k calculated in step S3503. The equation used for calculating vertical pixel correction value using linear interpolation is identical to Equation (6). The pixel value after the vertical pixel correction is calculated by $0.1 \times A_{-1} + 0.9 \times A_1$.

Note that $A_1$ in Equation 6 denotes a pixel value for the pixel at the original coordinates for vertical pixel correction, and $A_{-1}$ denotes a pixel value of a pixel located two pixels above the pixel in the original target image. For example, in the example in FIG. 21C, $A_{-1}$ is a pixel value of pixel for vertical pixel correction 2104 (represented as $G_{-1}$ in FIG. 21C so as to indicate that the pixel is in the same color as the pixel for vertical pixel correction (G)), and $A_1$ is a pixel value of pixel 2102 at the original coordinates for vertical pixel correction (presented as $G_1$).

Vertical pixel corrected image generating section 107b ends the process in the flowchart in FIG. 35 (calculating vertical pixel correction value when the pixels are in the same color) by calculating a vertical pixel correction value of the pixel for vertical pixel correction in step S3504 or step S3505.

Note that, when y-coordinate of the original coordinates for vertical pixel correction is an integer value, it is not necessary to use pixel values of a plurality of pixels on the original target image so as to calculate the vertical pixel correction value. Accordingly, the pixel value of the pixel at the original coordinates for vertical pixel correction is used as the vertical pixel correction value without any change. For example, when y-coordinate of the original coordinates for vertical pixel correction is 3.0; a pixel value of pixel 2102 at the original coordinates for vertical pixel correction is used as the vertical pixel correction value, without any change. For example, when y-coordinate of the original coordinates for vertical pixel correction is 1.0; a pixel value of pixel 2104 at the original coordinates for vertical pixel correction is used as the vertical pixel correction value, without any change.

As described above, vertical pixel correcting section 110b calculates a pixel value of a color set by Bayer pattern defining section 108b, based on the y-coordinate of the pixel of the original target image to be referred to for distortion rectification, using a pixel value of a pixel set in Bayer pattern defining section 108b. Note that, the method for calculating the vertical pixel correction value on the target image is specifically described. However, vertical pixel correcting section 110b calculates the vertical pixel correction value of the reference image in the same manner using the rectification information for reference image and the original reference image, and generates the vertical pixel corrected reference image.

Note that, in Embodiment 3, vertical pixel correcting section 110b is configured to perform vertical pixel correction on the entire image before the filtering process by filtering section 103b for acceleration. However, the configuration is not limited to this example, and vertical pixel correcting section 110b may perform vertical pixel correction only on a region for processing before clipping the image by image clipping section 201 at filtering section 103b.

<Filtering Section 103b>

Filtering section 103b performs filtering in the same manner as filtering section 103a. While filtering section 103a calculates a disparity on the sub-pixel level on a stereo image (original target image and original reference image), filtering section 103b calculates a disparity on the sub-pixel level on a vertical pixel corrected image (vertical pixel corrected target image and vertical pixel corrected reference image).

<Configuration of Filtering Section 103b>

Figure 22:
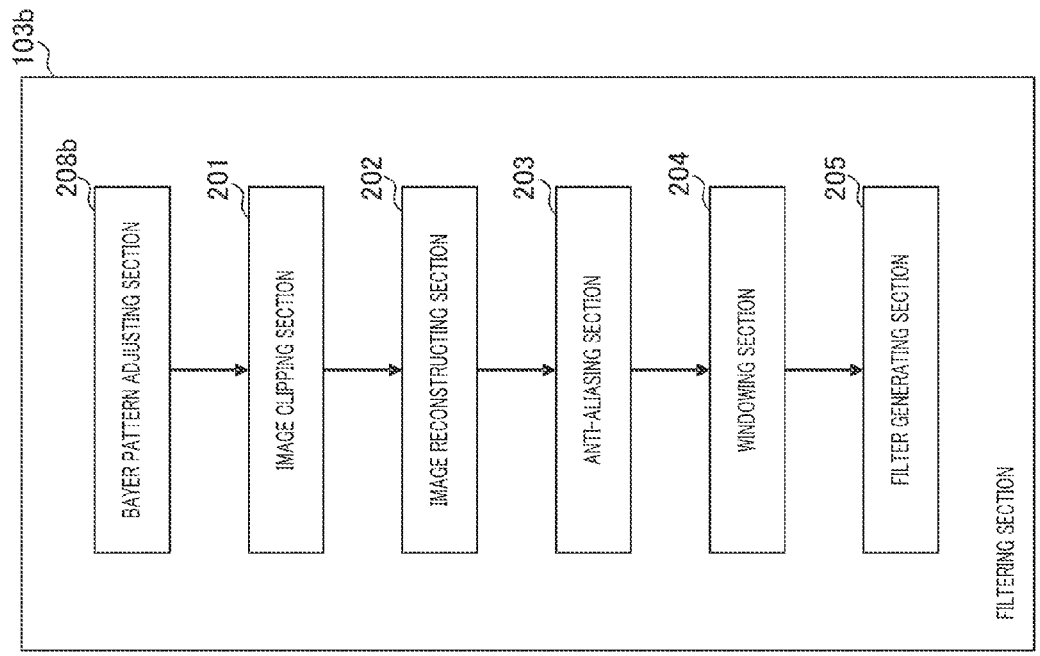
FIG. 22 is a block diagram illustrating an example of a configuration of a filtering section according to Embodiment 3 of the present invention.

FIG. 22 is a block diagram illustrating an example of configuration of filtering section 103b having vertical pixel corrected image generating section 107b added to stereo image processing apparatus 100a, and corresponds to FIG. 17 in Embodiment 3. The same reference numerals are assigned to the parts identical to those in FIG. 17, and the description for these components is omitted.

Filtering section 103b includes Bayer pattern adjusting section 208b, instead of coordinate converting section 207a illustrated in FIG. 17.

Bayer pattern adjusting section 208b determines whether the arrangement of the Bayer pattern in the vertical pixel corrected target image and the vertical pixel corrected reference image matches, from x-axis coordinates of the target point and the corresponding point calculated on the rectification image.

More specifically, if both x-coordinates of the target point and the corresponding point are in even numbers, or odd numbers, Bayer pattern adjusting section 208b determines that the arrangement of the Bayer pattern in the vertical pixel corrected target image and the vertical pixel corrected reference image, and sends the obtained target point and the corresponding point to image clipping section 201 without any change.

When one of the x-coordinates of the target point and the corresponding point is an even number and the other is an odd number, the arrangements of the Bayer pattern in the vertical correction pixel target image and the vertical pixel corrected reference image do not match. Accordingly, Bayer pattern adjusting section 208b adds one to the x-coordinate of the corresponding point, for example. Bayer pattern adjusting section 208b determines a pixel having an x-coordinate obtained by adding one to the x-coordinate of the corresponding point as a new corresponding point, and sends the information of the new corresponding point to image clipping section 201, together with the information of the target point obtained.

Here, Bayer pattern adjusting section 208b notifies peak position detecting section 104 of the information that one is added to the x-coordinate. Accordingly, when peak position detecting section 104 calculates a disparity, the value one added by the adjustment by Bayer pattern adjusting section 208b is added, in addition to the shift amount n on the pixel level and the shift amount δ' on the sub-pixel level.

Note that, the description is made for a case where one is added to the x-coordinate of the corresponding point; that is, the corresponding point is shifted to the right by one pixel. However, one may be subtracted from the x-coordinate of the corresponding point, that is, the corresponding point may be shifted to the left by one pixel. In this case, when peak position detecting section 104 calculates the disparity, the value one subtracted by Bayer pattern adjusting section 208b is included in the calculation, in addition to the shift amount n on the pixel level and the shift amount δ' on the sub-pixel level. (More specifically, one is subtracted from a value obtained by adding the shift amount n on the pixel level and the shift amount δ' on the sub-pixel level.)

As described above, stereo image processing apparatus 100b according to Embodiment 3 calculates a disparity on the sub-pixel level using the vertical pixel corrected image. With this process, stereo image processing apparatus 100b can calculate a disparity highly precisely.

Note that, as a preprocess for an input to image matching section 102, stereo image processing apparatus 100b may convert an image in the Bayer pattern into a grayscale image, obtain a corresponding point in the grayscale image, and calculate a disparity on the sub-pixel level using a vertical correction image obtained by vertically correcting the image in the Bayer pattern.

Figure 23:
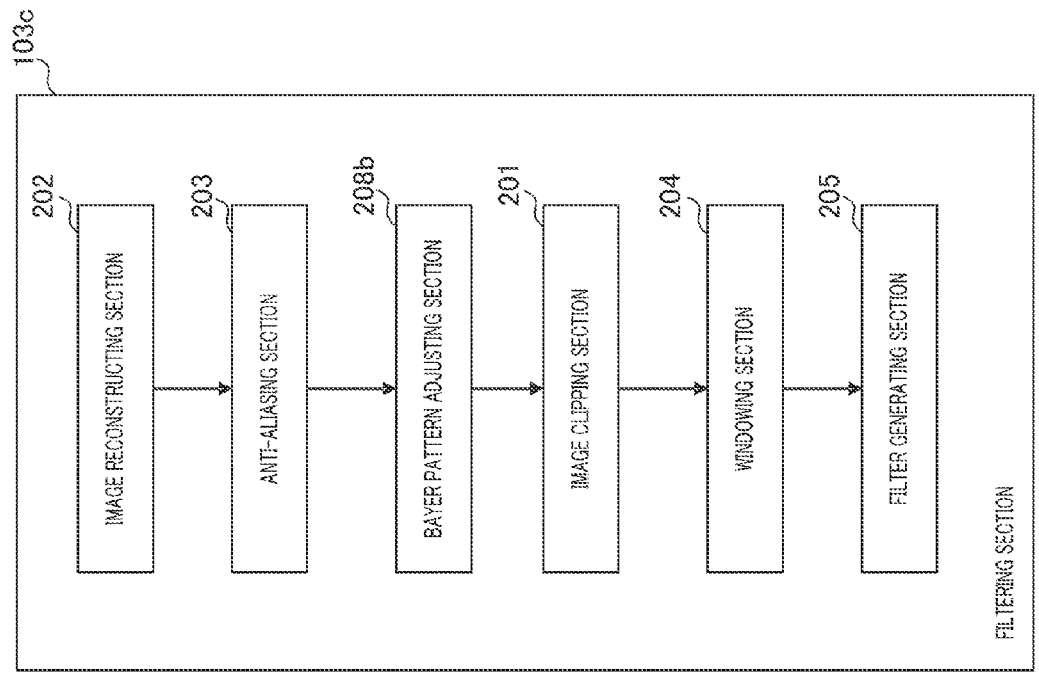
FIG. 23 is a block diagram illustrating an example of a configuration of a filtering section according to Embodiment 3 of the present invention.

For further accelerating the process, another configuration may be adopted to filtering section 103b. FIG. 23 illustrates another configuration of filtering section 103b for accelerating the process.

Filtering section 103c in FIG. 23 is another configuration of filtering section 103b in FIG. 22. In filtering section 103c, results of the process by image reconstructing section 202 and anti-aliasing section 203 are output to Bayer pattern adjusting section 208b.

Filtering section 103c calculates a disparity from a target point on the sub-pixel level based on the corresponding point calculated by image matching section 102. Here, when the pixel row used for calculating the disparity on the sub-pixel level from a target point is identical to the pixel row used for calculating the disparity on the sub-pixel level from the target point in calculating the disparity on the sub-pixel level immediately prior to the calculation, filtering section 103c can integrate image reconstruction and anti-aliasing.

The image input to filtering section 103c is an image corrected in the vertical direction by vertical pixel corrected image generating section 107b, and thus has the same coordinates in the vertical direction as the rectification image used by image matching section 102. Accordingly, the pixel rows for calculating the disparity on the sub-pixel level are identical while the pixel rows including the target point are identical. When the disparity is calculated on the sub-pixel level in the pixel row direction (horizontal direction), filtering section 103c can reconstruct an image and perform anti-aliasing for one entire pixel row. Image clipping section 201 can skip unnecessary processes by clipping necessary data from data after anti-aliasing. With this, stereo image processing apparatus 100b can significantly reduce the operational complexity, and can calculate disparity at higher speed and with higher precision.

(Embodiment 4)

Embodiment 4 is directed to a method for more appropriately performing windowing adjusted to a position where the correlation between the target pixel data and the reference pixel data is high (hereafter referred to as "correlation peak").

In Embodiment 2, windowing by windowing section 204 using the second window function is described. Windowing using the second window function is for reducing noise component generated when clipping the target pixel data and the reference pixel data.

However, when performing windowing using the second window function, there is room for improved accuracy on the filtering result by filtering section 103 if a window function having a maximum value at the correlation peak is used. Note that, windowing using a window function having the maximum value at the correlation peak is windowing adjusted to the correlation peak.

As a method for windowing adjusted to the correlation peak, a method for generating a windowing function by calculating coefficients is known. However, with this method, significant amount of operation is required for windowing, since recalculation based on the trigonometric function is necessary. Furthermore, a method for preparing coefficients of a plurality of window functions adjusted to correlation peaks expected as static data in advance is known. However, this method requires a large amount of memory for storing coefficients.

Embodiment 4 according to the present invention discloses windowing adjusted to the correlation peak while reducing complexity and a size of memory by using the feature for reconstructing image range into one-dimensional pixel data.

<Configuration of Stereo Image Processing Apparatus 100c according to Embodiment 4>

Figure 24:
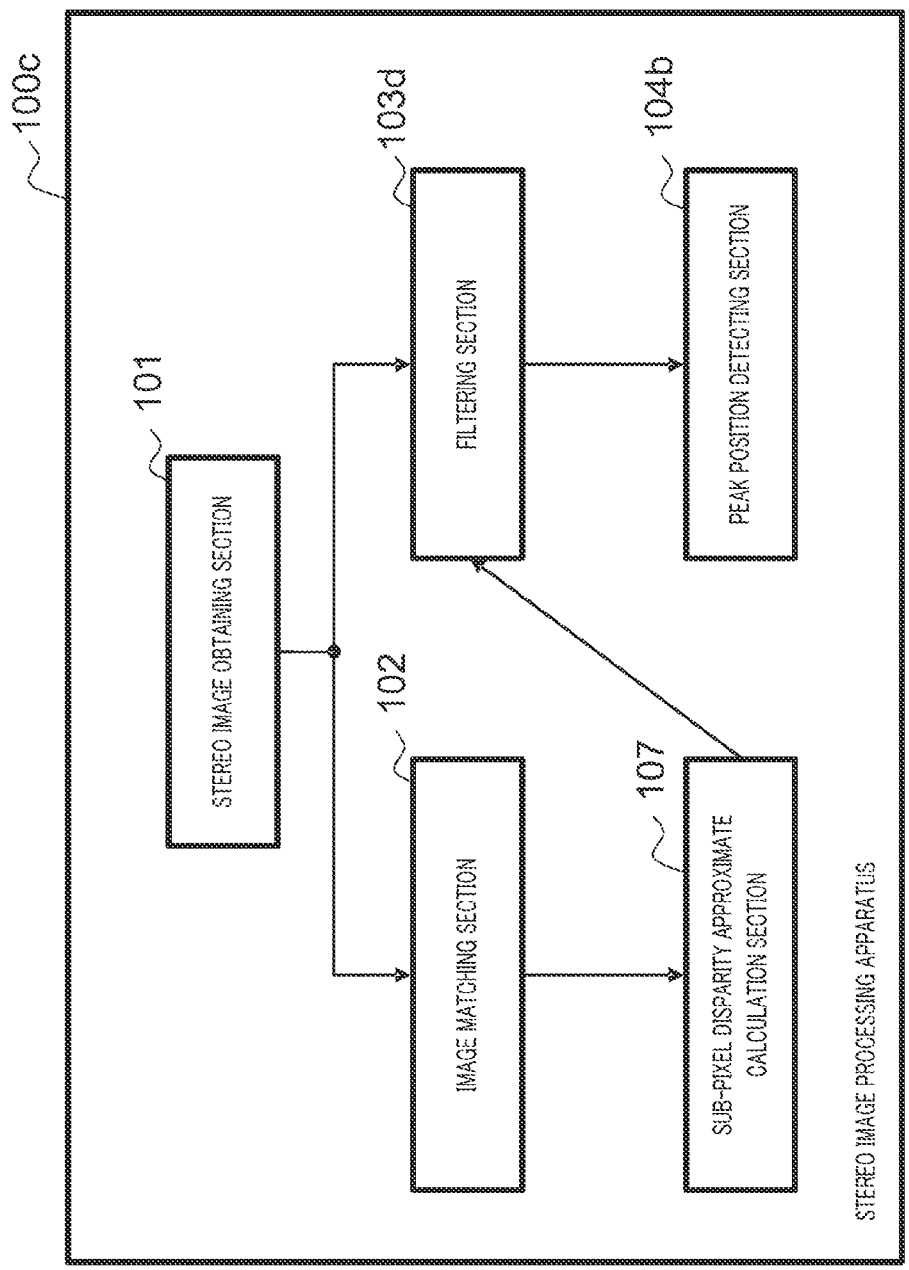
FIG. 24 is a block diagram illustrating an example of a configuration of a stereo image processing apparatus according to Embodiment 4 of the present invention.

FIG. 24 is a block diagram illustrating an example of a configuration of a stereo image processing apparatus 100c according to Embodiment 4. FIG. 24 corresponds to FIG. 2 in Embodiment 2.

Stereo image processing apparatus 100c is different from the apparatus in FIG. 2 in that filtering section 103d is included instead of filtering section 103, peak position detecting section 104b is included instead of peak position detecting section 104, and sub-pixel disparity approximate calculation section 107 is further included. The same reference numerals are assigned to the parts identical to those in FIG. 2, and the description for these components is omitted.

<Sub-pixel Disparity Approximate Calculation Section 107>

Sub-pixel disparity approximate calculation section 107 calculates an approximate calculation value of the disparity on the sub-pixel level. The disparity calculated on the sub-pixel level by sub-pixel disparity approximate calculation section 107 may be at least an approximate calculation value with accuracy of greater than or equal to an inverse number of the interval for extracting data. For example, when the interval for extracting data is 8, the disparity on the sub-pixel level may only need ⅛-pixel accuracy. Note that, the interval for extracting data will be described later.

In sub-pixel disparity approximate calculating section 107, the approximate calculation value on the sub-pixel level is calculated by using the "isogonal linear fitting" or the "quadratic curve fitting", for example. Although the disparity provided using the isogonal linear fitting and the quadratic curve fitting is less accurate than the disparity provided by peak position detecting section 104, the disparity on the sub-pixel level can be calculated with less complexity. In the following description, the overview of the process by sub-pixel disparity approximate calculation section 107 using the isogonal linear fitting will be described.

Sub-pixel disparity approximate calculation section 107 obtains a target image, a reference image, coordinates of the target point in the target image, and coordinates of the corresponding point in the reference image from image matching section 102. When the disparity of the corresponding point from the predetermined target point is n and the coordinates of the target point is (xa, ya), the coordinates of the corresponding point is (xa+n, ya). Here, an SAD value of the corresponding point with respect to the target point is represented by SAD (n) as represented in Equation 1.

Coordinates of the point one pixel to the left of the corresponding point in the x-axis direction and coordinates of the point one pixel to the right of the corresponding point in the x-axis direction are (xa+n−1, ya) and (xa+n+1, ya), respectively. SAD values for the points with respect to the target points are SAD (n−1), SAD (n+1), respectively. Sub-pixel disparity approximate calculation section 107 can calculate the disparity ns on the sub-pixel level as shown in Equation 7.

[7]

in the case of $SAD(n-1) > SAD(n+1)$:  (Equation 7)
$$n' = n + \frac{SAD(n-1) - SAD(n+1)}{2\{SAD(n+1) - SAD(n)\}}$$
in the case of $SAD(N-1) < SAD(n+1)$:
$$n' = n + \frac{SAD(n-1) - SAD(n+1)}{2\{SAD(n-1) - SAD(n)\}}$$

Figure 25:
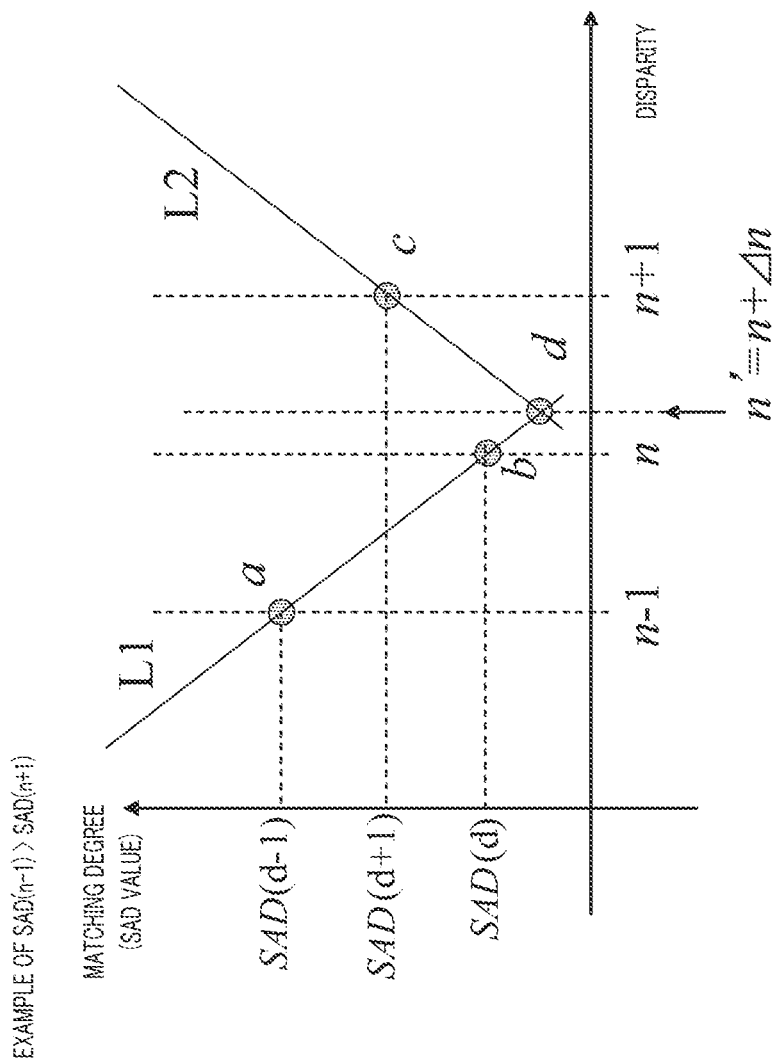
FIG. 25 is a schematic diagram illustrating an approximate calculation value of disparity on sub-pixel level according to Embodiment 4 of the present invention.

FIG. 25 is a diagram used for illustrating the relationship between the disparity and the SAD values. In FIG. 25, points a, b, and c respectively denote points obtained by plotting SAD values corresponding to disparities for the pixel to the left by one pixel in the x-axis direction from the corresponding point, the corresponding point, and the pixel to the right by one pixel. When L1 denotes the straight line passing through points a and b, k denotes the slope of L1, and L2 denotes a straight line passing through point c and has a slope −k, a value representing the disparity at the crosspoint d of L1 and L2 is the disparity ns on the sub-pixel level at the target point.

Note that, the method for calculating the approximate calculation value of the disparity on the sub-pixel level may not be limited to the isogonal linear fitting or the quadratic curve fitting, and another method may be used.

<Configuration of Filtering Section 103d>

Figure 26:
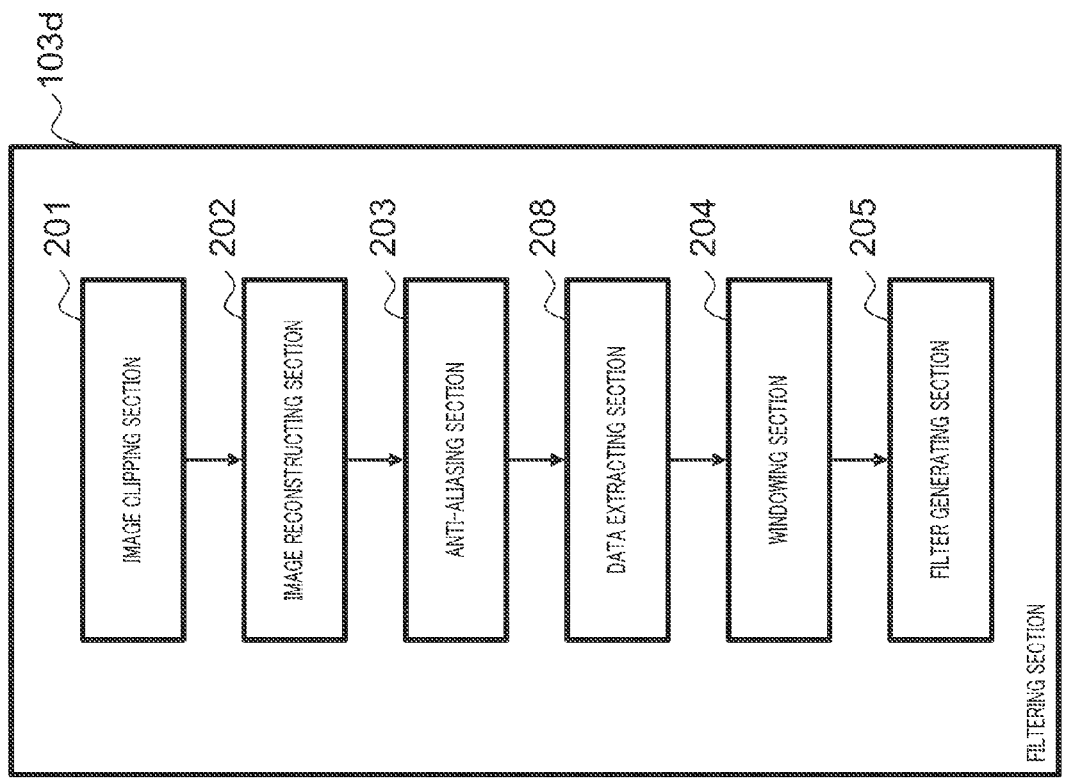
FIG. 26 is a block diagram illustrating an example of a configuration of a filtering section according to Embodiment 4 of the present invention.

FIG. 26 is a block diagram illustrating an example of the configuration of the filtering section 103d in stereo image processing apparatus 100c. FIG. 26 corresponds to FIG. 3 in Embodiment 2.

Filtering section 103d illustrated in FIG. 26 is different from FIG. 3 in that filtering section 103d further includes data extracting section 208. In FIG. 26, the same reference numerals are assigned to the parts identical to those in FIG. 3, and the description for these components is omitted.

<Data Extracting Section 208>

Data extracting section 208 extracts one-dimensional pixel data evenly spaced apart with the folding noise removed by anti-aliasing section 203. With this, the amount of data processed by subsequent windowing section 204 and filter generating section 205 is reduced, reducing the complexity. Furthermore, windowing adjusted to the correlation peak is possible by shifting the starting position of extracting data based on the approximate calculation value of the disparity on the sub-pixel level by data extracting section 208. One-dimensional pixel data obtained by data extracting by data extracting section 208 is referred to as extracted one-dimensional pixel data.

Figure 32:
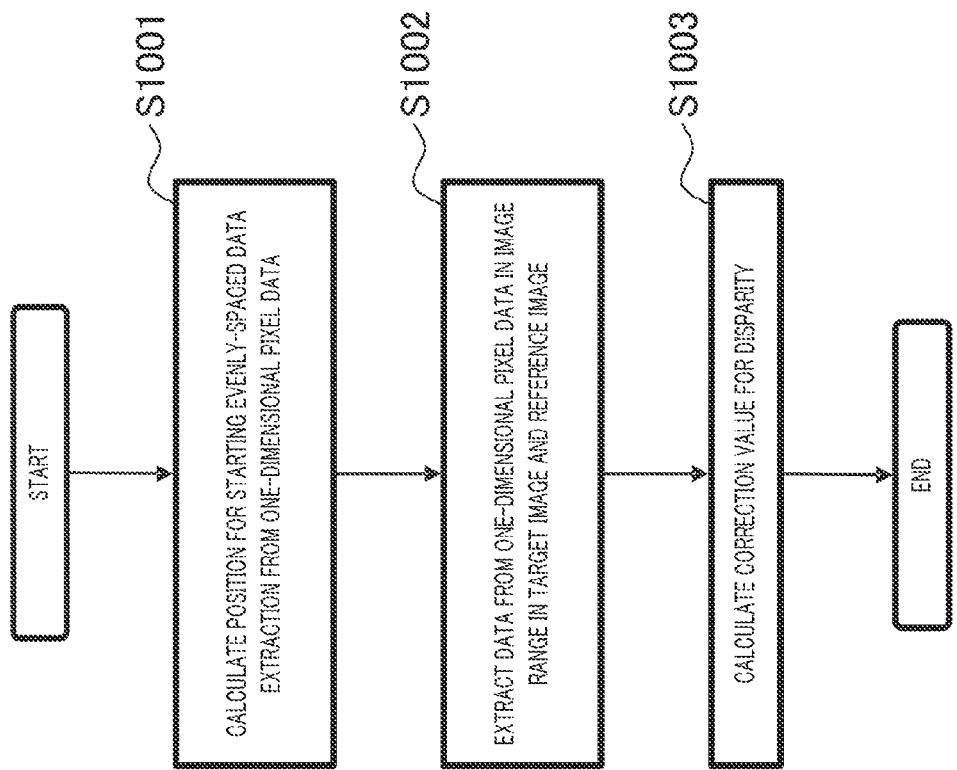
FIG. 32 is a flowchart illustrating an example of data extracting process according to Embodiment 4 of the present invention.

FIG. 32 is a diagram used for describing the operation by data extracting section 208. The operation of data extracting section 208 will be described as follows with reference to FIG. 32.

Data extracting section 208 includes calculating a position for starting data extraction (S1001), extracting data (S1002), and calculating the correction value for disparity (S1003). The following is detailed description.

(Operation 1: Calculating a Position for Starting Data Extraction)

Data extracting section 208 calculates a position for starting evenly-spaced data extraction from one-dimensional pixel data (S1001). Data extracting section 208 calculates a position for starting data extraction based on the approximate calculation value of the disparity on the sub-pixel level calculated by sub-pixel disparity approximate calculation section 107. The following specifically describes a specific order of calculation.

First, coefficients N, W, and K necessary for calculating the position for starting data extraction are calculated. Coefficient N is an integer obtained by dividing the number of pixel rows by two. For example, when the number of the pixel rows is 4, coefficient N is two, and when the number of the pixel rows is 3, coefficient N is 1. Coefficient W is a value obtained by dividing 0.5 by the number of pixel rows. For example, when the number of pixel rows is 2, coefficient W is 0.25. Coefficient K is a value obtained by subtracting 0.5 from the value smaller than the tenth place of the approximate calculation value of the disparity on the sub-pixel level. Stated differently, the values are represented as −0.5≤K<0.5. Subsequently, the coefficients are substituted to Equation 8 when the number of pixel rows in the image range is an odd number, and the coefficients are substituted to Equation 9 when the number of pixel rows in the image range is an even number. With this operation, difference D at the position for starting data extraction is calculated.

[8]

$\{2(i-1)+1\}W \leq K < (2i+1)W \Rightarrow D=i$  (Equation 8)

[9]

$\{2(i-1)+1\}W \leq K < (2i+1)W \Rightarrow D=i, i=-(N-1), \ldots, N-1$ $2(i-1)W \leq K < (2i+1)W \Rightarrow D=i, i=-N$ $\{2(i-1)+1\}W \leq K < 2iW \Rightarrow D=i, i=N$  (Equation 9)

Figure 30:
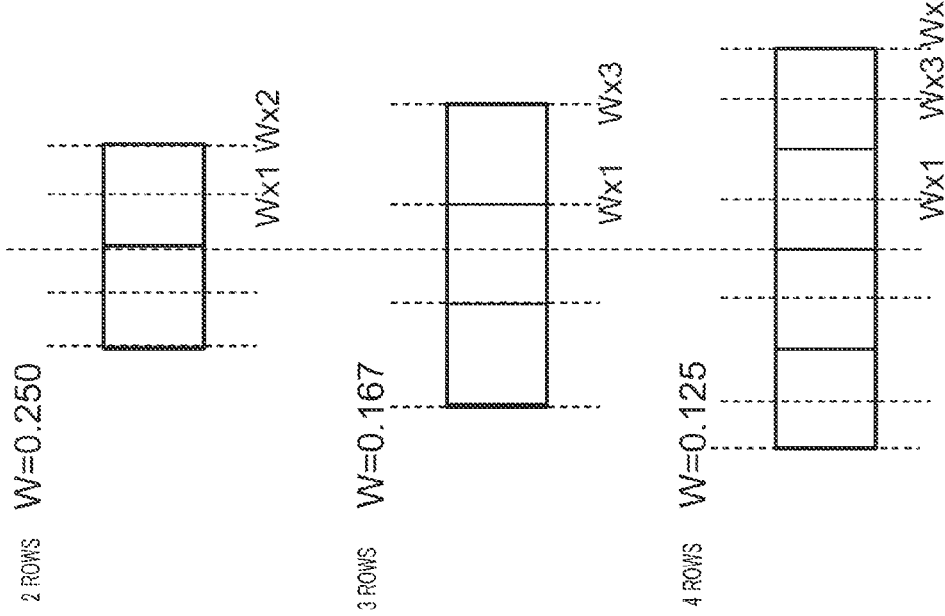
FIG. 30 is a schematic diagram illustrating a concept for calculating difference D at the positions for starting data extraction according to Embodiment 4 of the present invention.

FIG. 30 illustrates mathematical expressions for calculating difference D at the position for starting data extraction when the number of pixel rows in the image range clipped for calculating the disparity from the target image and the reference image is 2, 3, and 4.

Using difference D in the positions for starting data extraction, the position for starting data extraction in the one-dimensional pixel data reconstructed from the image range of the target image and the reference image is changed.

When difference D is a positive value, the position for starting data extraction in the reference pixel data is shifted from the pixel at the left end of one-dimensional pixel data to the right as much as the absolute value of D. When difference D is a negative value, the position for starting data extraction in the target pixel data is shifted from the pixel at the left end of one-dimensional pixel data to the right as much as the absolute value of D. When difference D is 0, the position for starting data extraction is not changed.

(Operation 2: Extracting Data)

Data extraction by data extracting section 208 from one-dimensional pixel data in the image ranges in the target image and the reference image shall be described.

Data extracting section 208 holds, in advance, information on the interval of data extraction when extracting data. As an interval for extracting data, the number of pixel rows in the original image range may be set when the stereo image is a grayscale image, and a multiple of the number of rows may be used when the stereo image is a color image, which is image data in the Bayer pattern. Alternatively, a smaller value may be set in order to secure the redundancy of the one-dimensional data and increase error tolerance.

Data extracting section 208 obtains extracted one-dimensional pixel data by extracting data evenly spaced from the one-dimensional pixel data in the image ranges in the target image and the reference image, based on the values of the position for starting data extraction and the interval for data extraction.

Figure 28:
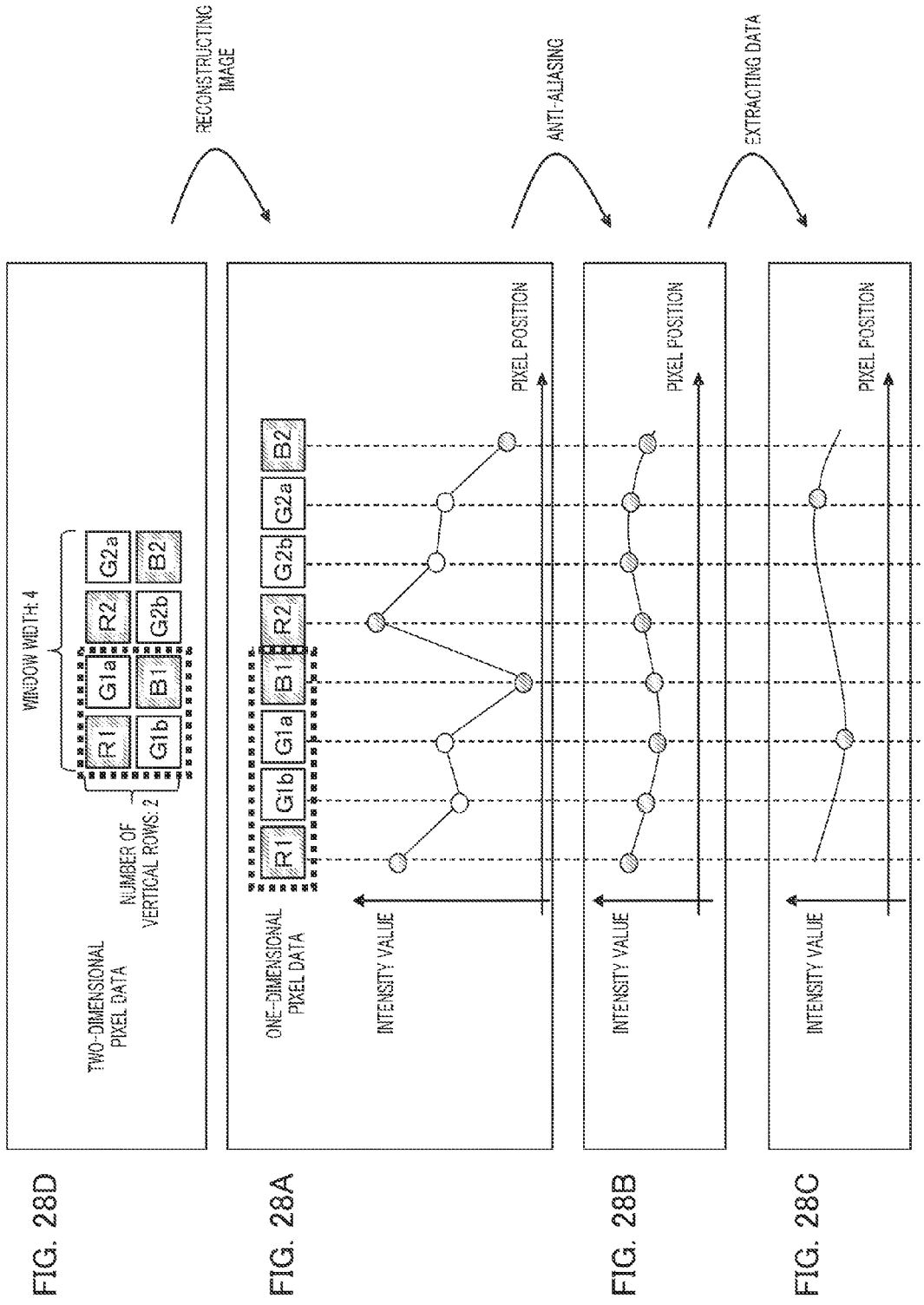
FIGS. 28A to 28D are schematic diagrams illustrating an example in illustrating data extraction according to Embodiment 4 of the present invention.

FIGS. 28A to 28D illustrate an example of evenly-spaced data extraction when the stereo image is a color image, which is image data in the Bayer pattern. FIG. 28A illustrates data after reconstructing an image range having pixel row count 2, that is, the unit row count 1 illustrated in FIG. 28D into one-dimensional pixel data. FIG. 28B illustrates data after anti-aliasing by the low-pass filter. FIG. 28C illustrates data after data extraction for every four pixels using the third pixel from the beginning as a position for starting data extraction.

Figure 31:
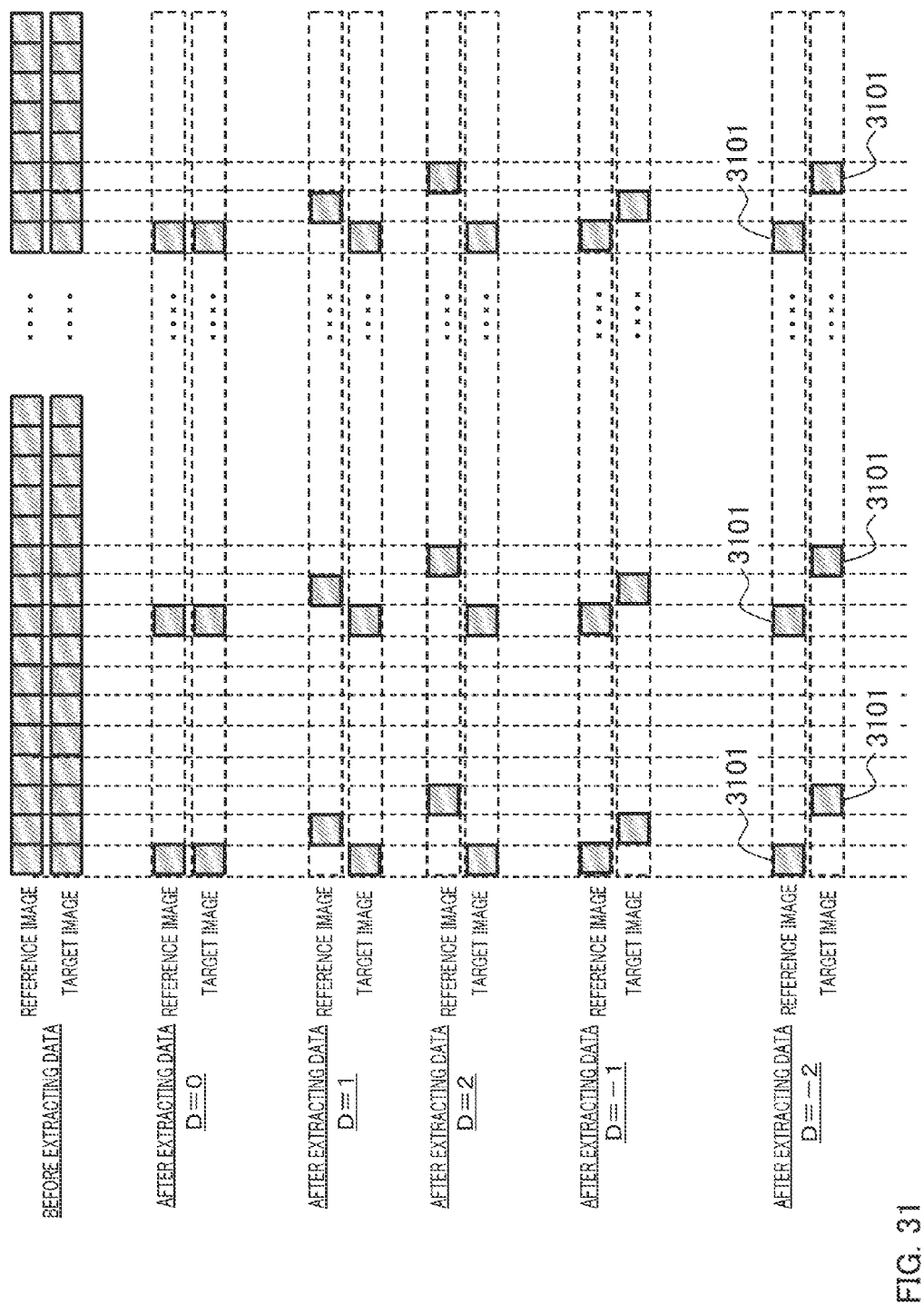
FIG. 31 is a schematic diagram illustrating a concept of data extraction according to Embodiment 4 of the present invention.

Furthermore, in FIG. 31, an example in which data extraction from one-dimensional pixel data is performed while changing the position for staring data extraction, based on difference D in the positions for starting data extraction. FIG. 31 illustrates an example of data extraction when the stereo image is a color image and is image data in the Bayer pattern, under a condition that the maximum possible value of the data extraction interval is 8 pixels when the number of pixel rows in the image range is 4. Here, when the approximate calculation value of the disparity on the sub-pixel level is 0.1(k=−0.4), D=−2, and the data extraction result is 3101 illustrated in FIG. 31.

(Operation 3: Calculating Correction Value for Disparity)

Calculation of a correction value for disparity by data extracting section 208 will be described. When difference D between positions for starting data extraction in the target image and the reference image is not 0 in data extracting section 208, the value of disparity obtained according to the difference changes. Accordingly, it is necessary to correct the disparity. Data extracting section 208 calculates a correction value for the disparity by dividing the difference in the positions for starting data extraction in the target pixel data and the reference pixel data by the number of pixel rows.

For example, when the pixel row count is 4 and the difference in the positions for starting data extraction in the target pixel data and the reference pixel data is −1, the correction value for the disparity is −0.25.

The disparity is corrected after peak position detecting section 104b in the later stage detects the peak position and calculates the disparity. Accordingly, the correction value calculated by data extracting section 208 is provided to peak position detecting section 104b as an input.

<Windowing Section 204>

Windowing section 204 in Embodiment 4 stores a window function having a size calculated by dividing the size of one-dimensional pixel data by data extraction interval. Subsequently, windowing section 204 in Embodiment 4 performs windowing using extracted one-dimensional pixel data extracted by data extracting section 208 as an input. The other processes are identical to the processes by windowing section 204 in Embodiments 1 to 3.

<Peak Position Detecting Section 104b>

The process by peak position detecting section 104b will be described. Peak position detecting section 104b corrects the disparity value after performing the same process by peak detecting section 104. More specifically, the disparity value is corrected by adding, after calculating the disparity on the sub-pixel level by the process in the same manner as peak detecting section 104, the correction value (calculated by data extracting section 208 in filtering section 103d) of the disparity according to the difference between positions for starting data extraction in the target pixel data and the reference pixel data to the disparity on the sub-pixel level.

For example, when the disparity on the sub-pixel level calculated as the result of peak detection process is 15.25, and the correction value for the disparity is −0.375, the value of the disparity after correction is 14.875. Peak position detecting section 104b outputs the disparity value after the correction on the disparity as described above.

(Description on Principle 1: Description on no Degradation in Accuracy during Data Extraction in Principle)

The principle on data extraction while maintaining accuracy in calculating disparity according to Embodiment 4 will be described.

One-dimensional pixel data with folding noise removed by anti-aliasing section 203 does not lose intensity information representing tone of the object to be captured necessary for calculating disparity on the sub-pixel level, even if data extraction is performed with an interval of the pixel row count in the original image range.

When the stereo image is a color image, which is image data in the Bayer pattern, even when data extraction is performed with an interval twice as much as the pixel row count of the original image range on one-dimensional pixel data with the folding noise removed by anti-aliasing section 203, the one-dimensional pixel data does not lose the intensity information representing tone of the object to be captured necessary for calculating disparity on the sub-pixel level.

For example, when the stereo image is a color image, which is image data in the Bayer pattern, if the pixel row count of the image range is 2, the one-dimensional image data does not lose intensity information representing tone of the object to be captured necessary for calculating disparity on the sub-pixel level, even when data is extracted for every 4 pixels, which is twice the number of pixel rows.

Since one-dimensional pixel data is generated by reconstructing image range in the target image and the reference image, no disparity is generated in the image range in the vertical direction. Accordingly, the change in the tone in the vertical direction of the image range does not affect the accuracy in calculating disparity.

When the stereo image is a color image, which is image data in the Bayer pattern, the change in tone generated in a two-pixel cycle in the baseline-length direction in the image range is due to the Bayer pattern in R, G, and B, and not the tone of the object to be captured. For example, devices for capturing visible light in different wavelengths are alternately arranged in the baseline-length direction of the image range, such as RGRG . . . and GBGB . . . , and the tone changes in a two-pixel cycle. In the case of the color devices in the Bayer pattern, the resolution in the baseline-length direction is ½ of the case of monochrome devices.

With the description above, in the one-dimensional pixel data, at least the change in thickness having a cycle of the value of pixel row count in the original image range does not affect the accuracy of the disparity calculated. In the one-dimensional pixel data on the color devices in the Bayer pattern, the change in tone for the number of pixels twice as the pixel row count in the original image range as a cycle does not affect the accuracy in the disparity calculated.

Figure 27:
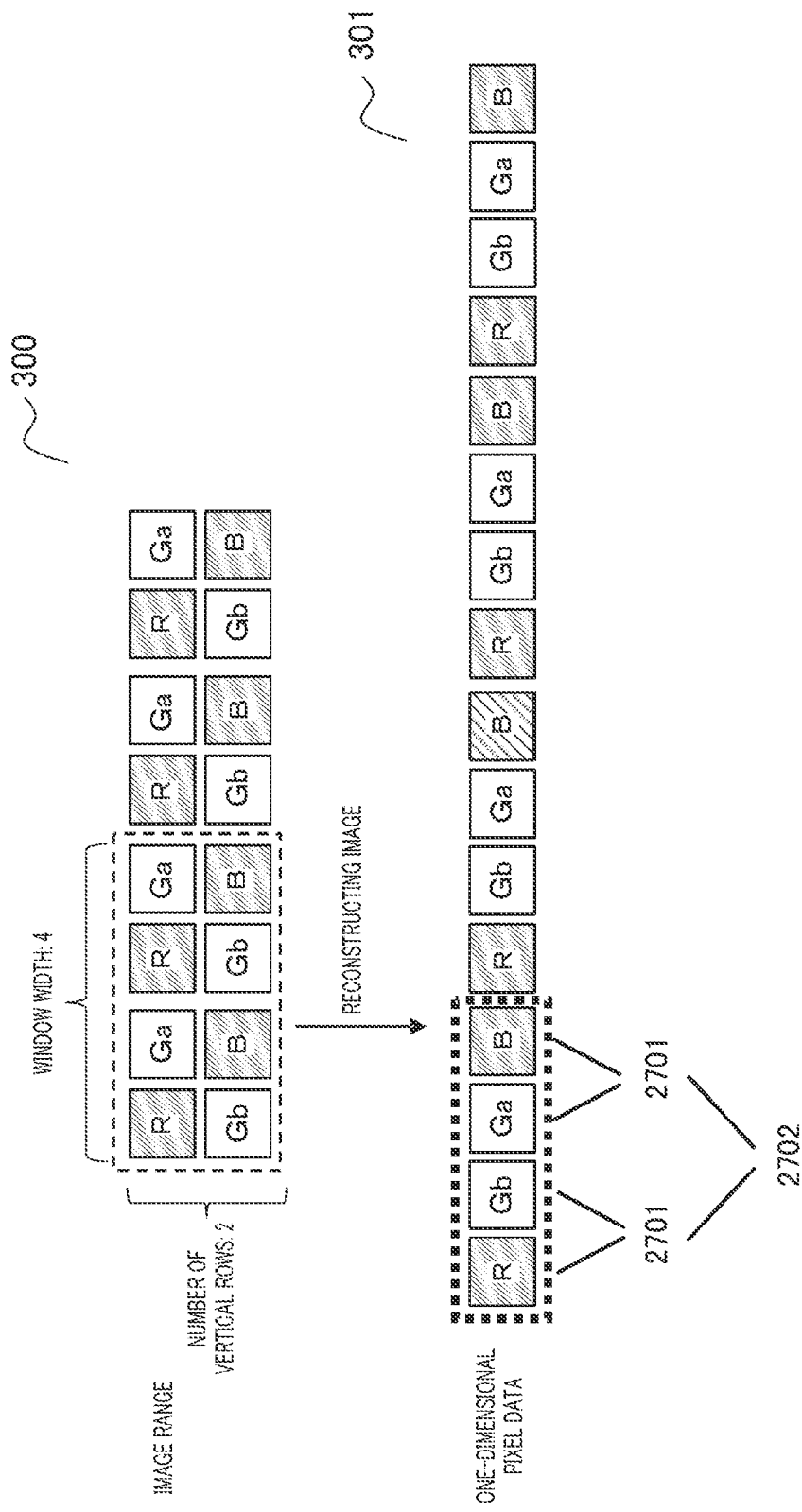
FIG. 27 is a schematic diagram for illustrating the reason why data can be extracted with an even space according to Embodiment 4 of the present invention.

The characteristics of one-dimensional pixel data are described in more detail with reference to FIG. 27. FIG. 27 illustrates an example in which image clipping section 201 clips image range 300 of 2×8 pixels from the target image or the reference image which is the image data in the Bayer pattern. Image range 300 of 2×8 pixels clipped by image clipping section 201 is converted to one-dimensional pixel data 301 of 1×16 pixels by image reconstructing section 202. 2701 in FIG. 27 corresponds to the change in tone in the vertical direction of the image range, and 2702 in FIG. 27 corresponds to the change in tone generated by the Bayer pattern. In this case, the change in the thickness in 4-pixel cycle in the one-dimensional pixel data does not affect the accuracy in the calculation of the disparity calculated.

Since information that does not affect the accuracy in the calculated disparity can be deleted, only data necessary for calculating the disparity on the sub-pixel level can be saved by extracting data so as not to lose intensity information representing tone of the object to be captured necessary for calculating the disparity on the sub-pixel level from the one-dimensional pixel data by data extracting section 208.

Accordingly, stereo image processing apparatus 100c can reduce complexity in the process at the later stage while maintaining accuracy in calculating disparity on the sub-pixel level by using extracted one-dimensional pixel data extracted from the one-dimensional pixel data.

(Description of Principle 2: Description on the Reason why the Change in the Starting Position Matches the Correlation Peak)

The principle for implementing windowing adjusted to the correlation peak by changing the starting position when extracting data from the one-dimensional pixel data will be described with reference to FIG. 29.

Figure 29:
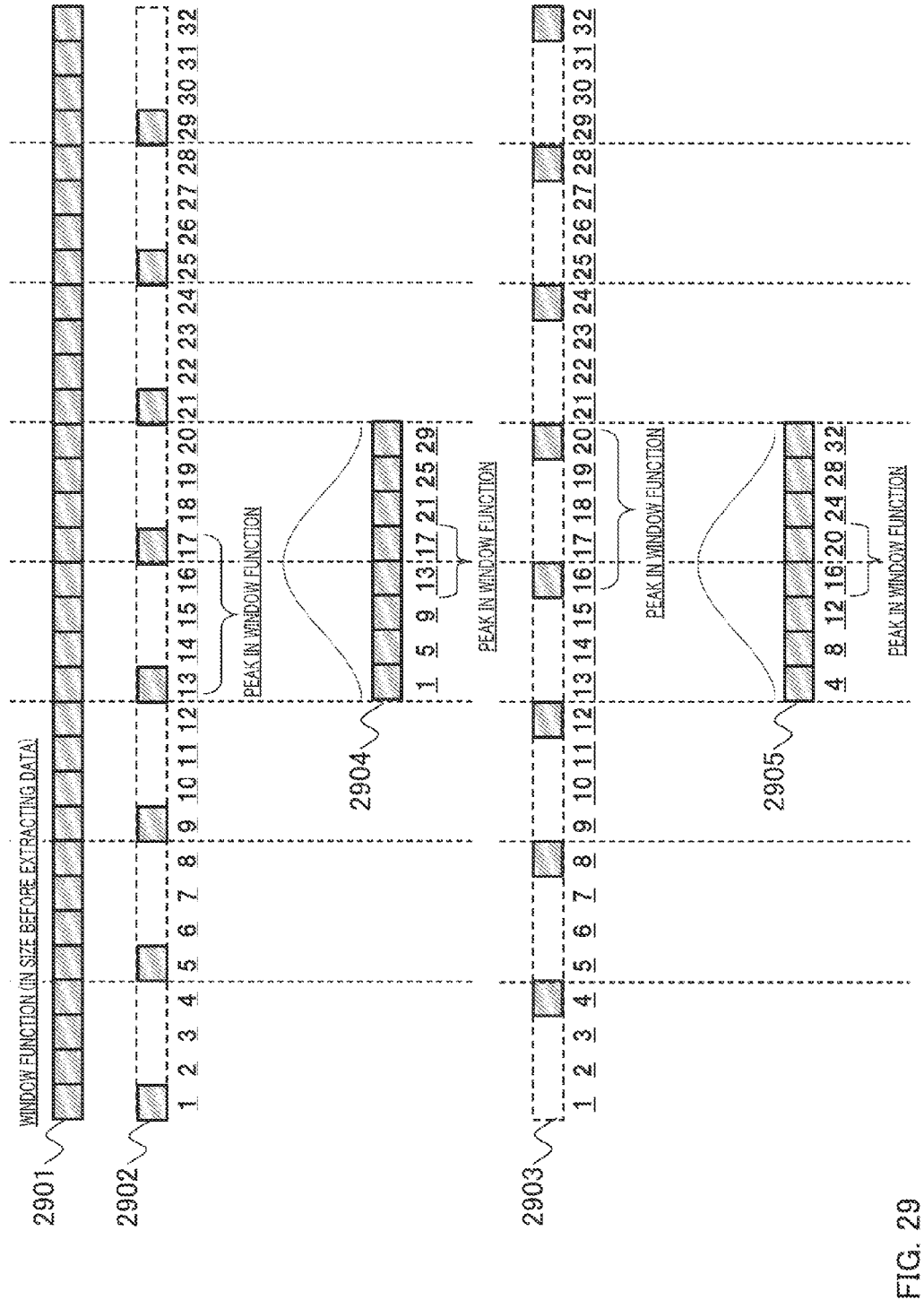
FIG. 29 is a schematic diagram illustrating the reason why a change in a starting position of data extraction is necessary for windowing adjusted to a peak of correlation.

FIG. 29 illustrates an example in which data is extracted from one-dimensional pixel data for every 4 pixels. 2901 in FIG. 29 represents the one-dimensional pixel data, 2902 in FIG. 29 represents extracted one-dimensional pixel data after data is extracted every 4 pixels from the first pixel, and 2903 in FIG. 29 represents extracted one-dimensional pixel data after data is extracted every four pixels from the fourth pixel.

As illustrated in 2902 in FIG. 29, when data is extracted for every 4 pixels from the first pixel in the one-dimensional pixel data composed of 32 pixels, the data size of the extracted one-dimensional pixel data is 8 pixels. As illustrated in 2904 in FIG. 29, the extracted one-dimensional pixel data has the 13$^{th}$ pixel and the 17$^{th}$ pixel as the center in one-dimensional pixel data. When an 8-pixel window function having the maximum value at the center is applied, it is equivalent to perform windowing on the one-dimensional pixel data, using a window function having the maximum value at a position on the left side of the center.

As illustrated in 2903 in FIG. 29, when data is extracted for every 4 pixels from the one-dimensional pixel data composed of 32 pixels, the data size of the extracted one-dimensional pixel data is 8 pixels. As illustrated in 2905 in FIG. 29, the extracted one-dimensional pixel data has the 16th pixel and the 20th pixel as the center in one-dimensional pixel data. When an 8-pixel window function having the maximum value at the center is applied, it is equivalent to perform windowing on the one-dimensional pixel data, using a window function having the maximum value at a position on the right side of the center.

As described above, by shifting the position for starting data extraction when data is extracted with even space, it is possible to perform windowing having a maximum value at a different position in the one-dimensional pixel data, even if the same window function having the maximum value at the center is used. Accordingly, it is possible to perform windowing adjusted to the correlation peak suitable for the purpose.

With the operations and principles described above, windowing adjusted to the correlation peak can be performed without performing complex operation for achieving the window function adjusted to the correlation peak or preparing coefficients of window functions adjusted to a plurality of correlated expected peaks in advance as static data.

Functional sections in stereo image processing apparatus according to embodiments described above may be each configured as integrated circuit. Each functional section of the stereo image processing apparatus may be individually implemented as one chip, or a plurality of functions sections may be integrated into one chip. The integrated circuit used may be an LSI (large scale integration), IC (integrated circuit), a system LSI, a super LSI, or an ultra LSI, depending on the degree of integration. The integrated circuit may be implemented by a dedicated circuit or a general-purpose processor. Alternatively, the integrated circuit may be an FPGA (field programmable gate array) that can be programmed after fabrication, or a configurable processor having connection or settings of internal circuit cells that can be reconfigured. Furthermore, functional sections of the stereo image processing apparatus may be implemented as integration by a technology for other integration replacing LSI, along with the progress in the semiconductor technology and another technology derived.

The disclosure of Japanese Patent Application No. 2011-135191, filed on Jun. 17, 2011, including the specification, drawings and abstract, is incorporated herein by reference in its entirety.

INDUSTRIAL APPLICABILITY

The stereo image processing apparatus and the stereo image processing method according to the present invention are useful as a stereo image processing apparatus and a stereo image processing method capable of calculating disparity highly precisely for an object having a small image region size in the baseline length direction.

REFERENCE SIGNS LIST

100 Stereo image processing apparatus
100a Stereo image processing apparatus
100b Stereo image processing apparatus
100c Stereo image processing apparatus
101 Stereo image obtaining section
102 Image matching section
103 Filtering section
103a Filtering section
103b Filtering section
103c Filtering section
103d Filtering section
104 Peak position detecting section
104d Peak position detecting section
105a Rectification information storage section
106a Rectification processing section
107b Vertical pixel corrected image generating section
108b Bayer pattern defining section
109b Rectification information obtaining section
110b Vertical pixel correcting section 201 Image clipping section
202 Image reconstructing section
203 Anti-aliasing section
204 Windowing section
205 Filter generating section
207a Coordinate converting section
208 Data extracting section
208b Bayer pattern adjusting section
300 Image range
301 One-dimensional pixel data
311 Target point
312 Unit target image
313 Rectangular window
321 Clipping position
322 Unit reference image
331 Target image (reference image)
332 Unit target image for sub-pixel estimation (unit reference image for sub-pixel estimation)
333 Target point (corresponding point)
334 Target pixel data (reference pixel data)
335 Distance between adjacent pixels in first pixel row
341 Nyquist frequency
342 Amplitude characteristics
343 Aliasing
344 Low-pass filter
351 Target image
352 Unit target image for sub-pixel estimation
353 Target pixel data
354 Reference image
355 Reference pixel data
356 Reference pixel data
357 Second window function
361 Image in the Bayer pattern
362 R-pixel
363 G-pixel
364 G-pixel
365 B-pixel
366 Color pixel unit
367 R-data
368 G-data
369 B-data
401 First pixel row
402 Second pixel row
403 Third pixel row
2001 Pixel to be corrected by vertical pixel correction (pixel (5))
2002 Pixel on original coordinate for vertical pixel correction of pixel to be corrected by vertical pixel correction (pixel (5))
2003 Color of pixel to be corrected by vertical pixel correction (pixel (5))
2004 Pixel used for calculating a value for vertical pixel correction
2005 Pixel used for calculating a value for vertical pixel correction
2006 Pixel to be corrected by vertical pixel correction (pixel (1))
2007 Pixel in original target image (pixel (1))
2101 Pixel to be corrected by vertical pixel correction (pixel (8))
2102 Pixel used for calculating a value for vertical pixel correction
2103 Pixel on original coordinate for vertical pixel correction of pixel to be corrected by vertical pixel correction (pixel (8))
2104 Pixel used for calculating a value for vertical pixel correction

The invention claimed is:

1. A stereo image processing apparatus comprising:
an image matching section that performs image matching on a target image and a reference image so as to obtain a corresponding point in the reference image corresponding to a target point in the target image;
an image clipping section that extracts, from the target image, first two-dimensional pixel data having a plurality of pixel rows and a plurality of pixel columns and including the target point, and extracts, from the reference image, second two-dimensional pixel data having a plurality of pixel rows and a plurality of pixel columns and including the corresponding point;
an image reconstructing section that reconstructs, based on a predetermined reconstruction rule, the first two-dimensional pixel data and the second two-dimensional pixel data to first one-dimensional pixel data and second one-dimensional pixel data, respectively;
an anti-aliasing section that removes a folding noise generated due to the reconstruction from the first one-dimensional pixel data and the second one-dimensional pixel data;
a filter generating section that calculates an inverted phase filtering coefficient by inverting, in a direction in which pixels are arranged, a position of each pixel value in the first one-dimensional pixel data with the noise removed, and filters the second one-dimensional pixel data with the noise removed using the inverted phase filtering coefficient; and
a peak position detecting section that calculates a disparity based on a correlation between the first one-dimensional pixel data with the noise removed and the second one-dimensional pixel data with the noise removed.

2. The stereo image processing apparatus according to claim 1, wherein
the predetermined reconstruction rule is a rule for reconstructing two-dimensional pixel data to one-dimensional pixel data such that a ratio of distances between given pixels included in a same pixel row in two-dimensional pixel data before reconstruction to a ratio of the distances after the reconstruction are identical for any of pixels included in the two-dimensional pixel data.

3. The stereo image processing apparatus according to claim 1, wherein
the predetermined reconstruction rule is a rule for generating the one-dimensional pixel data such that a distance between pixels in a direction of the pixel row is greater than or equal to an original distance between the pixels.

4. The stereo image processing apparatus according to claim 1, wherein
the first two-dimensional pixel data and the second two-dimensional pixel data include data of the same number of pixels.

5. The stereo image processing apparatus according to claim 1, further comprising:
a windowing section that windows the first one-dimensional pixel data and the second one-dimensional pixel data with the noise removed, using a window function having a continuous change at each end of a window, wherein a length of the window of the window function is set according to a shift amount of a position of the target point on the target image and a position of the corresponding point on the reference image; and
the filter generating section calculates an inverted filtering coefficient by inverting, in the direction in which the pixels are arranged, a position of each pixel value in the windowed first one-dimensional pixel data, and filters, using the inverted filtering coefficient, the windowed second one-dimensional pixel data.

6. The stereo image processing apparatus according to claim 1, further comprising:
a rectification processing section that performs distortion correction and rectification on the target image and the reference image, and outputs the target image and the reference image after the distortion correction and the rectification to the image matching section; and
a coordinate converting section that converts coordinates of the target point and the reference point to coordinates in the target image and the reference image, and outputs, to the peak position detecting section, a value obtained by rounding up or rounding off at the time of the conversion, wherein
the peak position detecting section calculates a disparity by adding a value rounded up or rounded off in the pixel row direction at the time of conversion to a shift amount from the target point on the target image after the conversion by the coordinate conversion section and the corresponding point on the reference image after the conversion by the coordinate conversion section, the target point and the corresponding point being calculated based on a correlation between the target pixel data and the reference pixel data in a result of the filtering.

7. The stereo image processing apparatus according to claim 6, further comprising:
a vertical pixel corrected image generating section that performs distortion correction and rectification on the target image and the reference image only in the vertical direction, and outputs a vertical pixel corrected target image and a vertical pixel corrected reference image to the image clipping section, the vertical pixel corrected target image being the target image corrected by the distortion correction and the rectification only in the vertical direction and the vertical pixel corrected reference image being the reference image corrected by the distortion correction and the rectification only in the vertical direction, wherein:
the coordinate converting section converts coordinates of the target point and the corresponding point obtained from the image matching section to coordinates on the vertical pixel corrected target image and the vertical pixel corrected reference image, respectively;
the image clipping section clips an image range from the vertical pixel corrected target image and the vertical pixel corrected reference image;
the filter generating section calculates an inverted phase filtering coefficient by inverting, in the direction in which the pixels are arranged, a position of each pixel value in target pixel data which is one-dimensional pixel data generated from the vertical pixel corrected target image and with a folding noise removed, and filters reference pixel data which is one-dimensional pixel data generated from the vertical pixel corrected reference image and with a folding noise removed; and
the peak position detecting section calculates a disparity between a target point on the vertical pixel corrected target image and a corresponding point on the vertical pixel corrected reference image calculated which are obtained by the conversion by the coordinate converting section based on a correlation between the target pixel data and the reference pixel data in the result of the filtering.

8. The stereo image processing apparatus according to claim 7, further comprising:

a sub-pixel disparity approximate calculation section that calculates a disparity approximate calculation value on a sub-pixel level; and
a data extracting section that calculates a data extraction starting position based on the disparity approximate calculation value on the sub-pixel level and obtains extracted one-dimensional pixel data by extracting data from the one-dimensional pixel data based on the data extraction starting position, wherein:
the windowing section windows the extracted one-dimensional pixel data; and
the peak position detecting section corrects the calculated disparity based on the data extraction starting position.

9. The stereo image processing apparatus according to claim 7, wherein
the stereo image is an image in the Bayer pattern,
the stereo image processing apparatus further comprises
a Bayer pattern adjusting section that adjusts, when arrangements in the Bayer pattern in the vertical pixel corrected target image and the vertical pixel corrected reference image do not correspond to each other, a position of the corresponding point calculated by the matching section to match the arrangements in the Bayer pattern, wherein
the reconstruction rule is for generating one-dimensional pixel data by extracting at least one of an R pixel value, a G pixel value, and a B pixel value from the image range.

10. The stereo image processing apparatus according to claim 1, wherein:
the stereo image is an image in a Bayer pattern;
the image clipping section extracts two-dimensional pixel data composed of one or a plurality of pixel rows and a plurality of pixel columns; and
the reconstruction rule is for generating one-dimensional pixel data by extracting at least one of an R pixel value, a G pixel value, and a B pixel value from an image range.

11. A stereo image processing method comprising:
performing image matching on a target image and a reference image so as to obtain a corresponding point in the reference image corresponding to a target point in the target image;
extracting, from the target image, first two-dimensional pixel data having a plurality of pixel rows and a plurality of pixel columns and including the target point, and extracting, from the reference image, second two-dimensional pixel data having a plurality of pixel rows and a plurality of pixel columns and including the corresponding point;
reconstructing, based on a predetermined reconstruction rule, the first two-dimensional pixel data and the second two-dimensional pixel data to first one-dimensional pixel data and second one-dimensional pixel data, respectively;
removing a folding noise generated due to the reconstruction from the first one-dimensional pixel data and the second one-dimensional pixel data;
calculating an inverted phase filtering coefficient by inverting, in a direction in which pixels are arranged, a position of each pixel value in the first one-dimensional pixel data with the noise removed, and filtering the second one-dimensional pixel data with the noise removed using the inverted phase filtering coefficient; and
calculating a disparity based on a correlation between the first one-dimensional pixel data with the noise removed and the second one-dimensional pixel data with the noise removed.

* * * * *